US008907840B2

(12) United States Patent
Kanamoto

(10) Patent No.: US 8,907,840 B2
(45) Date of Patent: Dec. 9, 2014

(54) ELECTRONIC SCANNING RADAR APPARATUS, RECEIVED WAVE DIRECTION ESTIMATING METHOD, AND RECEIVED WAVE DIRECTION ESTIMATING PROGRAM

(75) Inventor: Junji Kanamoto, Yokohama (JP)

(73) Assignee: Honda Elesys Co., Ltd., Yokohama (JP)

( * ) Notice: Subject to any disclaimer, the term of this patent is extended or adjusted under 35 U.S.C. 154(b) by 442 days.

(21) Appl. No.: 13/365,650

(22) Filed: Feb. 3, 2012

(65) Prior Publication Data

US 2012/0249360 A1 Oct. 4, 2012

(30) Foreign Application Priority Data

Feb. 4, 2011 (JP) ................. P2011-022825

(51) Int. Cl.
G01S 13/06 (2006.01)
G01S 13/58 (2006.01)
G01S 3/74 (2006.01)
G01S 13/34 (2006.01)
G01S 13/93 (2006.01)

(52) U.S. Cl.
CPC ............... *G01S 3/74* (2013.01); *G01S 13/584* (2013.01); *G01S 13/345* (2013.01); *G01S 13/931* (2013.01)
USPC ............................ 342/70; 342/107; 342/146

(58) Field of Classification Search
CPC ........ G01S 13/345; G01S 3/74; G01S 13/931
USPC ................. 342/27, 28, 70–72, 118, 128
See application file for complete search history.

(56) References Cited

U.S. PATENT DOCUMENTS 7,489,266 B2 * 2/2009 Ohtake et al. .............. 342/70
7,724,181 B2 * 5/2010 Natsume .................. 342/108

(Continued)

FOREIGN PATENT DOCUMENTS

| JP | H03-293575 A | 12/1991 |
|---|---|---|
| JP | 2001-305202 A | 10/2001 |
| JP | 2005-33800 A | 12/2005 |
| JP | 2006-275840 A | 10/2006 |
| JP | 2009-156582 A | 7/2009 |
| JP | 2009-162688 A | 7/2009 |

OTHER PUBLICATIONS

Donald W. Tufts et al. "Estimation of Frequencies of Multiple Sinusoids: Making Linear Prediction Perform Like Maximum Likelihood", Proceedings of the IEEE, vol. 70, No. 9, Sep. 1982, pp. 975-989.

(Continued)

Primary Examiner — John B Sotomayor
Assistant Examiner — Marcus Windrich
(74) Attorney, Agent, or Firm — Arent Fox LLP

(57) ABSTRACT

An electronic scanning radar apparatus mounted on a moving object includes a receiver unit including a plurality of antennas receiving a received wave arriving from a target having reflected a transmitted wave, a beat signal generating unit generating a beat signal from the transmitted wave and the received wave, a frequency resolving unit resolving the beat signal into beat frequencies having a predetermined frequency bandwidth and that calculates complex data based on the beat signal resolved for each beat frequency, and an azimuth detecting unit estimating a wave number of the received wave based on singular values calculated from a matrix created based on the complex data calculated based on the beat signal and calculating a direction of arrival of the received wave based on coefficients calculated based on a pseudo-inverse matrix of the matrix included in a signal subspace determined by the estimated wave number.

21 Claims, 30 Drawing Sheets

(56) References Cited

U.S. PATENT DOCUMENTS

| | | | |
|---|---|---|---|
| 7,907,083 B2* | 3/2011 | Sakamoto et al. | 342/70 |
| 8,102,309 B2* | 1/2012 | Nakagawa | 342/147 |
| 2009/0040097 A1* | 2/2009 | Sakamoto et al. | 342/118 |
| 2010/0271254 A1* | 10/2010 | Kanamoto et al. | 342/27 |
| 2012/0242535 A1* | 9/2012 | Kanamoto | 342/158 |

OTHER PUBLICATIONS

T. Shimamura et al., "Data Prediction for the Burg Method", The Journal of Institute of Electronics, Information and Communication Engineers Transactions, vol. J77-A, No. 8, pp. 1182-1185, Aug. 1994.

* cited by examiner

FIG. 5

| | ASCENDING PEAK → | | | | |
|---|---|---|---|---|---|
| ↑ DESCENDING PEAK | 1 | 2 | 3 | 4 | 5 |
| 1 | $r_{11}$ $v_{11}$ $pu_1$ $pd_1$ | $r_{12}$ $v_{12}$ $pu_2$ $pd_2$ | ... | | |
| 2 | $r_{21}$ $v_{21}$ $pu_1$ $pd_2$ | $r_{22}$ $v_{22}$ $pu_2$ $pd_2$ | | | |
| 3 | ... | | ... | | |
| 4 | | | | | |
| 5 | | | | | $r_{55}$ $v_{55}$ $pu_5$ $pd_5$ |

MATRIX IS CREATED TO CORRESPOND TO ANGLE CH AFTER DBF

FIG. 6

| TARGET GROUP NUMBER | DISTANCE | RELATIVE VELOCITY | FREQUENCY POINT |
|---|---|---|---|
| TARGET GROUP 1 | $r_1$ | $v_1$ | $f_1$ |
| TARGET GROUP 2 | $r_2$ | $v_2$ | $f_2$ |
| TARGET GROUP 3 | $r_3$ | $v_3$ | $f_3$ |
| TARGET GROUP 4 | $r_4$ | $v_4$ | $f_4$ |
| ⋮ | | | |

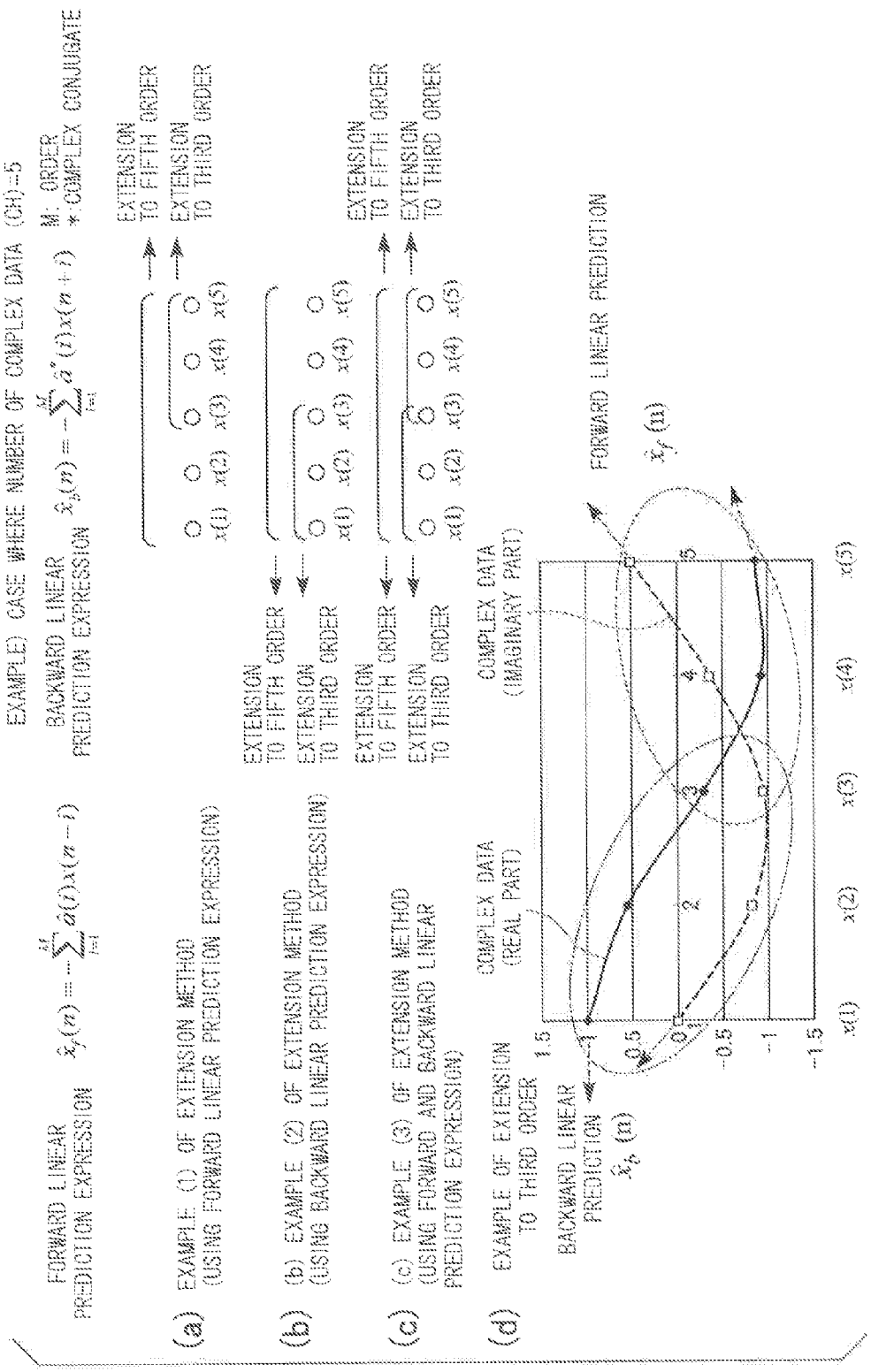

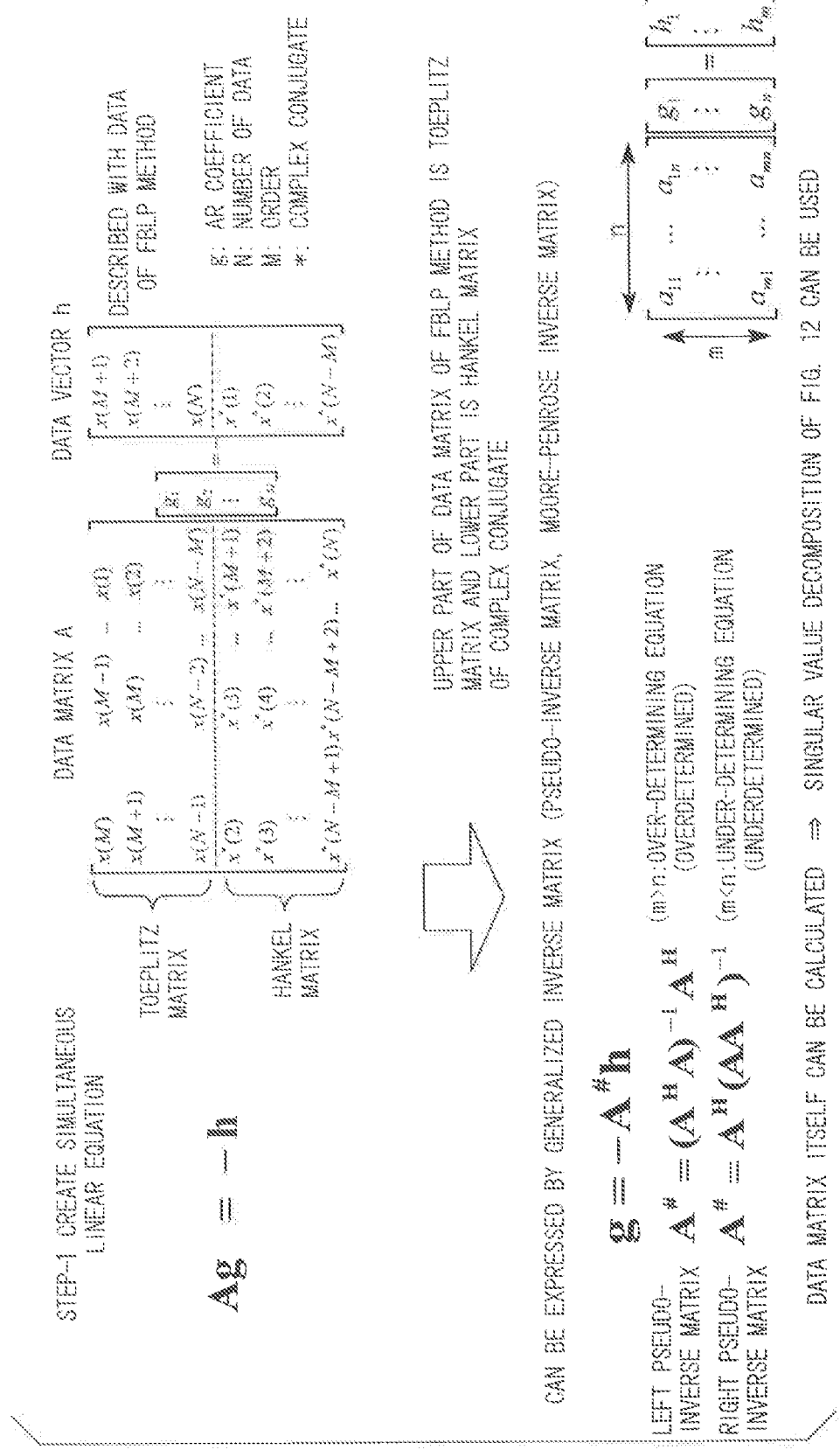

FIG. 13

STEP-4 EXPRESSION FOR CALCULATING AR COEFFICIENT OF SIGNAL SUBSPACE $$\hat{a} = -A^{\#}h = -V\begin{bmatrix}\Sigma^{-1} & 0\\ 0 & 0\end{bmatrix}U^{H}h$$

RANK r FOR DATA EXTENSION AND RANK r FOR CALCULATING POWER SPECTRUM CAN BE SEPARATELY SET (FOR EXAMPLE, RANK r FOR DATA EXTENSION IS FIXED TO MAXIMUM OR THE LIKE)

$$\Sigma^{-1} = diag(\sigma_1^{-1}, \sigma_2^{-1}, \ldots, \sigma_r^{-1})$$

RANK r IS TREATED (MINUTE SINGULAR VALUE IS ROUNDED OFF) DEPENDING ON WAVE NUMBER ESTIMATION

MODIFIED COVARIANCE FUNCTION $$c_x(j,k) = \frac{1}{2(N-M)}\left\{\sum_{n=M}^{N-1} x^*(n-j)x(n-k) + \sum_{n=0}^{N-1-M} x(n+j)x^*(n+k)\right\}$$
$$c_x(k,j) = c_x^*(j,k)$$
$$k,j = 0,1,\ldots,M$$

VARIANCE OF INPUT WHITE NOISE $$\hat{\sigma}_v^2 = \hat{c}_x(0,0) + \sum_{k=1}^{M}\hat{a}(k)c_x(0,k)$$

POWER SPECTRUM $$S_{XX}(\omega) = |H_{AR}(\omega)|^2 S_w(\omega) = \frac{\sigma_v^2}{\left|1+\sum_{k=1}^{M}a(k)e^{-j\omega k}\right|^2}$$

$$S_w(\omega) = \sigma_v^2$$

POWER ↑
FREQUENCY (AZIMUTH ANGLE) → x(n): INPUT DATA
N: NUMBER OF DATA
M: AR MODEL ORDER
*: COMPLEX CONJUGATE

FIG. 14

|  |  | t (GROUP) | t (PREDICTION) | t − 1 |
|---|---|---|---|---|
| TARGET 1 | r |  |  |  |
|  | Long_d |  |  |  |
|  | Late_d |  |  |  |
|  | velo |  |  |  |
|  | f_up |  |  |  |
|  | AR_C_up |  |  |  |
|  | f_dwn |  |  |  |
|  | AR_C_dwn |  |  |  |
| TARGET 2 | r |  |  |  |
|  | Long_d |  |  |  |
|  | Late_d |  |  |  |
|  | velo |  |  |  |
|  | f_up |  |  |  |
|  | AR_C_up |  |  |  |
|  | f_dwn |  |  |  |
|  | AR_C_dwn |  |  |  |
| ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : ASCENDING PEAK FREQUENCY
AR_C_up : AR COEFFICIENT AT ASCENDING PEAK FREQUENCY
f_dwn : DESCENDING PEAK FREQUENCY
AR_C_dwn : AR COEFFICIENT AT DESCENDING PEAK FREQUENCY

FIG. 22

EXAMPLE) ORDER IS INCREASED TO 5

$$\hat{a} = -A^{\#}h = -V\begin{bmatrix} \Sigma^{-1} & 0 \\ 0 & 0 \end{bmatrix} U^{H}h \quad \Sigma^{-1} = diag(\sigma_1^{-1}, \sigma_2^{-1}, \ldots, \sigma_r^{-1})$$

r IS TREATED THROUGH WAVE NUMBER ESTIMATION

CALCULATED AR COEFFICIENT $\begin{bmatrix} \hat{a}_5(1) \\ \hat{a}_5(2) \\ \hat{a}_5(3) \\ \hat{a}_5(4) \\ \hat{a}_5(5) \end{bmatrix}$ $\begin{bmatrix} \hat{a}_5(1) \\ \hat{a}_5(2) \\ \hat{a}_5(3) \\ \hat{a}_5(4) \\ \hat{a}_5(5) \end{bmatrix}$ ...

PRESENT AR COEFFICIENT 1 a1(t)

PREVIOUS AR COEFFICIENT 1 a1(t-1)

Ave_a1(t)=k1* a1(t)+ k2*a1(t-1)+...+kn+1*a1(t-n)

AVERAGED AR COEFFICIENT 1

$\begin{bmatrix} \hat{a}_5(1) \\ \hat{a}_5(2) \\ \hat{a}_5(3) \\ \hat{a}_5(4) \\ \hat{a}_5(5) \end{bmatrix}$

AVERAGE (ADD) ELEMENTS OF AR COEFFICIENT VECTOR

FIG. 24

|  |  | t (GROUP) | t (PREDICTION) | t − 1 | t − 2 |
|---|---|---|---|---|---|
| TARGET 1 | r |  |  |  |  |
|  | Long_d |  |  |  |  |
|  | Late_d |  |  |  |  |
|  | velo |  |  |  |  |
|  | f_up |  |  |  |  |
|  | AR1_C_up |  |  |  |  |
|  | AR2_C_up |  |  |  |  |
|  | f_dwn |  |  |  |  |
|  | AR1_C_dwn |  |  |  |  |
|  | AR2_C_dwn |  |  |  |  |
| TARGET 2 | r |  |  |  |  |
|  | Long_d |  |  |  |  |
|  | Late_d |  |  |  |  |
|  | velo |  |  |  |  |
|  | f_up |  |  |  |  |
|  | AR1_C_up |  |  |  |  |
|  | AR2_C_up |  |  |  |  |
|  | f_dwn |  |  |  |  |
|  | AR1_C_dwn |  |  |  |  |
|  | AR2_C_dwn |  |  |  |  |
| ⋮ | ⋮ | ⋮ | ⋮ | ⋮ | ⋮ | r : DISTANCE
Long_d : LONGITUDINAL POSITION
Late_d : LATERAL POSITION
velo : RELATIVE VELOCITY
f_up : ASCENDING PEAK FREQUENCY
AR1_C_up : AR COEFFICIENT 1 AT ASCENDING PEAK FREQUENCY
AR2_C_up : AR COEFFICIENT 2 AT ASCENDING PEAK FREQUENCY
f_dwn : DESCENDING PEAK FREQUENCY
AR1_C_dwn : AR COEFFICIENT 1 AT DESCENDING PEAK FREQUENCY
AR2_C_dwn : AR COEFFICIENT 2 AT DESCENDING PEAK FREQUENCY

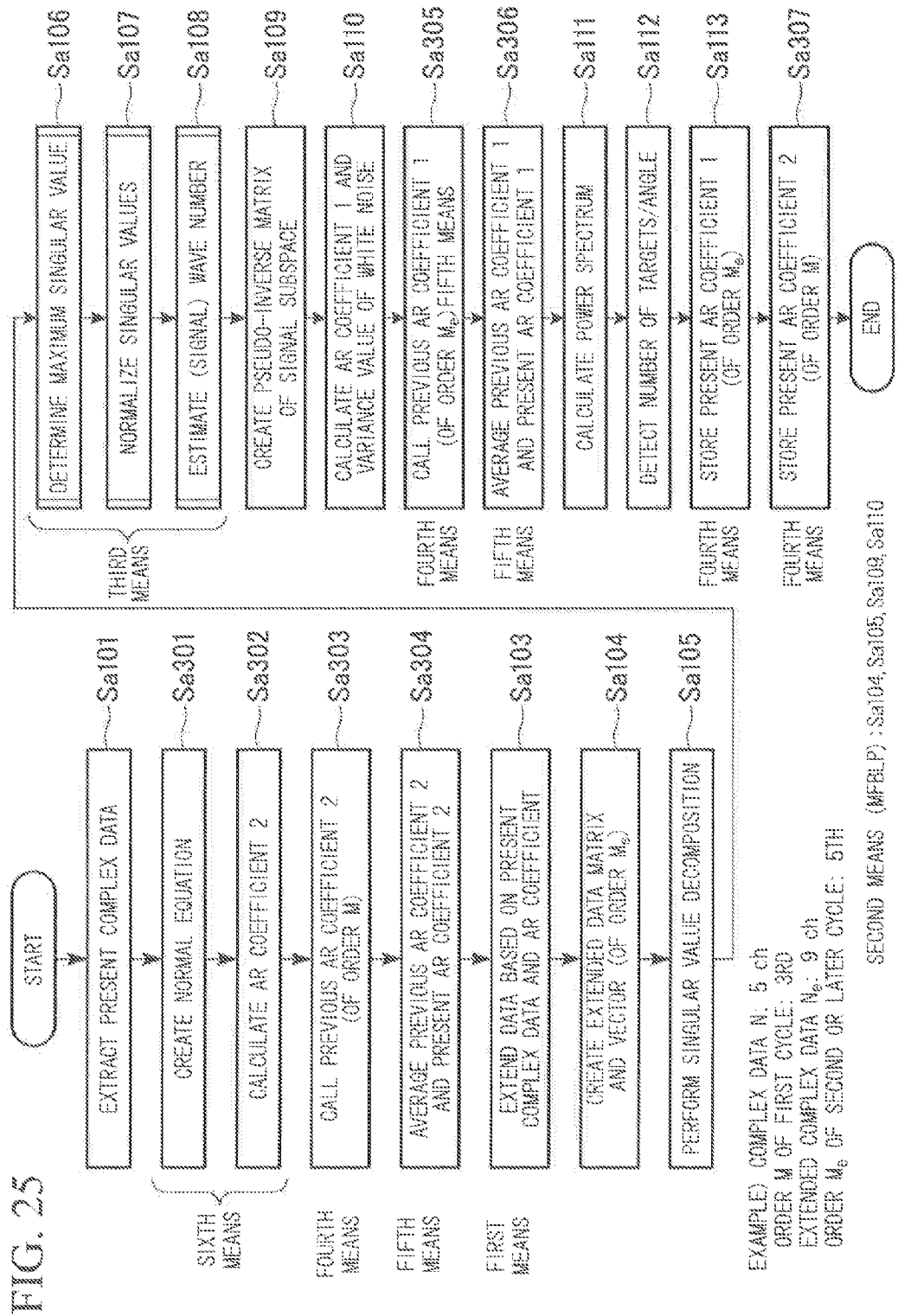

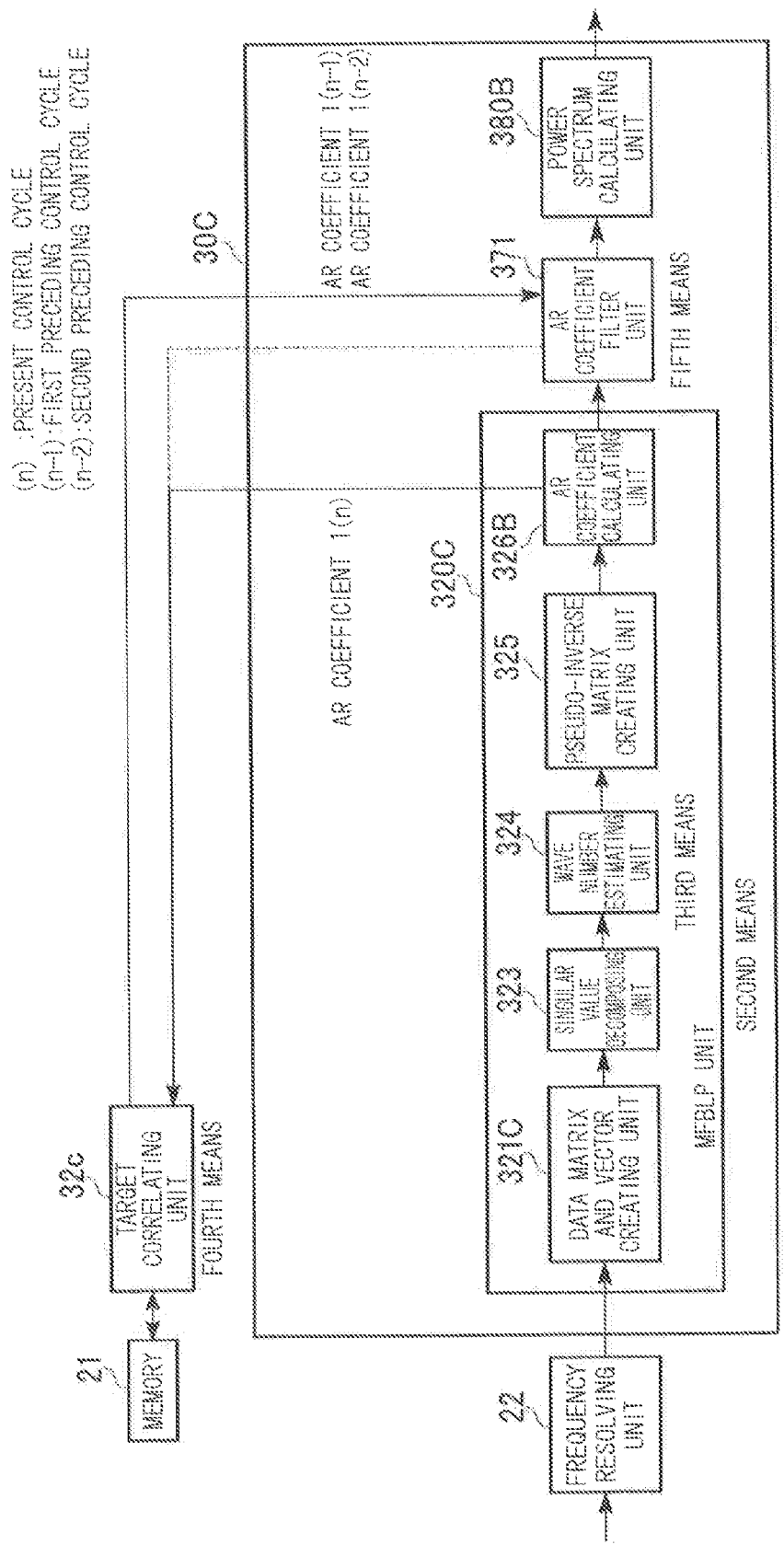

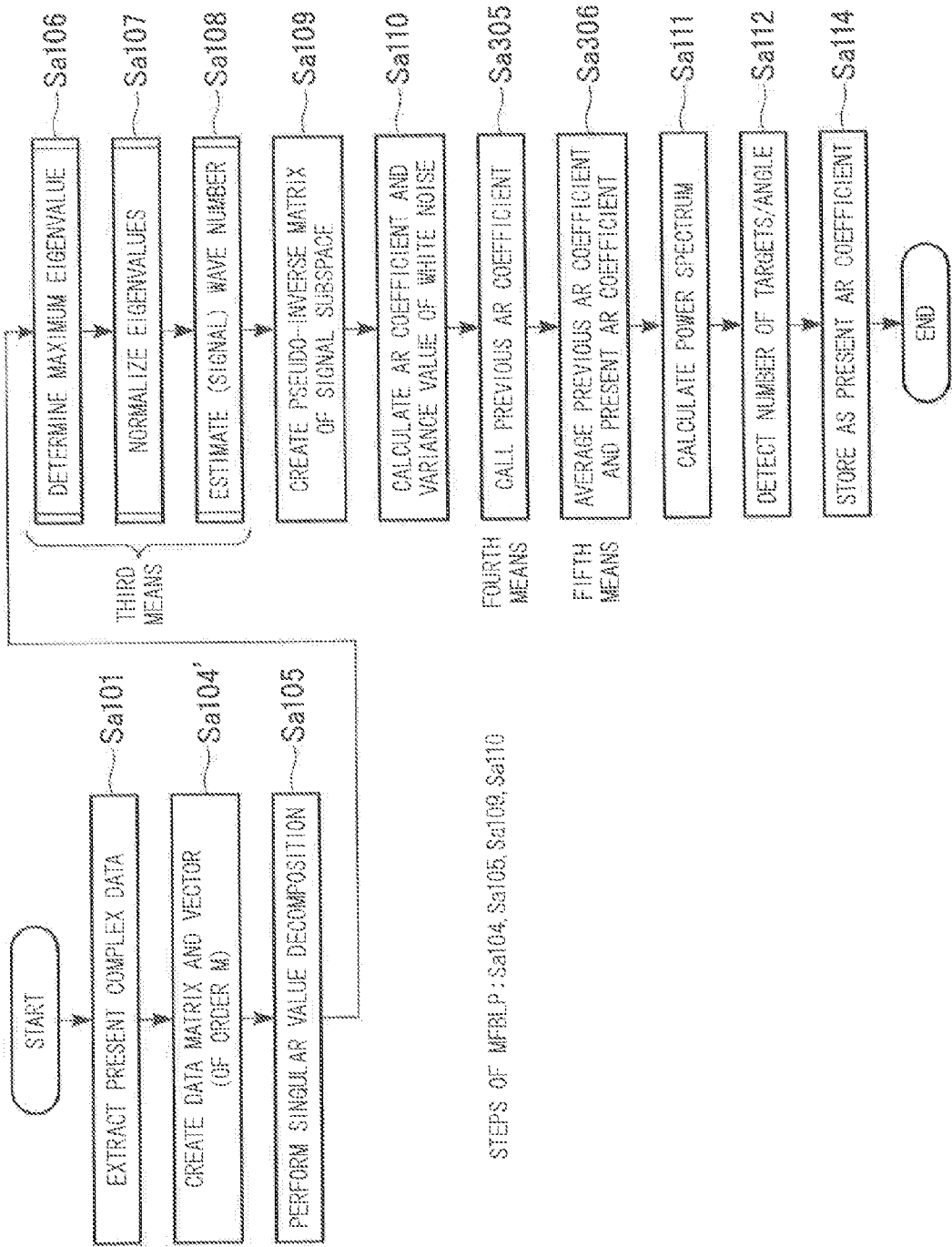

ASCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

DESCENDING

|  | ANGLE 1 | ANGLE 2 | ... | FREQUENCY POINT |
|---|---|---|---|---|
| TARGET GROUP 1 | $t_1\_ang_1$ | $t_1\_ang_2$ |  | $f_1$ |
| TARGET GROUP 2 | $t_2\_ang_1$ | $t_2\_ang_2$ |  | $f_2$ |
| TARGET GROUP 3 | $t_3\_ang_1$ | $t_3\_ang_2$ |  | $f_3$ |
| TARGET GROUP 4 | $t_4\_ang_1$ | $t_4\_ang_2$ |  | $f_4$ |
| ⋮ |  |  |  |  |

| TARGET GROUP No. | LONGITUDINAL DISTANCE | LONGITUDINAL POSITION | LATERAL POSITION | RELATIVE VELOCITY | FREQUENCY POINT |
|---|---|---|---|---|---|
| TARGET GROUP 1 | $r_1$ | $long\_d_1$ | $late\_d_1$ | $v_1$ | $f_1$ |
| TARGET GROUP 2 | $r_2$ | $long\_d_2$ | $late\_d_2$ | $v_2$ | $f_2$ |
| TARGET GROUP 3 | $r_3$ | $long\_d_3$ | $late\_d_3$ | $v_3$ | $f_3$ |
| TARGET GROUP 4 | $r_4$ | $long\_d_4$ | $late\_d_4$ | $v_4$ | $f_4$ |
| ⋮ | | | | | |

ELECTRONIC SCANNING RADAR APPARATUS, RECEIVED WAVE DIRECTION ESTIMATING METHOD, AND RECEIVED WAVE DIRECTION ESTIMATING PROGRAM

CROSS-REFERENCE TO RELATED APPLICATIONS

Priority is claimed on Japanese Patent Application No. 2011-22825, filed Feb. 4, 2011, the content of which is incorporated herein by reference.

BACKGROUND OF THE INVENTION

1. Field of the Invention

The present invention relates to an electronic scanning radar apparatus, a received wave direction estimating method, and a received wave direction estimating program used therein, which can detect a target using a reflected wave from a target in response to a transmitted wave and which can be suitably used for a vehicle.

2. Background Art

Electronic scanning type radars such as an FMCW (Frequency Modulated Continuous Wave) radar, a multi-frequency CW (Continuous Wave) radar, and a pulse radar have been known as an on-board radar for some time.

In the radars, an arrival wave direction estimating method of an array antenna is used as a technique of detecting the direction of an arrival wave (or a received wave) from a target (a reflecting object).

As such an arrival wave direction estimating method, high-resolution (high-accuracy) algorithms such as an AR spectrum estimating method (FIG. 34) and a MUSIC (MUltiple Signal Classification) method which can achieve a high resolution without increasing the number of channels of a receiving antenna have been used (see JP-A-2006-275840 (Patent Document 1), JP-A-2009-156582 (Patent Document 2), and JP-A-2009-162688 (Patent Document 3)). The AR spectrum estimating method may also be called a maximum entropy method (MEM) or a linear prediction method.

When the direction of an arrival wave from a target (a reflecting object) is estimated using such algorithms, the estimation process is performed after input data (data in which a noise component is mixed into a complex sinusoidal wave) expressed by a complex number is transformed into a matrix format such as a correlation matrix.

In a high-resolution arrival wave direction estimating method used in an on-board radar, a correlation matrix in a previous control cycle is stored and is subjected to an averaging process (or an adding process) with a correlation matrix in the present control cycle and then a direction estimating process is performed, in order to suppress a noise component and to improve estimation accuracy. This correlation matrix averaging process can provide a great effect for improvement in azimuth detection accuracy (angular accuracy or resolution) in an on-board radar having a small number of channels (Patent Document 2).

In the high-resolution algorithms, it is necessary to perform the estimation after setting an appropriate number of arrival waves (received waves) (the model order in the case of the AR spectrum estimating method) (Patent Document 3).

SUMMARY OF THE INVENTION

In the technique described in Patent Document 2, it is necessary to increase the number of correlation matrices to be averaged in order to enhance estimation accuracy. In order to increase the number of correlation matrices to be averaged, it is necessary to extend the period of time in which past correlation matrices are stored to increase the number of referring times of referring to the past correlation matrices or to increase the number of data acquisitions in a single control cycle. Regarding the amount of data, a correlation matrix created through a single data acquisition has a size of the number of data×the number of data and the amount of data to be computed increases with the increase in the number of data acquisitions. If the number of data acquisitions in a single control cycle increases, it means that the number of triangular waves to be output in the same control cycle increases in the case of the FMCW. In this manner, when the amount of data increases to enhance the estimation accuracy, there is a problem in that the computational load increases.

The AR spectrum estimating method is an algorithm with a relatively light computational load and can perform a plurality of azimuth estimating processes on a plurality of targets present in a distance direction, which is a technique suitable for an on-board radar. Compared with the MUSIC method, the AR spectrum estimating method has a merit that the estimation can be performed without sensitivity to the setting of the number of received waves (=model order) and has a tendency that the estimation accuracy is enhanced as the model order is increased.

However, in the AR spectrum estimating method, when the wave number of the received signal is much smaller with respect to the set order and a lot of noise components are included, there is a problem in that spurious peaks may be detected in spite of the enhancement in accuracy due to the averaging of the correlation matrices (normal equations).

In applications such as an on-board radar requiring a decrease in size and cost, there is a demand for constructing a receiving system with a smaller number of channels (CH). When a small number of channels (CH) is set, the settable order is limited. Even when the number of channels in the receiving system is increased, it is not possible to satisfy both the setting of a higher order and the setting suitable for the wave number of a received signal, in that the order can only be set in the AR spectrum estimating method (defined as a standard AR spectrum estimating method). The invention is made in consideration of these circumstances and an object thereof is to provide an electronic scanning radar apparatus, a received wave direction estimating method, and a received wave direction estimating program, which can detect an azimuth with enhanced detection accuracy without increasing the memory capacity for storing acquired data and the number of data acquisitions.

According to a first aspect of the invention, there is provided an electronic scanning radar apparatus mounted on a moving object, including: a receiver unit including a plurality of antennas receiving a received wave arriving from a target having reflected a transmitted wave; a beat signal generating unit configured to generate a beat signal from the transmitted wave and the received wave; a frequency resolving unit configured to resolve the beat signal into beat frequencies having a predetermined frequency bandwidth and to calculate complex data based on the beat signal resolved for each beat frequency; and an azimuth detecting unit configured to estimate a wave number of the received wave based on singular values calculated from a matrix created based on the complex data calculated based on the beat signal and to calculate a direction of arrival of the received wave based on coefficients calculated based on a pseudo-inverse matrix of the matrix included in a signal subspace determined by the estimated wave number.

In the electronic scanning radar apparatus, the azimuth detecting unit may include a first computation processing unit configured to calculate the coefficients based on the complex data calculated based on the beat signal, and the first computation processing unit may include a data matrix and data vector creating unit configured to create the matrix and a vector based on the complex data calculated based on the beat signal, a singular value decomposing unit configured to calculate the singular values by decomposing the created matrix in singular values, a wave number estimating unit configured to calculate an estimated wave number by estimating the wave number of the received wave based on the calculated singular values, a pseudo-inverse matrix calculating unit configured to calculate the pseudo-inverse matrix included in the signal subspace determined by the calculated estimated wave number, and a coefficient calculating unit configured to calculate the coefficients from the pseudo-inverse matrix of the signal subspace and the vector.

In the electronic scanning radar apparatus, the azimuth detecting unit may include a data extending unit configured to use the calculated complex data as original complex data and to generate extended complex data, the number of which is greater than that of the original complex data, and the data matrix and data vector creating unit may be configured to create the matrix and the vector having the extended complex data as elements.

In the electronic scanning radar apparatus, the data matrix and data vector creating unit may be configured to create an order-increased matrix and an order-increased vector of which the order is increased to a predetermined order as the matrix and the vector.

In the electronic scanning radar apparatus, the data matrix and data vector creating unit may be configured to create, as the matrix and the vector, a matrix and a vector in which an order based on the extended complex data is not increased, and the number of the extended complex data is increased.

In the electronic scanning radar apparatus, the azimuth detecting unit may be configured to generate the coefficients, based on which the extended complex data is generated, by the use of a normal equation created based on the original complex data.

In the electronic scanning radar apparatus, the azimuth detecting unit may further include a second computation processing unit configured to generate the coefficients, based on which the extended complex data is generated, by the use of the normal equation created based on the original complex data, and the data extending unit may be configured to generate the extended complex data by the use of a linear equation based on the original complex data and the coefficients.

In the electronic scanning radar apparatus, the coefficients may be calculated based on a linear equation expressing an autoregressive model in a spectrum estimating method using the autoregressive model.

In the electronic scanning radar apparatus, the data extending unit may be configured to generate the extended complex data based on the coefficients calculated in a present detection cycle out of detection cycles in which the process of calculating the direction of arrival of the received wave is repeatedly performed.

The electronic scanning radar apparatus may further include a storage unit configured to store information corresponding to the target in correlation with the number of the detection cycles, and the data extending unit may be configured to generate the extended complex data based on the coefficients which are stored in the storage unit as the information corresponding to the target and which are calculated in a previous detection cycle performed prior to the present detection cycle.

In the electronic scanning radar apparatus, the data extending unit may be configured to generate the extended complex data based on the original complex data calculated in the present detection cycle and the previous complex data stored in the storage unit as the information corresponding to the target and calculated in the previous detection cycle performed prior to the present detection cycle.

The electronic scanning radar apparatus may further include a target correlating unit configured to correlate targets detected in the present detection cycle and the previous detection cycle and to store the information corresponding to the correlated targets in the storage unit.

In the electronic scanning radar apparatus, the target correlating unit may be configured to correlate the targets detected in the present detection cycle and the previous detection cycle based on a distance and a relative velocity, or based on a distance, a relative velocity, and an azimuth.

In the electronic scanning radar apparatus, the azimuth detecting unit may further include a coefficient filter unit configured to average the coefficients which are information corresponding to the target.

In the electronic scanning radar apparatus, the coefficient filter unit may include a first coefficient filter unit configured to average the coefficients calculated by the first computation processing unit and corresponding to the target.

In the electronic scanning radar apparatus, the azimuth detecting unit may further include a second computation processing unit configured to generate the coefficients, based on which the extended complex data is generated, by the use of the normal equation created based on the original complex data, and the coefficient filter unit may include a second coefficient filter unit configured to average the coefficients calculated by the second computation processing unit and corresponding to the target.

The electronic scanning radar apparatus may further include a peak detecting unit configured to detect a peak value from intensity values of the beat frequencies to detect the presence of the target, and the azimuth detecting unit may be configured to calculate the direction of arrival of the received wave based on the complex data corresponding to the target of which the presence is detected by the peak detecting unit.

The electronic scanning radar apparatus may further include a DBF unit configured to detect the presence and the azimuth of the target through the use of a digital beam forming process of enhancing receiving sensitivity in a desired direction in which the received wave is received based on the complex data.

The electronic scanning radar apparatus may further include a DBF unit configured to detect the presence and the azimuth of the target through the use of a digital beam forming process of enhancing receiving sensitivity in a desired direction in which the received wave is received based on the complex data, and the peak detecting unit may be configured to detect the azimuth of the target based on the digital beam forming in the beat frequencies in the present detection cycle.

According to a second aspect of the invention, there is provided a received wave direction estimating method in an electronic scanning radar apparatus mounted on a moving object, including: a receiving step of causing a receiver unit to receive a received wave arriving from a target having reflected a transmitted wave through the use of a plurality of antennas; a beat signal generating step of causing a beat signal generating unit to generate a beat signal from the transmitted wave and the received wave; a frequency resolving step of causing a frequency resolving unit to resolve the beat signal into beat frequencies having a predetermined frequency bandwidth and to calculate complex data based on the beat signal resolved for each beat frequency; and an azimuth detecting step of estimating a wave number of the received wave based on singular values calculated from a matrix created based on the complex data calculated based on the beat signal and calculating a direction of arrival of the received wave based on coefficients calculated based on a pseudo-inverse matrix of the matrix included in a signal subspace determined by the estimated wave number.

According to a third aspect of the invention, there is provided a program causing a computer to perform a received wave direction estimating process in an electronic scanning radar apparatus mounted on a moving object, the received wave direction estimating process including: a receiving step of receiving a received wave arriving from a target having reflected a transmitted wave through the use of a plurality of antennas; a beat signal generating step of generating a beat signal from the transmitted wave and the received wave; a frequency resolving step of resolving the beat signal into beat frequencies having a predetermined frequency bandwidth and calculating complex data based on the beat signal resolved for each beat frequency; and an azimuth detecting step of estimating a wave number of the received wave based on singular values calculated from a matrix created based on the complex data calculated based on the beat signal and calculating a direction of arrival of the received wave based on coefficients calculated based on a pseudo-inverse matrix of the matrix included in a signal subspace determined by the estimated wave number.

As described above, according to the invention, the receiver unit includes a plurality of antennas receiving a received wave arriving from a target having reflected a transmitted wave. The beat signal generating unit generates a beat signal from the transmitted wave and the received wave. The frequency resolving unit resolves the beat signal into beat frequencies having a predetermined frequency bandwidth and calculates complex data based on the beat signal resolved for each beat frequency. The azimuth detecting unit estimates a wave number of the received wave based on singular values of a matrix created based on the complex data calculated based on the beat signal, generates coefficients based on a pseudo-inverse matrix of signal subspace components expressed by the signal subspace created based on the singular values corresponding to the estimated wave number, and calculates the direction of arrival of the received wave based on the created coefficients.

In this manner, the azimuth detecting unit estimates and determines the wave number of an arrival wave based on the singular values of the matrix created based on the complex data of detection beat frequencies which are the beat frequencies at which the presence of a target is detected. Since the azimuth detecting unit calculates the direction of arrival of the received wave based on the coefficients based on the pseudo-inverse matrix of the signal subspace created based on the singular values corresponding to the estimated wave number, it is possible to provide an electronic scanning radar apparatus and a received wave direction estimating program which can detect an azimuth with enhanced detection accuracy.

BRIEF DESCRIPTION OF THE DRAWINGS

FIG. 5 is a table illustrating a matrix of beat frequencies of an ascending region and a descending region in a peak combining unit 24 and intersections in the matrix, that is, distances, relative velocities, and peak levels in combinations of beat frequencies in the ascending region and the descending region.

FIG. 6 is a table illustrating a distance, a relative velocity, and a frequency point for each target of which a pair of peaks is fixed in the present detection cycle.

FIG. 10 is a diagram illustrating a process of extending complex data.

FIG. 11 is a diagram illustrating creation of a data matrix and a data vector in an MFBLP method and expression thereof using a pseudo-inverse matrix.

FIG. 13 is a diagram illustrating a computation process of calculating a variance value of white noise and a power spectrum from an AR coefficient a calculated from a pseudo-inverse matrix $A^{\#}$ of a signal subspace.

FIG. 14 is a diagram illustrating a table stored in a memory 21.

FIG. 22 is a diagram illustrating a process of averaging AR coefficients in an MFBLP method.

FIG. 24 is a diagram illustrating a table stored in a memory 21.

FIG. 25 is a flowchart illustrating the flow of processes in the third embodiment.

FIG. 26 is a block diagram illustrating the constitution of an azimuth detecting unit according to a fourth embodiment of the invention.

FIG. 27 is a flowchart illustrating the flow of processes in the fourth embodiment.

DETAILED DESCRIPTION OF THE INVENTION

<AR Spectrum Estimation>

First, an AR spectrum estimating method applied to embodiments of the invention will be described below.

A standard AR spectral estimation method will be first described. An AR spectrum estimating method is known as a spectrum estimating method of estimating a spectrum like a MUSIC method and is a method of performing an estimation process using an AR model (AutoRegressive model). The AR spectrum estimating method is classified into a parametric method if the MUSIC method is classified into a subspace method. The AR spectrum estimating method may also be called a maximum entropy method or a linear prediction method.

Figure 34:
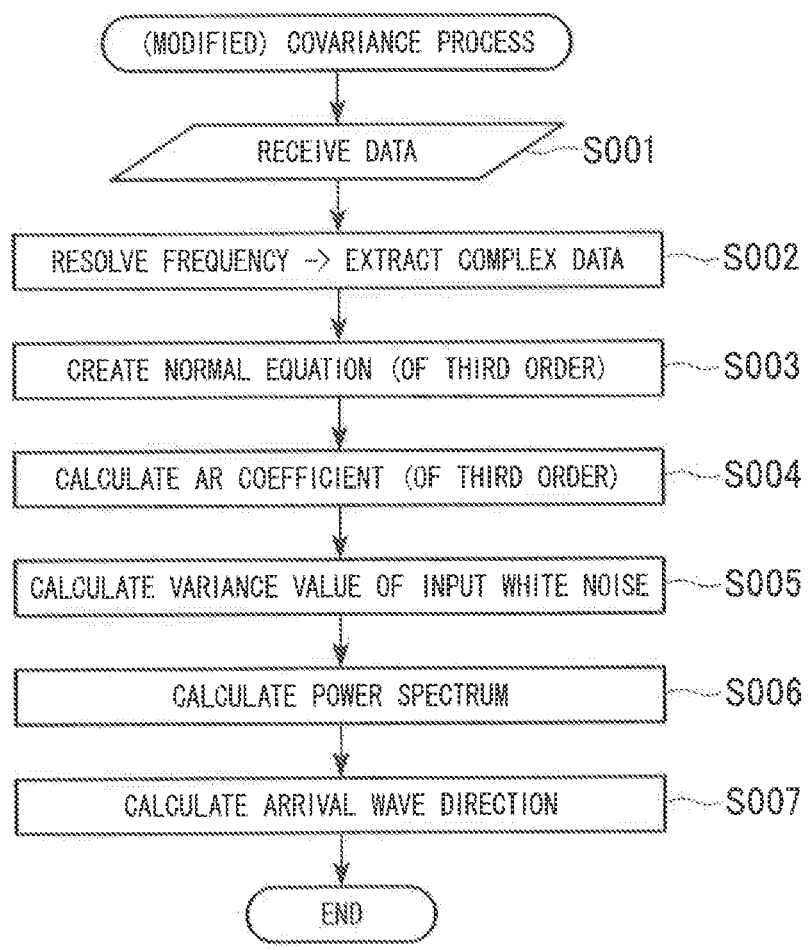
FIG. 34 is a diagram illustrating an AR spectrum estimating process according to the background art.

In the AR spectrum estimating method, first, an object is modeled using an AR model expressed by a linear equation and a normal equation (which includes a matrix referred to as an autocorrelation matrix or a covariance matrix and a vector referred to as a right-hand vector or a cross-correlation vector) which is a linear equation based on input data is created. The coefficients of an AR filter (AR coefficients) and the variance values of input white noise are calculated based on the normal equation and then a power spectrum is calculated and estimated using the AR coefficients and the variance values of input white noise (see FIG. 34). Channel data in spatial directions like radars in the below-described embodiments as well as time-series data can be used as the input data. The AR spectrum estimating method is roughly classified into a method using an autocorrelation matrix and a method using a covariance matrix. Examples of the method using an autocorrelation matrix include an autocorrelation method (or a Yule-Walker method) and a Burg method. Examples of the method using a covariance matrix include a covariance method and a modified covariance method. The modified covariance method is also referred to as a forward and backward linear prediction method (FBLP method).

Since the AR spectrum estimating method (hereinafter, referred to as a "standard AR spectrum estimating method") does not perform the eigenvalue decomposition, it has a relatively light computational load.

In the AR spectrum estimating method used in the below-described embodiments, a detected signal is decomposed into a signal subspace and a noise subspace and then a detection process is performed. In the AR spectrum estimating method, by extracting the signal subspace, the detection characteristics in the spectrum estimating process can be adapted to the wave number of received signal waves even when the order of an AR model is fixed.

In this AR spectrum estimating method, an MFBLP method (Modified Forward and Backward Linear Prediction method) expressed by a data column used in a standard modified covariance method (covariance method) is applied (see Reference Document: Tufts, Kumaresan, "Estimation of Frequencies of Multiple Sinusoids: Making Linear Prediction Perform Like Maximum Likelihood", Proceedings of the IEEE Vol. 70, No. 9, September 1982). The MFBLP method is a method in which a parametric method and a subspace method are combined.

By applying the MFBLP method to the AR spectrum estimating method, singular values are directly decomposed from a data matrix and a data vector and a pseudo-inverse matrix is calculated without creating a covariance matrix and a right-hand vector.

The signal subspace is extracted by creating a pseudo-inverse matrix of the matrix included in the signal subspace.

In this manner, the AR spectrum estimating method described in the following embodiments can reduce the generation of a spurious peak even when the wave number of received signal waves is smaller with respect to a set order and the noise component is large. Accordingly, it is possible to raise the order so as to enhance the estimation accuracy in the AR spectrum estimation.

First Embodiment

Hereinafter, an electronic scanning radar apparatus 100 (FMCW millimeter wave radar) according to a first embodiment of the invention will be described with reference to the accompanying drawings. The electronic scanning radar apparatus 100 is mounted on a moving object such as a vehicle.

Figure 1:
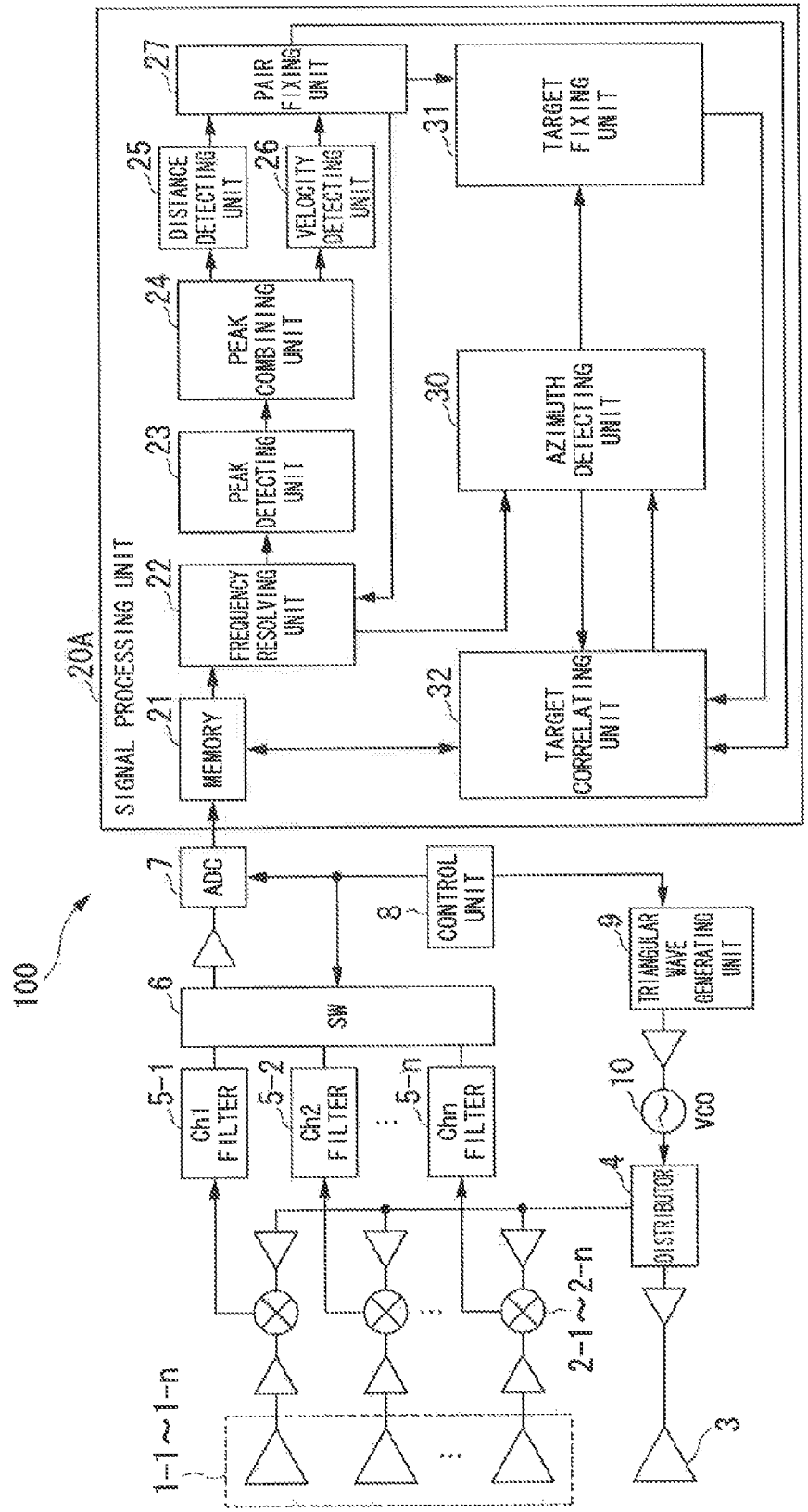
FIG. 1 is a block diagram illustrating the constitution of an electronic scanning radar apparatus according to a first embodiment of the invention.

FIG. 1 is a block diagram illustrating the constitution of the electronic scanning radar apparatus 100 according to the first embodiment.

In the drawing, the electronic scanning radar apparatus 100 according to the first embodiment includes receiving antennas 1-1 to 1-$n$, mixers 2-1 to 2-$n$, a transmitting antenna 3, a distributor 4, filters 5-1 to 5-$n$, a SW (switch) 6, an ADC (A/D converter) 7, a control unit 8, a triangular wave generating unit 9, a VCO 10, and a signal processing unit 20A.

The signal processing unit 20A includes a memory 21, a frequency resolving unit 22, a peak detecting unit 23, a peak combining unit 24, a distance detecting unit 25, a velocity detecting unit 26, a pair fixing unit 27, an azimuth detecting unit 30, a target fixing unit 31, and a target correlating unit 32.

The operation of the electronic scanning radar apparatus 100 according to the first embodiment will be described below with reference to FIG. 1.

The receiving antennas 1-1 to 1-$n$ receive a reflected wave arriving from a target by causing a transmitted wave to be reflected by the target, that is, a received wave.

The mixers 2-1 to 2-$n$ mix signals acquired by amplifying the transmitted wave transmitted from the transmitting antenna 3 and the received wave received by the receiving antennas 1-1 to 1-$n$ through the use of an amplifier and generate beat signals corresponding to frequency differences.

The transmitting antenna 3 transmits a transmission signal, which is acquired by frequency-modulating a triangular wave signal generated by the triangular wave generating unit 9 by the use of the VCO (Voltage-Controlled Oscillator) 10, to a target as the transmitted wave.

The distributor 4 distributes the frequency-modulated transmission signal from the VCO 10 to the mixers 2-1 to 2-$n$ and the transmitting antenna 3.

The filters 5-1 to 5-$n$ limit bands of the beat signals of Ch1 to Chn, which are generated by the mixers 2-1 to 2-$n$, corresponding to the receiving antennas 1-1 to 1-$n$ and output the band-limited beat signals to the SW (switch) 6.

The SW 6 sequentially switches the beat signals of Ch1 to Chn, which have passed through the filters 5-1 to 5-$n$, corresponding to the receiving antennas 1-1 to 1-$n$ and outputs the switched beat signals to the ADC (A/D converter) 7, in response to a sampling signal input from the control unit 8.

The ADC 7 A/D-converts the beat signals of Ch1 to Chn, which are input from the SW 6 in synchronization with the sampling signal, corresponding to the receiving antennas 1-1 to 1-$n$ into digital signals in synchronization with the sampling signal and sequentially stores the digital signals in a waveform storage area of the memory 21 in the signal processing unit 20.

The control unit 8 is constructed by a microcomputer or the like and controls the entire electronic scanning radar apparatus 100 shown in FIG. 1 based on a control program stored in a ROM (not shown) or the like.

<Principle of Detecting Distance, Relative Velocity, Angle (Azimuth)>

The principle of detecting a distance, a relative velocity, and an angle (azimuth), which are used in the signal processing unit 20A according to the first embodiment, between the electronic scanning radar apparatus 100 and a target will be described in brief below with reference to the accompanying drawings.

Figure 2A:
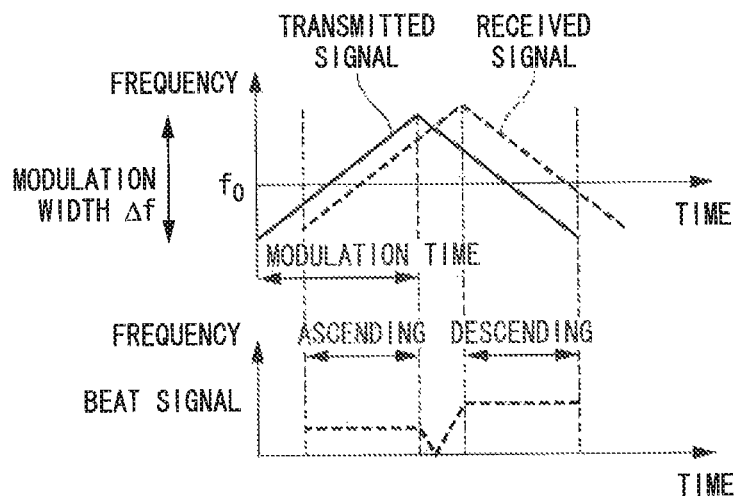
FIGS. 2A and 2B are diagrams illustrating a state where a transmitted signal and a received signal reflected from a target are input.
Figure 2B:
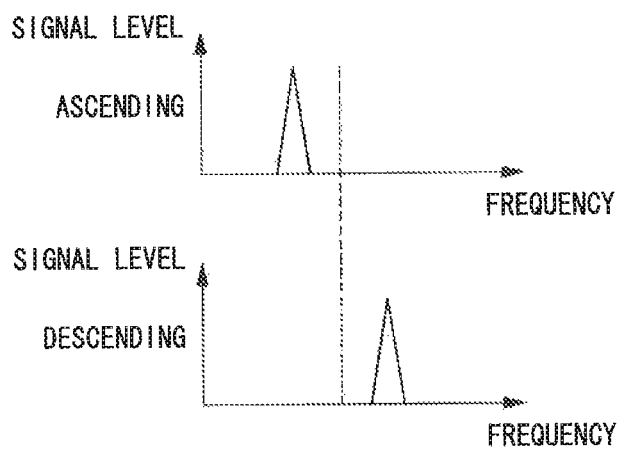

FIGS. 2A and 2B are diagrams illustrating a state in which a transmitted signal and a received signal reflected from a target are input.

The signals shown in the drawings are a transmitted signal acquired by frequency-modulating a signal generated by the triangular wave generating unit 9 shown in FIG. 1 by the use of the VCO 10 and a received signal received by causing the transmitted signal to be reflected by the target. In the example shown in the drawings, the number of targets is one.

As can be seen from FIG. 2A, the received signal which is a reflected wave from the target is received with a delay in a right-hand direction (time delay direction) with respect to the transmitted signal in proportion to the distance from the target. The received signal is shifted with respect to the transmitted signal in the vertical direction (frequency direction) in proportion to the relative velocity to the target. When the beat signals acquired in FIG. 2A are frequency-transformed (through the use of a Fourier transform (FFT), a DTC, a Hadamard transform, a wavelet transform, or the like), one peak value is generated in each of an ascending region and a descending region in the case of a single target, as shown in FIG. 2. In FIG. 2A, the horizontal axis represents the frequency and the vertical axis represents the intensity.

The frequency resolving unit 22 performs frequency-resolution on sampled data of the beat signals stored in the memory 21 in the ascending part (ascending) and the descending part (descending) of the triangular wave at discrete times and performs frequency transform, for example, through the use of the Fourier transform. That is, the frequency resolving unit 22 resolves the beat signals into beat frequencies having a predetermined frequency bandwidth and calculates complex data based on the beat signals resolved for each beat frequency.

As a result, as shown in FIG. 2B, a graph of signal levels for the resolved beat frequencies in the ascending region and the descending region is obtained.

The peak detecting unit 23 detects the peak value from the signal level for each beat frequency shown in FIG. 2B to detect the presence of a target and outputs the beat frequency (both the ascending part and the descending part) of the peak value as a target frequency.

The distance detecting unit 25 calculates the distance r through the use of the following equation based on the target frequency fu of the ascending part and the target frequency fd of the descending part input from the peak combining unit 24. In the equation, "·" represents a multiplication.

$$r = \{C \cdot T/(2 \cdot \Delta f)\} \cdot \{(fu+fd)/2\}$$

The velocity detecting unit 26 calculates the relative velocity v through the use of the following equation based on the target frequency fu of the ascending part and the target frequency fd of the descending part input from the peak combining unit 24.

$$v = \{C/(2 \cdot f0)\} \cdot \{(fu-fd)/2\}$$

In the equations used to calculate the distance r and the relative velocity v, C represents the light speed, $\Delta f$ represents the frequency modulation width of a triangular wave, f0 represents the central frequency of the triangular wave, T represents the modulation time (ascending part/descending part), fu represents the target frequency of the ascending part, and fd represents the target frequency of the descending part.

The receiving antennas 1-1 to 1-$n$ in the first embodiment will be described below.

Figure 3:
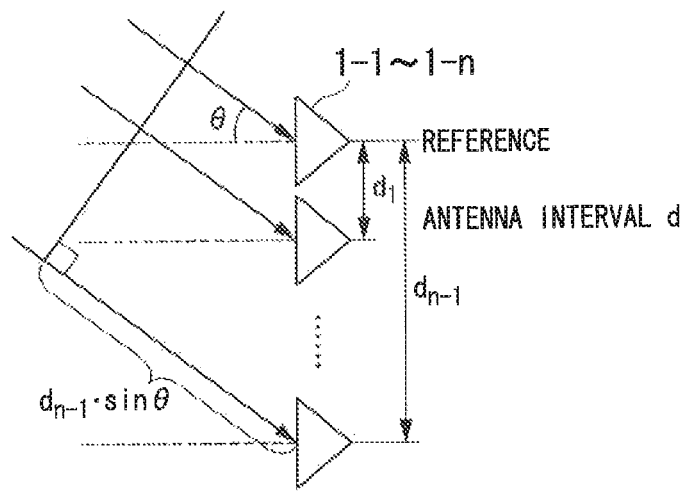
FIG. 3 is a conceptual diagram illustrating received waves in receiving antennas.

FIG. 3 is a conceptual diagram illustrating the received wave in the receiving antennas.

As shown in the drawing, the receiving antennas 1-1 to 1-$n$ are arranged in an array at intervals d. An arrival wave from a target (an incident wave, that is, a reflected wave from the target in response to the transmitted wave transmitted from the transmitting antenna 3) is incident on the receiving antennas 1-1 to 1-$n$ from the direction of angle θ about the axis perpendicular to the plane in which the antennas are arranged. At this time, the arrival wave is received at the same angle by the receiving antennas 1-1 to 1-$n$. A phase difference "$d_{n-1}$ sin θ" calculated by the same angle, for example, the angle θ, and the interval d between the antennas appears between the adjacent receiving antennas.

The angle θ can be detected through the use of a signal process such as a digital beam forming (DBF) or a high-resolution algorithm of additionally Fourier-transforming the values, which are subjected to the frequency resolution in the time direction for each antenna, in the antenna direction using the phase difference.

<Signal Process on Received Wave in Signal Processing Unit 20A>

The signal process on a received wave in the signal processing unit 20A will be described below.

The memory 21 includes a waveform storage area. The memory 21 stores the time-series data (the ascending part and the descending part) of the received signal, which is subjected to the A/D conversion by the ADC 7, in the waveform storage area in correlation with the receiving antennas 1-1 to 1-$n$. For example, when 256 pieces of data are sampled from each of the ascending part and the descending part, data pieces of 2×256×antenna number are stored in the waveform storage area.

The frequency resolving unit 22 transforms the beat signals corresponding to the channels Ch1 to Chn (the antennas 1-1 to 1-$n$) into frequency components with a predetermined resolution, for example, through the use of the Fourier transform and thus outputs frequency points indicating the beat frequencies and complex data of the beat frequencies. For example, when each of the ascending part and the descending part of each antenna has 256 sampled data pieces, the frequency resolving unit 22 transforms the data pieces in the beat frequencies as complex frequency-domain data for each antenna, and generates 128 pieces of complex data for each of the ascending part and the descending part (data pieces of 2×128×antenna number). The beat frequencies are indicated by the frequency points.

Here, a phase difference based on the angle θ exists between the complex data pieces for the antennas. The absolute values (receiving intensities or amplitudes) of the complex data pieces in the complex plane are equivalent to each other.

The peak detecting unit 23 detects the beat frequencies having a peak value greater than a predetermined value from the peaks of the signal intensities (or amplitudes) using the peak values of the intensities in the ascending region and the descending region of the triangular wave of the frequency-transformed beat frequencies and the complex data. Accordingly, the presence of a target for each beat frequency is detected and the target frequency is selected.

Therefore, the peak detecting unit 23 can detect the peak value of the spectrum as the presence of a target depending on the beat frequency, that is, the distance, by converting the complex data for any one antenna or the sum of the complex data of all the antennas into a frequency spectrum. By adding the complex data of all the antennas, the noise components are averaged and the S/N ratio is thus improved.

Figure 4:
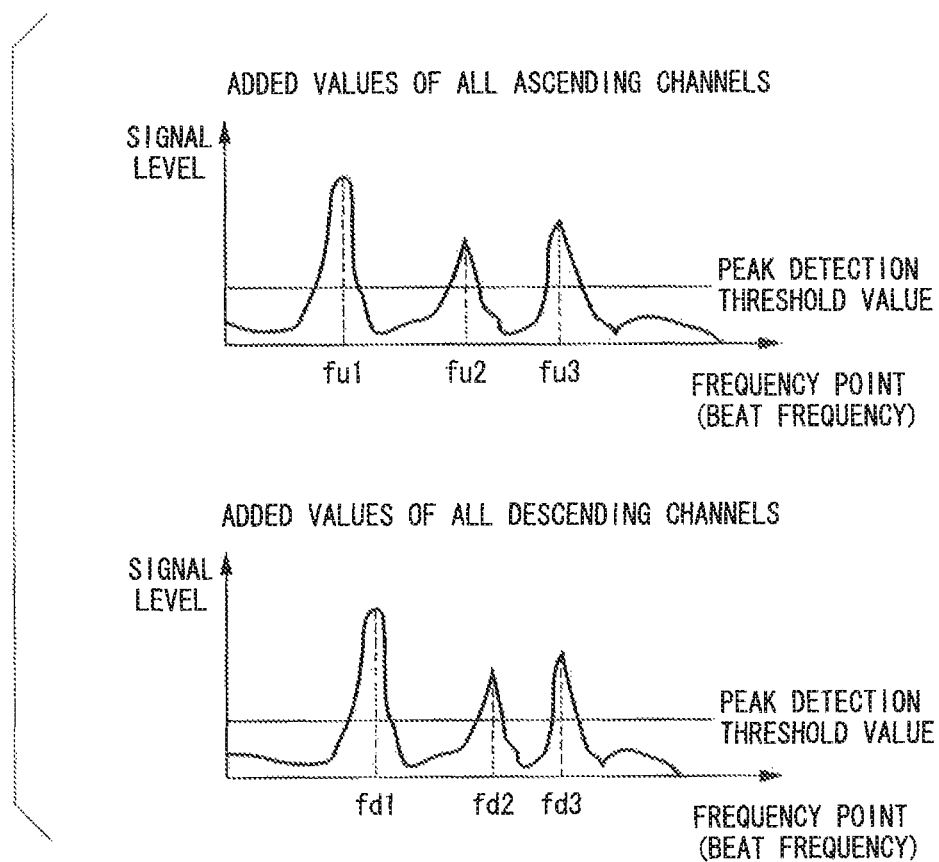
FIG. 4 is a graph illustrating the result of frequency resolving of a beat signal, where beat frequencies (horizontal axis) and peak values (vertical axis) thereof are shown.

The peak combining unit 24 combines all the beat frequencies of the ascending region and the descending region and the peak values thereof in a matrix shape based on the beat frequencies and the peak values thereof input from the peak detecting unit 23 and shown in FIG. 4, that is, combines all the beat frequencies of the ascending region and the descending region, and sequentially outputs the combinations to the distance detecting unit 25 and the velocity detecting unit 26. In FIG. 4, the horizontal axis represents the frequency point of the beat frequency and the vertical axis represents the signal level (intensity).

The distance detecting unit 25 calculates the distance r from the target based on the values obtained by adding the beat frequencies of the combinations of the ascending region and the descending region sequentially input thereto.

The velocity detecting unit 26 calculates the relative velocity v to the target based on the difference between the beat frequencies of the combinations of the ascending region and the descending region sequentially input thereto.

The pair fixing unit 27 creates a table shown in FIG. 5 based on the input distance r, the input relative velocity v, and the input peak levels pu and pd of the ascending region and the descending region, determines a suitable combination of the peaks of the ascending region and the descending region for each target, fixes the pair of the peaks of the ascending region and the descending region using a table shown in FIG. 6, and outputs a target group number indicating the fixed distance r and the fixed relative velocity v to the target fixing unit 31. The pair fixing unit sends the frequency point in which the pair is fixed to the frequency resolving unit 22 and determines the complex data to be sent to the azimuth detecting unit 30. In FIG. 6, the distance, the relative velocity, and the frequency points (the ascending region or the descending region) are stored in correlation with the target group number. The tables shown in FIGS. 5 and 6 are stored in an internal storage unit of the pair fixing unit 27. Here, since the directions of the respective target groups are not determined, the positions in the lateral direction parallel to the arrangement direction of the receiving antennas 1-1 to 1-n with respect to the axis perpendicular to the arrangement direction of the antenna array in the electronic scanning radar apparatus 100 are not determined.

Here, the pair fixing unit 27 may employ a method of selecting the combination of the target groups preferentially using the values predicted in the present detection cycle out of the distances r and the relative velocities v from and to the targets, which are finally fixed, for example, in the previous detection cycle.

The target fixing unit 31 correlates the distances r, the relative velocities, and the frequency points shown in FIG. 6 and input from the pair fixing unit 27 with the azimuth of the target detected by the azimuth detecting unit 30 and then outputs the correlation result to the target correlating unit 32.

The target correlating unit 32 correlates the target with the targets in the previous detection cycle stored in the memory 21 and then outputs the AR coefficients recorded in the previous detection cycle (FIG. 8) for each target to the azimuth detecting unit 30.

The target correlating unit 32 adds identification information of the distance, the relative velocity, and the azimuth output from the target fixing unit 31 to the AR coefficients calculated in the present detection cycle (FIG. 8) and records the result in the memory 21.

The azimuth detecting unit 30 performs the spectrum estimating process using the AR spectrum estimating method as a high-resolution algorithm to detect the azimuth of the corresponding target based on the result of the spectrum estimating process, and outputs the detected azimuth to the target fixing unit 31.

The azimuth detecting unit 30 generates extended complex data of which the number of data is extended as the complex data calculated based on the beat signals. The azimuth detecting unit 30 estimates the wave number of the received waves based on the singular values of the data matrix having the extended complex data as elements. The azimuth detecting unit 30 generates the AR coefficients based on the pseudo-inverse matrix of a signal subspace expressed by the signal subspace created based on the number of singular values corresponding to the estimated wave number, and calculates the direction of arrival of the received waves based on the generated AR coefficients.

The extended complex data generated by the azimuth detecting unit 30 are generated based on the AR coefficients calculated based on the complex data acquired in the present detection cycle, the AR coefficients calculated in the present detection cycle, and the beat signals acquired in the previous detection cycle.

The target fixing unit 31 correlates the distances r, the relative velocities v, and the frequency points shown in FIG. 6 and input from the pair fixing unit 27 with the azimuth of the target detected by the azimuth detecting unit 30, and fixes and outputs the present state.

The constitution in which the AR spectrum estimating method known as a high-resolution algorithm is used for the spectrum estimating process will be described below in more detail.

Figure 7:
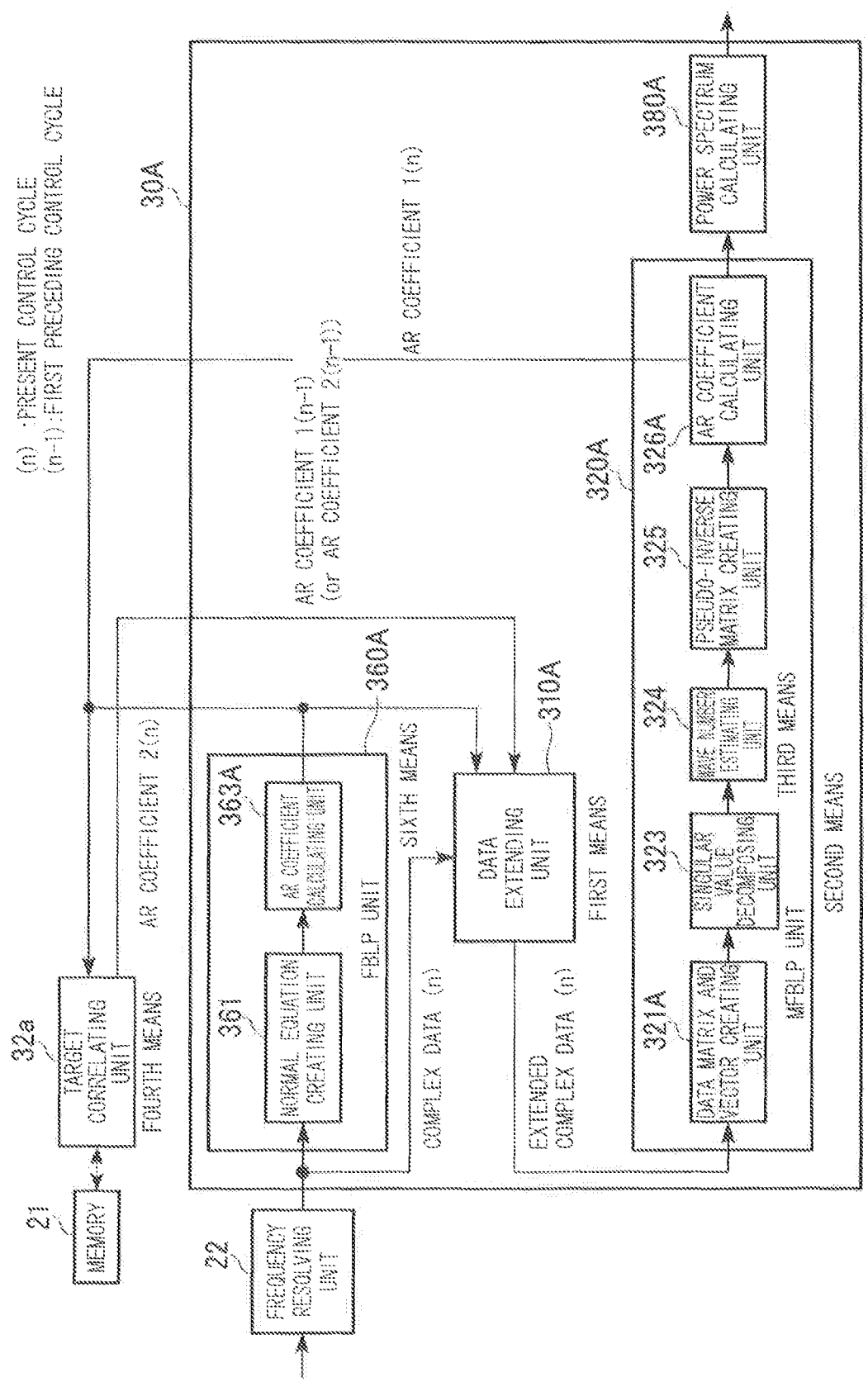
FIG. 7 is a block diagram illustrating the constitution of an azimuth detecting unit according to the first embodiment.

FIG. 7 is a block diagram illustrating the constitution of the azimuth detecting unit 30A in the first embodiment.

The azimuth detecting unit 30A and the target correlating unit 32a shown in FIG. 7 are examples of the azimuth detecting unit 30 and the target correlating unit 32 shown in FIG. 1.

The azimuth detecting unit 30A includes a data extending unit 310A, an MFBLP unit 320A, an FBLP unit 360A, and a power spectrum calculating unit 380A.

The data extending unit 310A generates extended complex data of which the number of data is extended from the complex data acquired in the present detection cycle out of detection cycles in which the process of calculating the direction of arrival of a received wave is repeatedly performed and the AR coefficients calculated in the previous detection cycle.

The complex data (n) acquired in the present detection cycle are complex data corresponding to the beat frequencies (one or both of the ascending and the descending) resolved in frequencies by the frequency resolving unit 22.

The AR coefficients (n−1) used in the data extending unit 310A are calculated in the previous control cycle by the MFBLP unit 320A to be described later. When the AR coefficients calculated in the present control cycle by the MFBLP unit 320A are defined as AR coefficient 1(n), the AR coefficients calculated in the previous (first preceding) control cycle is defined as AR coefficient 1(n−1).

The data extending unit 310A generates extended complex data (n) of which the number of data is extended from the complex data acquired in the present detection cycle out of detection cycles in which the process of calculating the direction of arrival of a received wave is repeatedly performed, the AR coefficients calculated in the present detection cycle, and the AR coefficients calculated in the previous detection cycle.

The data extending unit 310A raises the order from a secondary order (M) based on the original complex data (n) to be extended and generates the extended complex data.

In the control cycle of a target which is newly (first) detected, the AR coefficients used in the data extending unit 310A are calculated in the control cycle in which the target is newly detected by the FBLP unit 360 to be described later. When the AR coefficients calculated in the control cycle in which a target is newly detected by the FBLP unit 360 are defined as AR coefficient 2(n), the AR coefficients calculated in the (second) control cycle subsequent to the control cycle in which the target is newly detected are defined as AR coefficient 2(n−1) (where n is 2) and is read in the second control cycle.

The data extending unit 310A extends data based on AR coefficient 2(n) (where n=1) generated by the FBLP unit 360A in the detection cycle in which a target is newly detected, based on coefficients obtained by replacing AR coefficient 2(n) with AR coefficient 2(n−1) in the second detection cycle, and based on AR coefficient 1(n−1) generated by the MFBLP unit 320A in the third or subsequent detection cycle.

The MFBLP unit 320A (first computation processing unit) calculates the primary order AR coefficient (AR coefficient 1(n)) and the variance value of white noise based on a data matrix and a data vector created from the extended complex data (n).

The MFBLP unit 320A includes a data matrix and vector creating unit 321A, a singular value decomposing unit 323, a wave number estimating unit 324, a pseudo-inverse matrix calculating unit 325, and an AR coefficient calculating unit 326A.

The data matrix and vector creating unit 321A creates a data matrix and a data vector derived from the extended complex data to which complex data is extended by the data extending unit 310A in the "present detection cycle".

The singular value decomposing unit 323 performs a singular value decomposing process based on the data matrix derived in the "present detection cycle" and calculates singular values.

The wave number estimating unit 324 determines the singular value indicating the maximum value from the singular values calculated through the singular value decomposing process in the singular value decomposing unit 323. The wave number estimating unit 324 normalizes the calculated singular values based on the maximum value of the calculated singular values. The wave number estimating unit 324 determines the normalized singular values based on a predetermined threshold value and selects the wave number to be processed in the subsequent steps based on the determination result.

The pseudo-inverse matrix calculating unit 325 creates a pseudo-inverse matrix of a signal subspace determined depending on the wave number determined by the wave number estimating unit 324 from the singular values calculated by the singular value decomposing unit 323. By creating the pseudo-inverse matrix of the signal subspace depending on the wave number determined by the wave number estimating unit 324, it is possible to remove noise components.

The AR coefficient calculating unit 326A calculates the pseudo-inverse matrix of the signal subspace created by the pseudo-inverse matrix calculating unit 325, the data matrix derived in the "present detection cycle" by the data matrix and vector creating unit 321A, the AR coefficients, and the variance $\sigma^2$ of input white noise.

In this manner, the AR coefficient calculating unit 326A can derive the AR coefficients based on the complex data of the detection beat frequency which is a beat frequency at which the presence of a target is detected and the variance $\sigma^2$ of input white noise for each detection cycle. The AR coefficient calculating unit 326A outputs the derived AR coefficients (AR coefficient 1(n)) and the variance $\sigma^2$ of input white noise to the power spectrum calculating unit 380A. The AR coefficient calculating unit 326A outputs the derived AR coefficient 1(n) to the target correlating unit 32a.

The power spectrum calculating unit 380A calculates the direction of arrival of the received wave from the power spectrum derived based on the AR coefficient 1(n) and the variance $\sigma^2$ of input white noise.

The FBLP unit 360A (second computation processing unit) calculates secondary order AR coefficients (AR coefficient 2(n)) based on the normal equation created from the complex data (n).

The FBLP unit 360A includes a normal equation creating unit 361 and an AR coefficient calculating unit 363A.

The normal equation creating unit 361 creates a secondary order normal equation used in the AR spectrum estimation, which is derived from the respective pieces of complex data corresponding to the beat frequencies (one or both of the ascending and the descending) resolved in frequency by the frequency resolving unit 22.

The AR coefficient calculating unit 363A calculates the secondary order AR coefficients (AR coefficient 2(n)) derived from the secondary order normal equation in the "present detection cycle" created by the normal equation creating unit 361. In this manner, the AR coefficient calculating unit 363A acquires the secondary order AR coefficients calculated based on the complex data corresponding to the beat frequencies based on the received wave detected in the present detection cycle and sets the acquired AR coefficients as the coefficients used to extend data in the subsequent step.

The AR coefficient calculating unit 363A outputs the derived AR coefficients (AR coefficient 2(n)) to the target correlating unit 32a.

In the first embodiment, the data extending unit 310A serves as first means. The data matrix and vector creating unit 321A, the singular value decomposing unit 323, the pseudo-inverse matrix calculating unit 325, and the AR coefficient calculating unit 326A serve as second means. The wave number estimating unit 324 serves as third means. The target correlating unit 32a serves as fourth means. The FBLP unit 360 serves as sixth means.

Figure 8:
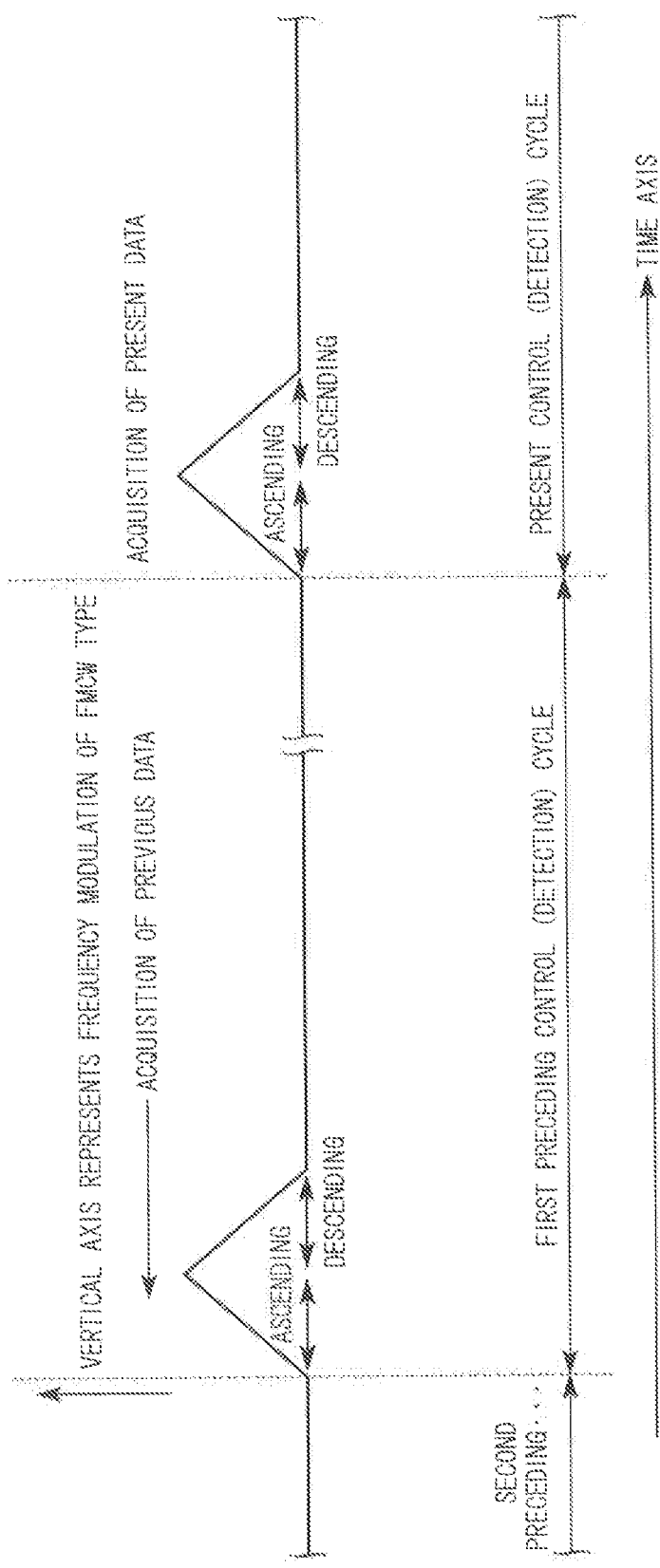
FIG. 8 is a timing diagram illustrating a data acquiring process in detection cycles.

FIG. 8 is a timing diagram illustrating the data acquiring process in detection cycles.

FIG. 8 shows previous control (detection) cycles in the past previous to the present control (detection) cycle.

In each cycle, at least one data acquisition is performed and one data acquisition is indicated by a triangular waveform. The triangular waveform represents a signal modulated through the FMCW method, and the ascending at the ascending time to the right hand and the descending at the descending time to the right hand are detected.

The control (detection) cycle in which data is presently acquired is referred to as a "present control (detection) cycle" and the control (detection) cycle in which data was acquired previous to the "present control (detection) cycle" is referred to as "previous control (detection) cycle".

<Principle of Creating Normal Equation Using AR Model>

The modified covariance method (forward and backward linear prediction method) will be described in detail below as an example of a normal equation creating process using an AR model.

A normal equation using a covariance matrix is expressed by Equations (1).

$$C_{xx} a = -c_{xx} \quad (1)$$

$$C_{xx} = \begin{bmatrix} \hat{C}x(1,1) & \hat{C}x(1,2) & \cdots & \hat{C}x(1,M) \\ \hat{C}x(2,1) & \hat{C}x(2,2) & \cdots & \hat{C}x(2,M) \\ \vdots & \vdots & \ddots & \vdots \\ \hat{C}x(M,1) & \hat{C}x(M,2) & \cdots & \hat{C}x(M,M) \end{bmatrix}$$

$$a = \begin{bmatrix} \hat{a}(1) \\ \hat{a}(2) \\ \vdots \\ \hat{a}(M) \end{bmatrix}$$

$$c_{xx} = \begin{bmatrix} Cx(1,0) \\ Cx(2,0) \\ \vdots \\ Cx(M,0) \end{bmatrix}$$

In Equations (1), the left-hand side represents the product of a covariance matrix $C_{xx}$ and an AR coefficient vector a and the right-hand side represents a right-hand vector $c_{xx}$.

Elements of the covariance matrix $C_{xx}$ are derived by the use of a relational expression (modified covariance function) of Equation (2).

$$c_x(j,k) = \frac{1}{2(N-M)} \left\{ \sum_{n=M}^{N-1} x^*(n-j)x(n-k) + \sum_{n=0}^{N-1-M} x(n+j)x^*(n+k) \right\} \quad (2)$$

$$k, j = 0, 1, \ldots, M$$

In Equation (2), x(n) represents complex data and "*" represents a complex conjugate.

The elements of the right-hand vector $c_{xx}$ are derived by setting the value of k to "0" in Expression (2).

An example where a third-order process is performed using data of five channels will be described below as a specific constitution. The model order can be set to any value, but in the case of data of five channels, the third order is the maximum model order in the modified covariance method. When the number of data channels can be increased, the order applicable to the normal equation can also be increased, thereby enhancing the flexibility of the model order to be applied.

When the model order is set to 3, the covariance matrix $C_{xx}$ can be expressed by a matrix of 3 rows and 3 columns. The matrix is expressed by Expression (3).

$$\begin{bmatrix} \hat{C}_{x3}(1,1) & \hat{C}_{x3}(1,2) & \hat{C}_{x3}(1,3) \\ \hat{C}_{x3}(2,1) & \hat{C}_{x3}(2,2) & \hat{C}_{x3}(2,3) \\ \hat{C}_{x3}(3,1) & \hat{C}_{x3}(3,2) & \hat{C}_{x3}(3,3) \end{bmatrix} \quad (3)$$

In Expression (3), elements $C_{x3}(k, j)$ of the matrix represent complex numbers. x(n), that is, (x(0), x(1), x(2), x(3), and x(4)), in Equation (2) represent complex data, respectively.

The covariance matrix $C_{xx}$ expressed by Expression (3) has the relationship expressed by Equation (4) and thus is a Hermitian matrix (complex symmetric matrix).

$$c_{x3}(k,j) = c_{x3}^*(j,k) \quad (4)$$

Similarly, the right-hand vector $c_{xx}$ used to perform the third-order process is expressed by Expression (5).

$$\begin{bmatrix} \hat{C}_{x3}(1,0) \\ \hat{C}_{x3}(2,0) \\ \hat{C}_{x3}(3,0) \end{bmatrix} \quad (5)$$

The relationship between the normal equations and the AR coefficients will be described. The normal equation creating unit 361 of the FBLP unit 360 in the first embodiment creates normal equations through the use of Equations (1) and (2).

The FBLP unit 360 calculates the AR coefficients through the FBLP method using the relational expression. The AR coefficients calculated through the FBLP method are used for the computation process of extending the complex data.

In the spectrum estimating process of the first embodiment, the spectrum is calculated based on the AR coefficients calculated from the data matrix created based on the extended complex data through an MFBLP method to be described later instead of the FBLP method.

<Principle of Linear Prediction Process (Data Extension Method) of Extending Detected Complex Data>

Subsequently, a data extension method of extending the detected complex data will be described with reference to FIGS. 9A and 9B and FIG. 10.

The AR spectrum estimating method can enhance the detection accuracy by increasing the number of data (data length) and the order.

In the first embodiment, data extension is performed using a linear prediction process and the number of data is extended from the original complex data.

Figure 9A:
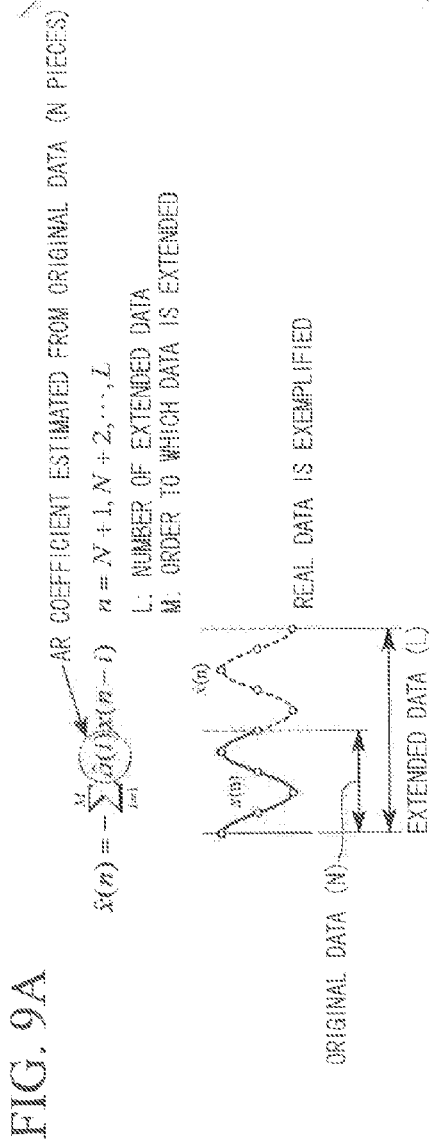
FIGS. 9A and 9B are diagrams illustrating a data extension method applied to the first embodiment.
Figure 9B:
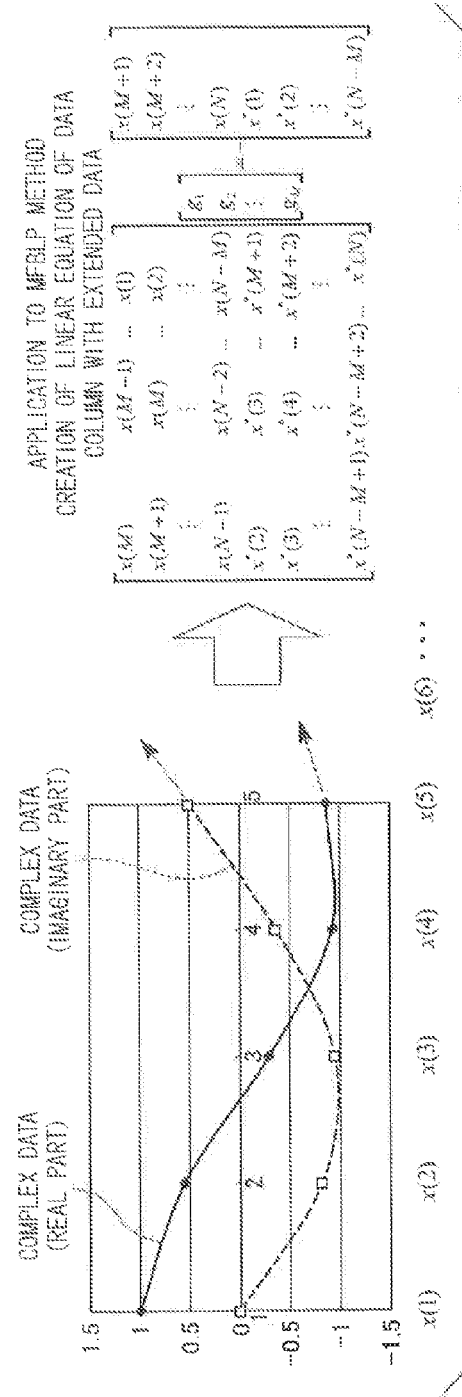

FIGS. 9A and 9B are diagrams illustrating the data extension method used in the first embodiment.

Data of an area adjacent to the area of the existing original data is extended from the existing N pieces of original data through the use of a computational expression of Equations (6).

$$\hat{x}(n) = -\sum_{i=1}^{M} \hat{a}(i)x(n-i) \qquad (6)$$

$$n = N+1, N+2, \ldots, L$$

In Equations (6), x-hat (n) represents data to be created (created data), a-hat (i) represents an AR coefficient, and x(n−i) represents the original data. Here, L represents the number of extended data, M represents the order to which data is extended, and n represents an integer in the range of (N+1) to L.

As shown in FIG. 9A, the data (extended data) to which the existing N pieces of original data are extended through the computation process of Equations (6) represents a case where L pieces of extended data including the existing original data are obtained. It has been reported that this data extension method is applied to the Burg method (data-extending Burg method) (see Reference Document: "Data Prediction for Burg Method", Shimamura and Suzuki, Journal of Institute of Electronics, Information and Communication Engineers, '94/8, Vol. J77-A, No. 8).

In the first embodiment, the data extension method described above is applied to the MFBLP method to be described later with complex data as target data.

The data extension method in the first embodiment can be applied to the complex data as shown in FIG. 9B and can extend the data forward and backward by performing the backward linear prediction as well as the forward linear prediction (FIG. 10). As the results of studies such as computation tests using a computer, it has been verified that it is possible to maintain stable estimation accuracy even using the method according to the first embodiment in addition to the Burg method based on real data, which is described in the reference document.

The process of extending complex data will be described below in more detail with reference to the drawing.

FIG. 10 is a diagram illustrating the process of extending complex data.

First, the process of extending complex data using a forward linear prediction expression is shown in part (a) of FIG. 10.

Data pieces x(1), x(2), x(3), x(4), and x(5) shown in the drawing are complex data which are a target of the extending process (original data).

An example where the original data is extended to be continuous is shown.

Here, the process of linearly predicting data in the direction from data pieces x(1) to x(5) is defined as a forward process and the process in the reversed direction is defined as a backward process.

The computational expression (forward linear prediction expression) for performing a forward linear process is expressed by Equation (7).

$$\hat{x}_f(n) = -\sum_{i=1}^{M} \hat{a}(i)x(n-i) \qquad (7)$$

In Equation (7), $x_f$-hat (n) represents data to be created (created data), a-hat (i) represents the AR coefficient, and x(n−i) represents the original data. Here, M represents the order to which the data extension is performed.

The original data to be subjected to the forward linear prediction process is any of (x(3), x(4), x(5)) when the order is 3 and (x(1), x(2), x(3), x(4), x(5)) when the order is 5.

By applying the original data of the above-mentioned groups to Equation (7), it is possible to acquire forward predicted data.

By reversing the order of data in each group and employing the computational expression used to perform the forward linear prediction process expressed by Equation (7), it may be possible to acquire backward predicted data.

Then, the process of generating complex data using a backward linear prediction expression is shown in part (b) of FIG. 10.

A computational expression (backward linear prediction expression) used to perform the backward linear prediction process using the same original data is defined by Equation (8).

$$\hat{x}_b(n) = -\sum_{i=1}^{M} \hat{a}^*(i)x(n+i) \qquad (8)$$

In Equation (8), $x_b$-hat (n) represents data to be created (created data), a*-hat (i) represents a complex conjugate of an AR coefficient, and x(n+i) represents the original data. Here, M represents the order to which data is extended.

The original data to be subjected to the backward linear prediction process is any of (x(1), x(2), x(3)) when the order is 3 and (x(1), x(2), x(3), x(4), x(5)) when the order is 5.

By applying the original data of the above-mentioned groups to Equation (8), it is possible to acquire backward predicted data.

By reversing the order of data in each group and employing the computational expression used to perform the backward linear prediction process expressed by Equation (8), it may be possible to acquire forward predicted data.

A process of generating complex data using a forward linear prediction expression and a backward linear prediction expression is shown in part (c) of FIG. 10.

This process employs the computational expression used to perform the forward linear process expressed by Equation (7) and the computational expression used to perform the backward linear process expressed by Equation (8).

By employing two computational expressions, it is possible to perform the forward prediction process and the backward prediction process without reversing the order of the original data.

When the data is extended to the third order, the original data to be subjected to the forward linear process is (x(3), x(4), x(5)) and the original data to be subjected to the backward linear process is (x(1), x(2), x(3)).

When the data is extended to the fifth order, both the original data to be subjected to the forward linear process and the original data to be subjected to the backward linear process both are (x(1), x(2), x(3), x(4), x(5)).

Part (d) of FIG. 10 shows an example where data is extended through the use of the third-order forward linear process and backward linear process.

The data (x(1), x(2), x(3), x(4), x(5)) including a real part and an imaginary part are expressed by two curves. The solid line indicates the variation of the real part and the broken line indicates the variation of the imaginary part. As shown in part (c) of FIG. 10, two sets of three continuous pieces of data can be acquired in each of the real part and the imaginary part when performing the third-order data extending process based on the data of 5 channels. The complex data (the real part and the imaginary part) of each set are substituted into complex data x(n−1) or x(n+1) of the forward and backward linear prediction expressions expressed by Equations (7) and (8).

It is possible to perform the forward data extending process and the backward data extending process by employing any one of three prediction computation processes described above.

<Principle of Calculating AR Coefficient Using MFBLP>

A singular value decomposing process using the MFBLP method will be described below with reference to FIGS. 11 to 13.

The creation of a data matrix using the MFBLP method and the singular value decomposition of the data matrix will be first described.

FIG. 11 is a diagram illustrating the creation of a data matrix and a data vector using the MFBLP method and the fact that they can be expressed by a pseudo-inverse matrix.

A linear simultaneous equation used to derive the AR coefficients is defined by Equation (9).

$$Ag = -h \tag{9}$$

In Equation (9), a data matrix A and a data vector h represent a matrix and a vector having complex data (CH) calculated for each channel (CH) as elements, respectively. A vector g represents an AR coefficient vector.

An expanded expression of Equation (9) using the elements of the complex data is expressed by Equation (10).

$$\begin{bmatrix} x(M) & x(M-1) & \ldots & x(1) \\ x(M+1) & x(M) & \ldots & x(2) \\ \vdots & \vdots & \ldots & \vdots \\ x(N-1) & x(N-2) & \ldots & x(N-M) \\ x^*(2) & x^*(3) & \ldots & x^*(M+1) \\ x^*(3) & x^*(4) & \ldots & x^*(M+2) \\ \vdots & \vdots & & \vdots \\ x^*(N-M+1) & x^*(N-M+2) & \ldots & x^*(N) \end{bmatrix} \begin{bmatrix} g_1 \\ g_2 \\ \vdots \\ g_M \end{bmatrix} = \tag{10}$$

$$-\begin{bmatrix} x(M+1) \\ x(M+2) \\ \vdots \\ x(N) \\ x^*(1) \\ x^*(2) \\ \vdots \\ x^*(N-M) \end{bmatrix}$$

In Equation (10), N represents the number of data of the complex data and M represents the order thereof.

Since the data matrix A and the data vector h are extended, N represents the number of extended data $N_e$ and M represents the increased order $M_e$.

The data matrix A is defined as a block matrix vertically divided into two parts. The upper block matrix is a Toeplitz matrix and the lower block matrix is a Hankel matrix of a complex conjugate.

The data vector h can be vertically divided into two parts, similarly to the data matrix A, the upper part thereof includes M-th to N-th complex data pieces of the complex data pieces as elements, and the lower part thereof includes complex data pieces which correspond to first to (N−M)-th complex data pieces of the complex data and which are complex conjugates thereof as elements.

Similarly to the first embodiment, by extending the number of data (CH), an order $M_e$ higher than the order M which can be set from the number of original data (CH) can be set. Accordingly, the MFBLP method can be effectively used. That is, it is possible to derive the characteristic that as the order becomes higher, the estimation accuracy becomes better in the AR spectrum estimating method.

Even in the circumstances where the order cannot be increased, since the number of elements of the data matrix and the data vector is extended, the spectrum estimation accuracy is improved.

The upper parts of the data matrix A and the data vector h can be used for the modified forward linear prediction (MFLP) method (=covariance method) and the lower parts thereof can be used for the modified backward linear prediction (MBLP) method.

Equation (9) can be expanded into Equation (11) using a generalized inverse matrix (pseudo-inverse matrix).

$$g = -A^\# h \tag{11}$$

In Equation (11), $A^\#$ represents the pseudo-inverse matrix of the data matrix A.

When the number of rows m and the number of columns n of the data matrix A satisfy a relational expression of m>n, the pseudo-inverse matrix $A^\#$ is an "over-determining equation" as expressed by Equation (12) and can be calculated as a left pseudo-inverse matrix.

$$A^\# = (A^H A)^{-1} A^H \tag{12}$$

When the number of rows and the number of columns of the data matrix A satisfy a relational expression of m<n, the pseudo-inverse matrix $A^\#$ is an "under-determining equation" as expressed by Equation (13) and can be calculated as a right pseudo-inverse matrix.

$$A^\# = A^H (A A^H)^{-1} \tag{13}$$

By using Equation (12) or (13), the pseudo-inverse matrix $A^\#$ can be calculated.

The singular value decomposing process will be described below.

Figure 12:
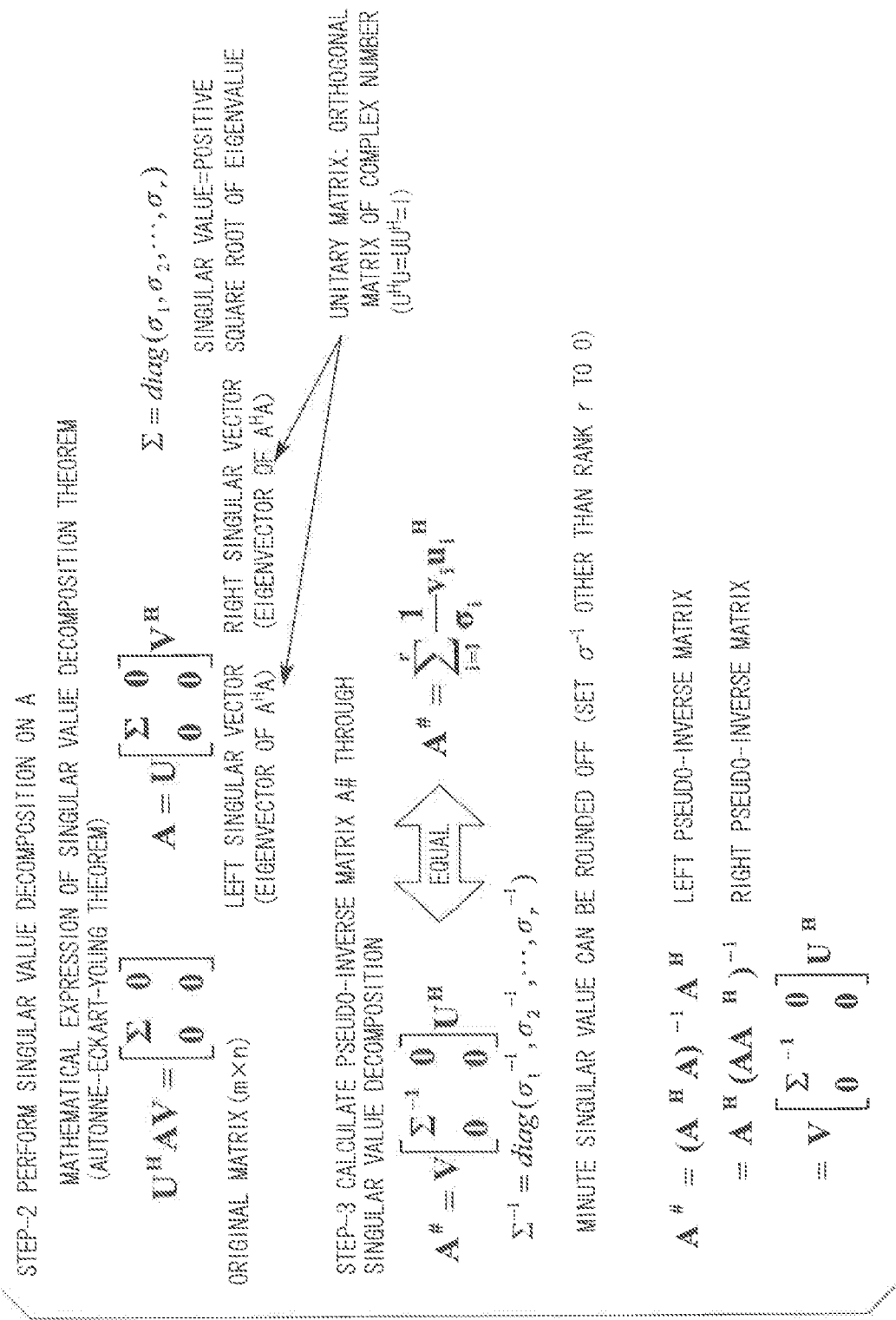
FIG. 12 is a diagram illustrating a singular value decomposing process.

FIG. 12 is a diagram illustrating the singular value decomposing process.

The computation algorithm of the singular value decomposing process can employ any algorithm and is not particularly limited. The computational expression (Autonne-Eckart-Young Theorem) used to decompose the singular values of the data matrix A is expressed by Equation (14).

$$U^H A V = \begin{bmatrix} \Sigma & 0 \\ 0 & 0 \end{bmatrix} \tag{14}$$

In Equation (14), U represents a left singular vector (the eigenvector of $A^H A$) of the data matrix A and V represents a right singular vector (the eigenvector of $AA^H$). Equation (14) can be expanded to Equation (15).

$$A = U \begin{bmatrix} \Sigma & 0 \\ 0 & 0 \end{bmatrix} V^H \qquad (15)$$

As expressed by Equation (15), a submatrix $\Sigma$ is calculated based on the data matrix A, the left singular vector U (the eigenvector of $A^H A$) of the data matrix A, and the right singular vector V (the eigenvector of $AA^H$) of the data matrix A. Here, the left singular vector U and the right singular vector V of the data matrix A are unitary matrices as expressed by Equation (16).

$$U^H U = UU^H = I \qquad (16)$$

The submatrix is a diagonal matrix having the singular values $\sigma_i$ as diagonal elements, as expressed by Equation (17).

$$\Sigma = \text{diag}(\sigma_1, \sigma_2, \ldots, \sigma_r) \qquad (17)$$

As a result, the singular value is a positive square root of an eigenvalue and thus can be considered as a value equivalent to the eigenvalue.

From the results of Equations (15) and (16) used to decompose the singular values, a pseudo-inverse matrix is calculated using the computational expression of Equation (18).

$$A^\# = V \begin{bmatrix} \Sigma^{-1} & 0 \\ 0 & 0 \end{bmatrix} U^H \qquad (18)$$

In Equation (18), r represents the rank (coefficient) of the pseudo-inverse matrix $A^\#$. The inverse matrix of the submatrix $\Sigma$ is expressed by Equation (19).

$$\Sigma^{-1} = \text{diag}(\sigma_1^{-1}, \sigma_2^{-1}, \ldots, \sigma_r^{-1}) \qquad (19)$$

Equation (18) can be expressed by Equation (20).

$$A^\# = \sum_{i=1}^{r} \frac{1}{\sigma_i} v_i u_i^H \qquad (20)$$

In this manner, by setting the rank r to an appropriate value and rounding off a singular value (minute singular value) of which the value of (singular value $\sigma_i)^{-1}$ is close to 0 to set $\sigma_i^{-1}$ to 0, it is possible to calculate the pseudo-inverse matrix $A^\#$ of the signal subspace (for example, $\Sigma^{-1} = \text{diag}(\sigma_1^{-1}, \sigma_2^{-1}, 0, \ldots, 0)$ in the case of the rank r=2).

The round-off of the minute singular value is performed, for example, based on the estimated wave number (FIGS. 17 and 18) to be described later.

As expressed by Equation (21), the left pseudo-inverse matrix and the right pseudo-inverse matrix expressed by Equation (12) and Equation (13) can be calculated from the pseudo-inverse matrix $A^\#$ based on the singular value decomposition.

$$A^\# = (A^H A)^{-1} A^H \qquad (21)$$
$$= A^H (AA^H)^{-1}$$

-continued $$= V \begin{bmatrix} \Sigma^{-1} & 0 \\ 0 & 0 \end{bmatrix} U^H$$

As described above, the ranks of the pseudo-inverse matrix can be set through the singular value decomposition. Even when the data matrix is not a square matrix, the pseudo-inverse matrix can be calculated. It is possible to enhance the calculation accuracy without being affected by the over-determination or under-determination. As a result, the calculated solution is stabilized.

Then, the process of calculating the AR coefficient a from the pseudo-inverse matrix $A^\#$ of the signal subspace will be described below.

FIG. 13 is a diagram illustrating the computation process of calculating the variance value of white noise and the power spectrum from the AR coefficient a calculated from the pseudo-inverse matrix $A^\#$ of the signal subspace.

In the MFBLP method shown in FIG. 13, basically, the process after deriving the AR coefficient can be performed through the same computation process as the standard AR spectrum estimation.

The above-mentioned computation process is defined by Equation (22). Equation (22) is a computational expression for calculating the AR coefficient a of the signal subspace.

$$\hat{a} = -A^\# h = -V \begin{bmatrix} \Sigma^{-1} & 0 \\ 0 & 0 \end{bmatrix} U^H h \qquad (22)$$

In Equation (22), $\Sigma-1$ is expressed by Equation (23).

$$\Sigma^{-1} = \text{diag}(\sigma_1^{-1}, \sigma_2^{-1}, \ldots, \sigma_r^{-1}) \qquad (23)$$

By substituting the calculated pseudo-inverse matrix $A^\#$ into Equation (22), the AR coefficient can be calculated.

The value of the rank r used to determine the numeral for rounding off a singular value can be set depending on the wave number estimation result. Regarding the value of the rank r, the value of the rank for the computation process of extending data and the value of the rank r for the computation process of calculating a power spectrum may be set to be different values. For example, the value of the rank r for the computation process of extending data may be fixed to the maximum value of the settable range of the rank r. The variance value of white noise is calculated from the AR coefficient a calculated in this manner.

The relational expression used to derive the variance $\sigma_v^2$ (hat) of input white noise based on the estimated AR parameter value (the AR coefficient a) derived using Equation (22) is expressed by Equation (24).

$$\hat{\sigma}_v^2 = \hat{c}_x(0, 0) + \sum_{k=1}^{M} \hat{a}(k) c_x(0, k) \qquad (24)$$

In the linear prediction using an AR model, the normal equation is derived under the conditions that the mean square error or the least square error of a difference (prediction error) between a predicted value and a measured value is the minimum.

By solving this normal equation through the use of general techniques, the AR coefficient is derived.

The computational expression used to calculate the power spectrum Sxx(ω) based on the variance $\sigma_v^2$ (hat) of input white noise calculated using Equation (24) is expressed by Equation (25).

$$S_{vv}(\omega) = \sigma_v^2 \qquad (25)$$

In Equation (25), ω represents the angular velocity, $H_{AR}(\omega)$ represents the frequency characteristic based on a transfer function of an AR filter at the angular velocity ω, and $S_{vv}(\omega)$ represents the power spectrum of the input white noise at the angular velocity ω, which can be expressed by $S_{vv}(\omega)=\sigma_v^2$. The angular velocity ω is converted into a phase difference of the received wave when it is used for the direction detection like the radar apparatus according to the first embodiment.

By using the above-mentioned computational expressions, it is possible to derive a spectrum having peak characteristics matching the direction of a target.

It may be possible to estimate a power spectrum distribution by the use of the created spectra without multiplying the variance value of the input white noise. Since the power spectrum distribution (the spectrum shape) is not changed, the operation of multiplying the variance value of the input white noise may be skipped.

A specific process of correlating the AR coefficients stored in correlation with a target in the first embodiment will be described below.

The AR coefficient correlating process is a process performed mainly by the AR coefficient calculating unit 326A (363A) of the azimuth detecting unit 30A and the target correlating unit 32a shown in FIG. 7.

FIG. 14 is a diagram illustrating a table provided to the memory 21.

In order to cause the data extending unit 310A to perform the data extending process, the target correlating unit 32a performs the following process for correlating a present target group (t), a target (t) predicted from the fixed previous target data, and a target (t−1) fixed in the past in the table shown in FIG. 14 for each target.

The column of item (t−1) in FIG. 14 represents the result of a previous (first preceding) detection cycle preceding by one cycle.

As the results of the detection cycles, a distance r from a fixed target, a longitudinal position long_d (a position in the direction perpendicular to the arrangement direction of antennas), a lateral position late_d (a position in the direction parallel to the arrangement direction of antennas), a relative velocity velo (that is, v) to a target, an ascending peak frequency point f_up, an AR coefficient AR_C_up at an ascending peak frequency, a descending peak frequency point f_dwn, and an AR coefficient AR_C_dwn at a descending peak frequency are stored in the memory 21 in the format of the table shown in FIG. 14 for each fixed target (exactly, the storage areas of the AR coefficient AR_C_up at an ascending peak frequency and the AR coefficient AR_C_dwn at a descending peak frequency are larger than those of the other, but are assumed to be equal thereto for the purpose of convenience for drawing a table). Here, the longitudinal position long_d and the lateral position late_d of a target can be calculated from the angle about the target (the angle of the direction of arrival of the received wave) and the distance r. When the angle is θ and the distance is r, the longitudinal position long_d is calculated by r·cos θ and the lateral position late_d is calculated by r·sin θ.

The target correlating unit 32a predicts the distance r, the longitudinal position long_d, the lateral position late_d, the relative velocity, and the peak frequency point of each target in the present cycle from the distance r, the longitudinal position long_d, the lateral position late_d, and the relative velocity velo of the target fixed in the preceding detection time.

For example, in the prediction of the longitudinal position long_d, the lateral position late_d, and the peak frequency point, a movable range after the detection cycle is calculated based on the distance r, the longitudinal position long_d, the lateral position late_d, and the relative velocity in the preceding cycle. The relative velocity can be predicted by calculating the slope of a variation in the relative velocity in several previous cycles.

For example, the target correlating unit 32a prepares a predetermined movable range, a frequency point range, and a relative velocity range to correspond to the distance r, the longitudinal position long_d, the lateral position late_d, the peak frequency point, and the relative velocity predicted from the previously-fixed results, correlates the targets depending on whether the values calculated in the present cycle are within the ranges, and determines that they are different targets when the values are not in the ranges.

The target correlating unit 32a transfers the results of the present detection cycle to the results of (t−1) and calculates the prediction results of the subsequent detection cycle, when the target in the present detection cycle is correlated with the target in the previous detection cycle in the table of FIG. 14.

The target correlating unit 32a clears the information of all the previous targets when a previous target which cannot be correlated with the target group in the present detection cycle is present.

Therefore, when a target is within a distance range affected by a multi-path and a detection cycle in which no peak is detected at beat frequencies comes in, the filter effect using the results of the previous target group is reset. In the first embodiment shown in FIG. 14, the result of the target of a previous detection cycle is stored in the memory 21.

Even when a previous target which cannot be correlated with the target in the present detection cycle is detected, the target correlating unit 32a may store the result of the fixed previous target so as to be continuous by a predetermined number of cycles.

Since the stored results are sequentially updated, the prediction results estimated based on the previous results are sequentially updated. When a target is not detected in the present detection cycle due to the influence of a multi-path or the like but a target is correlated subsequently to the next detection cycle, the target correlating unit 32a can be made to use the previous data other than the number of cycles in which no peak is detected due to the influence of a multi-path or the like for a filtering process.

Like an extrapolation method in tracking control, in a detection cycle in which a peak value is not detected, the presence of a target may be maintained using the prediction results as the result of the present detection cycle.

In the method of calling an AR coefficient from the table shown in the drawing, the target correlating unit 32a can select an estimation range based on distance point information corresponding to a previously-detected target, thereby enhancing the processing efficiency. That is, the target correlating unit 32a can define the estimation range based on the relative velocity and the angle about a target when referring to the stored AR coefficients. In the subsequent detection cycle, it is possible to select the estimation range based on the distance point information corresponding to the previously-detected target. Accordingly, the target correlating unit 32a can enhance the processing efficiency. Therefore, the target correlating unit 32a can refer to the AR coefficient corresponding to the distance point within the defined range, thereby enhancing the calling accuracy.

Figure 15:
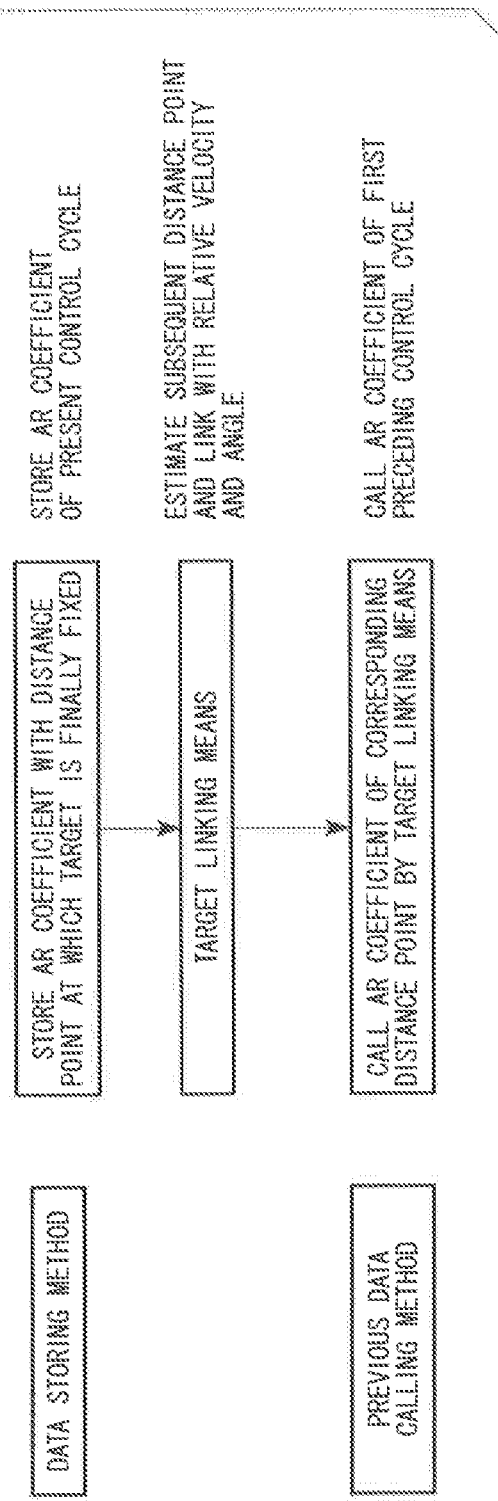
FIG. 15 is a diagram illustrating methods of storing and calling AR coefficients.

FIG. 15 is a diagram illustrating the methods of storing and calling an AR coefficient.

In the method of storing an AR coefficient shown in the drawing, the target correlating unit 32a performs a correlation with the distance point finally fixed as a target and stores the AR coefficient in the memory 21. The complex data stored in the memory 21 is information in the present control cycle.

The target correlating unit 32a calls the AR coefficient stored in the memory 21 using the distance point information as a key. The AR coefficient called from the memory 21 is information in the previous control cycle.

Accordingly, the azimuth detecting unit 30A can perform a correlation with a target using the distance point information as a key.

The flow of processes will be described with reference to FIGS. 16 to 20.

Figure 16:
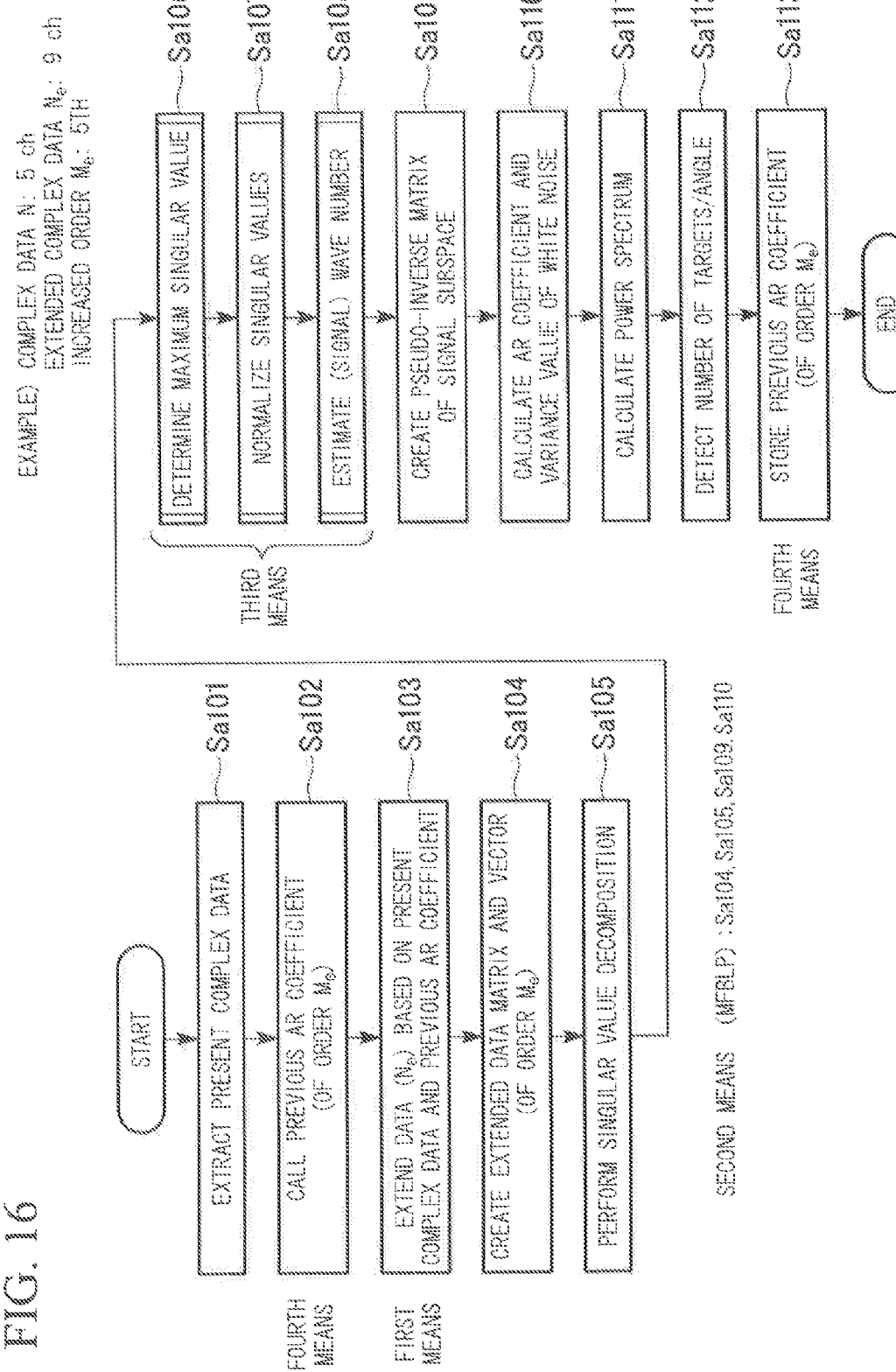
FIG. 16 is a flowchart illustrating the flow of processes in the first embodiment.

FIG. 16 is a flowchart illustrating the flow of processes in the first embodiment.

The preconditions in the flow of processes to be described below are arranged, for example, as follows.

The number of channels N (the number of data) included in the complex data detected through a single data acquisition is set to 5 ch. The number of channels (the number of extended channels) $N_e$ (the number of data) included in the extended complex data to which data is extended is set to 9 ch. The order (increased order) $M_e$ to which the order of the data is increased through the data extension is set to 5. It is assumed that these values are preliminarily determined.

The flow of processes shown in FIG. 16 is repeatedly performed for each control cycle (see FIG. 8) and for each of targets selected through the detection of peaks in the entire constitution of the radar. The flow of processes when a target is first detected will be described later.

In step Sa101, complex data for each channel (CH) is acquired one or more times in the present control cycle. The number of channels N (the number of data) of the complex data (n) acquired through one acquisition is 5 ch. The acquisition of the complex data is performed by the frequency resolving unit 22. The complex data is calculated by reading the beat signals based on a received wave stored in the memory 21 and transforming the beat signal for each antenna in frequency.

In step Sa102, the target correlating unit 32a calls an AR coefficient (of the order $M_e$) of the previous (first preceding) control cycle stored in the table (FIG. 14) installed in the memory 21 and sends the called AR coefficient to the data extending unit 310A.

In step Sa103, the data extending unit 310A generates extended complex data from a piece of complex data (corresponding to one acquisition) acquired in the present detection cycle out of detection cycles in which the process of calculating a direction of arrival of a received wave is repeatedly performed and the AR coefficient (of the order $M_e$) called from the memory 21 in step Sa 102. In accordance with the above-mentioned preconditions, the number of channels $N_e$ (the number of data) included in the extended complex data is set to 9 ch. The number of channels N (5 ch) can be extended to the number of channels $N_e$ (9 ch) through the data extension of the data extending unit 310.

In step Sa104, the data matrix and vector creating unit 321A creates a data matrix A and a data vector h based on the extended complex data. In accordance with the above-mentioned preconditions, the order $M_e$ is set to 5.

In step Sa105, the singular value decomposing unit 323 performs a singular value decompositing process on the data matrix A created through the process of step Sa104 and calculates singular values.

In step Sa106, the wave number estimating unit 324 determines a singular value exhibiting the maximum value (the maximum singular value) out of the singular values of the data matrix A based on the extended complex data and calculated through the process of step Sa105.

The wave number estimating unit 324 determines whether the wave number estimation in the subsequent steps for the corresponding target group should be performed based on the determination result. The wave number estimating unit 324 stops the wave number estimating process in the subsequent steps for the corresponding target group, when it is determined through the maximum singular value determining process that the value of the maximum singular value is smaller than a predetermined threshold value.

In step Sa107, the wave number estimating unit 324 normalizes the calculated singular values based on the calculated maximum value of the singular values. In the singular value normalizing process, the values obtained by dividing the singular values by the maximum singular value are defined as normalized singular values. Like a radar, when the singular values (signal intensities) vary depending on the distance from a target, the values of the singular values also vary. Accordingly, it is possible to easily estimate the wave number by normalizing the values of the singular values and relatively determining the magnitude relationship between the singular values.

In step Sa108, the wave number estimating unit 324 determines the normalized singular values based on a predetermined threshold value and selects the wave number to be used in the subsequent processes based on the determination result.

Figure 18:
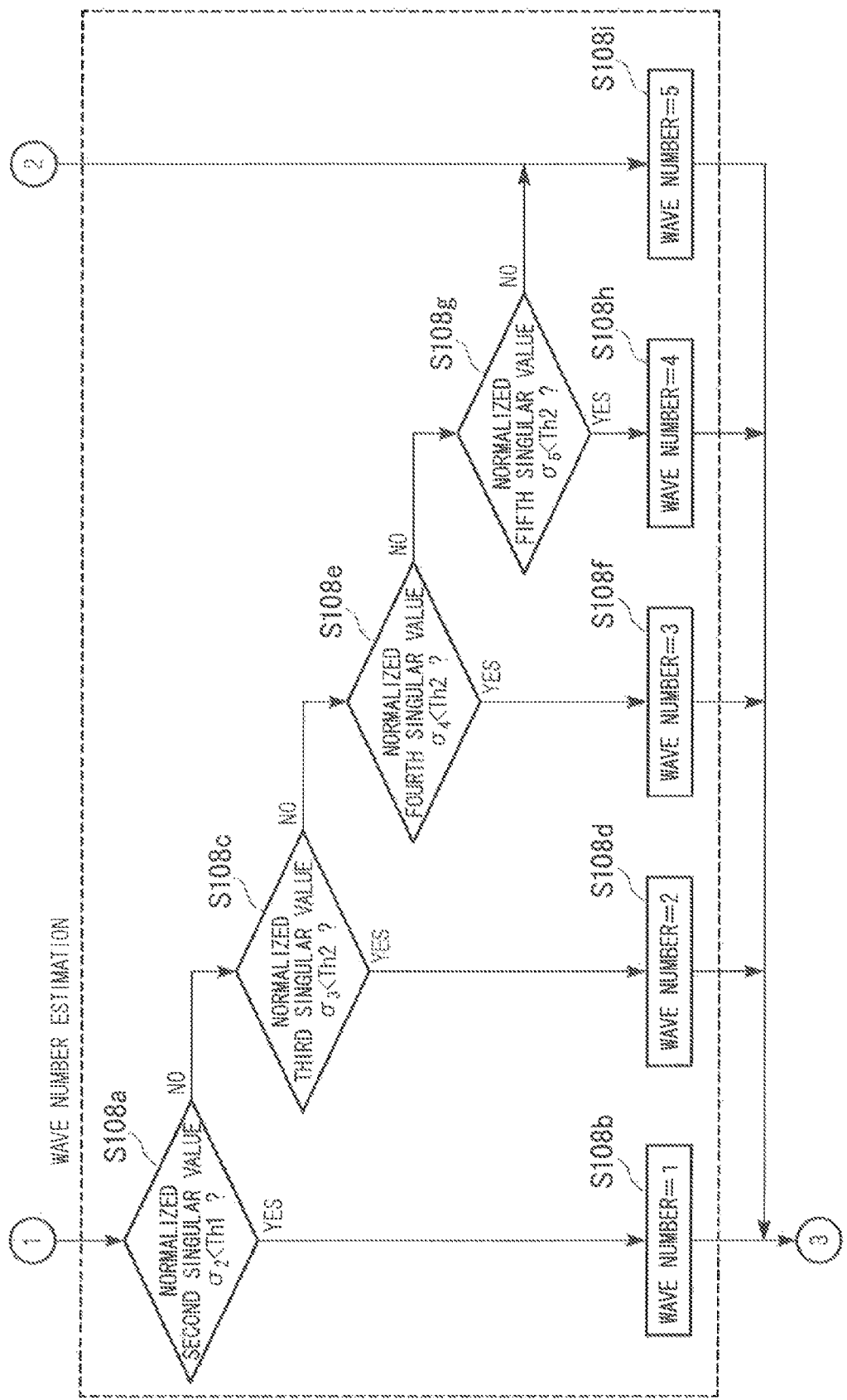
FIG. 18 is a diagram (second half) illustrating the details of the signal wave number estimating process of step Sa106 to step Sa108 in FIG. 16.

In the wave number estimating step, four threshold values are used for the determination, as shown in FIG. 18. By setting a plurality of threshold values in this manner, it is possible to set the selected wave number as the estimated value of the signal wave number and to flexibly adjust the wave number estimation result.

Figure 17:
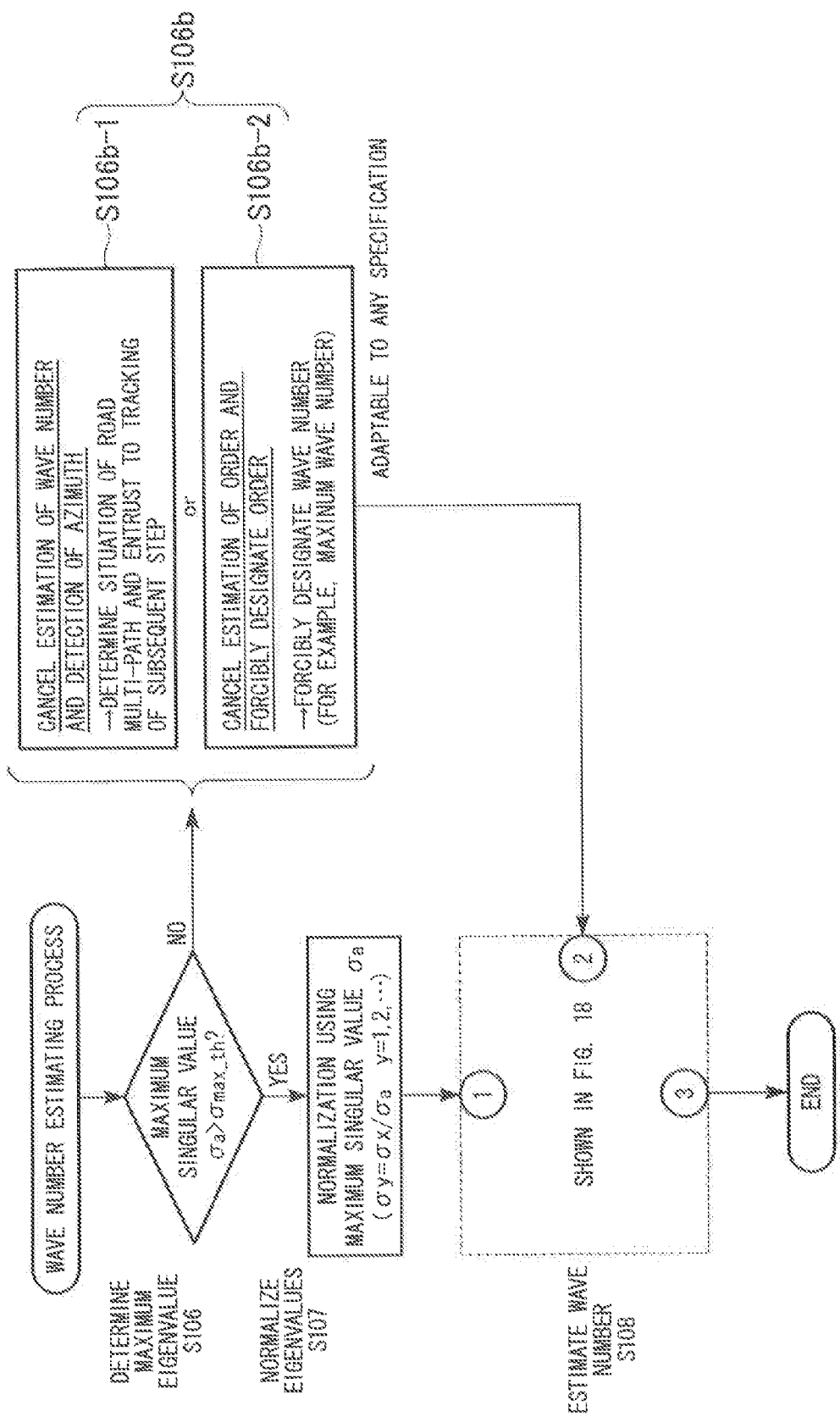
FIG. 17 is a diagram (first half) illustrating the details of a signal wave number estimating process of step Sa106 to step Sa108 in FIG. 16.

FIGS. 17 and 18 are diagrams illustrating an example of the signal wave number estimating process of steps Sa106 to Sa108 in FIG. 16.

The process of step S106a is a process of determining the maximum singular value, which corresponds to step Sa106 (FIG. 16). By determining whether the value ($\sigma_a$) of the maximum singular value is greater than a predetermined threshold value ($\sigma_{max\_th}$) in step S106a, the wave number estimating unit 324 determines that the reliability of the acquired information (complex data) is low in step S106b and does not perform the wave number estimating process for the corresponding target in the subsequent step, when it is determined that the value ($\sigma_a$) of the maximum singular value is not greater than the predetermined threshold value ($\sigma_{max\_th}$) ("No" in step S106a).

The maximum singular value is equivalent (proportional) to the intensity of an input signal. Accordingly, even when a signal is received under cluttered circumstances such as a road multi-path specific to an on-board radar, it is possible to suppress erroneous azimuth estimation by determining the value of the maximum singular value.

For example, in step S106b, both the wave number estimation and the azimuth detection can be cancelled as shown in step S106b-1. As shown in step S106b-2, the wave number estimation may be cancelled and any wave number (for example, the maximum wave number) may be forcibly designated. In this case, the process of step S108*i* (FIG. 18) is performed.

The wave number estimating unit 324 performs the process of step S107*a* when it is determined through the process of step S106*a* that the value of the maximum singular value is greater than the predetermined threshold value ("Yes" in step S106*a*). In step S107*a*, the wave number estimating unit 324 performs the singular value normalizing process corresponding to step S106*a* and sets the values ($\sigma_x/\sigma_a$) obtained by dividing the singular values $\sigma_x$ by the maximum singular value $\sigma_a$ as the normalized singular values $\sigma_y$. Here, y represents a natural number.

The processes of steps S108*a* to S108*i* in FIG. 17 are the wave number estimating process corresponding to step Sa108 (FIG. 15) performed by the wave number estimating unit 324.

In step S108*a*, the second largest singular value (normalized second singular value $\sigma_2$) is selected out of the singular values normalized in step Sa107 (FIG. 15) and it is determined whether the normalized second singular value $\sigma_2$ is smaller than a predetermined threshold value Th1.

When it is determined in step S108*a* that the normalized second singular value $\sigma_2$ is not smaller than the predetermined threshold value Th1 ("No" in step S108*a*), the process of step S108*c* is performed.

When it is determined in step S108*a* that the normalized second singular value $\sigma_2$ is smaller than the predetermined threshold value Th1 ("Yes" in step S108*a*), the estimated wave number is set to 1 and is stored in a storage area (not shown) for storing estimated wave number information in step S108*b*, and the wave number estimating process is ended.

In step S108*c*, the third largest singular value (normalized third singular value $\sigma_3$) is selected out of the singular values normalized in step Sa107 and it is determined whether the normalized third singular value $\sigma_3$ is smaller than a predetermined threshold value Th2. When it is determined that the normalized third singular value $\sigma_3$ is not smaller than the predetermined threshold value Th2 ("No" in step S108*c*), the process of step S108*e* is performed.

When it is determined in step S108*d* that the normalized third singular value $\sigma_3$ is smaller than the predetermined threshold value Th2 ("Yes" in step S108*c*), the estimated wave number is set to 2 and is stored in a storage area (not shown) for storing estimated wave number information in step S108*d*, and the wave number estimating process is ended.

In step S108*e*, the fourth largest singular value (normalized fourth singular value $\sigma_4$) is selected out of the singular values normalized in step Sa107 and it is determined whether the normalized fourth singular value $\sigma_4$ is smaller than a predetermined threshold value Th3. When it is determined that the normalized fourth singular value $\sigma_4$ is not smaller than the predetermined threshold value Th3 ("No" in step S108*e*), the process of step S108*g* is performed.

When it is determined in step S108*e* that the normalized fourth singular value $\sigma_4$ is smaller than the predetermined threshold value Th3 ("Yes" in step S108*e*), the estimated wave number is set to 3 and is stored in a storage area (not shown) for storing estimated wave number information in step S108*f*, and the wave number estimating process is ended.

In step S108*g*, the fifth largest singular value (normalized fifth singular value $\sigma_5$) is selected out of the singular values normalized in step Sa107 and it is determined whether the normalized fifth singular value $\sigma_5$ is smaller than a predetermined threshold value Th4. When it is determined that the normalized fifth singular value $\sigma_5$ is not smaller than the predetermined threshold value Th4 ("No" in step S108*g*), the process of step S108*i* is performed.

When it is determined in step S108*g* that the normalized fifth singular value $\sigma_5$ is smaller than the predetermined threshold value Th4 ("Yes" in step S108*g*), the estimated wave number is set to 4 and is stored in a storage area (not shown) for storing estimated wave number information in step S108*h*, and the wave number estimating process is ended.

When it is determined in step S108*g* that the normalized fifth singular value $\sigma_5$ is not smaller than the predetermined threshold value Th4 ("No" in step S108*g*), the estimated wave number is set to 5 and is stored in a storage area (not shown) for storing estimated wave number information in step S108*i*, and the wave number estimating process is ended.

In this manner, the determination threshold values in the wave number estimating process of steps S108*a* to S108*i* include four values of the threshold value Th1 for distinguishing the wave number of 1 from the wave number of 2 or more, the threshold value Th2 for distinguishing the wave number of 2 from the wave number of 3 or more, the threshold value Th3 for distinguishing the wave number of 3 from the wave number of 4 or more, and the threshold value Th4 for distinguishing the wave number of 4 from the wave number of 5.

Referring to FIG. 16 again, in step Sa109, the pseudo-inverse matrix creating unit 325 performs a process of creating a pseudo-inverse matrix of a signal subspace in the present detection cycle based on the wave number estimated by the wave number estimating unit 324 in step Sa108.

The pseudo-inverse matrix creating unit 325 creates a pseudo-inverse matrix through the use of the above-mentioned computational expression based on the singular values calculated by the singular value decomposing unit 323 in step Sa105.

In step Sa110, the AR coefficient calculating unit 326 calculates the AR coefficient and the variance value of input white noise based on the pseudo-inverse matrix created in step Sa109 and the data vector.

In step Sa111, the power spectrum calculating unit 380 calculates a power spectrum based on the AR coefficient and the variance of input white noise which are calculated in step Sa110.

In step Sa112, the power spectrum calculating unit 380 detects the number of targets and the angles indicating the directions of the targets based on the calculated power spectrum.

In step Sa113, the target correlating unit 32*a* stores the AR coefficient (n) of the order $M_e$ calculated by the AR coefficient calculating unit 326 in the memory 21.

Through the above-mentioned sequence of processes, the electronic scanning radar apparatus 100 can detect an azimuth with enhanced detection accuracy.

In the flow of processes shown in FIG. 16, regarding the AR coefficient (n−1) acquired by the data extending unit 310A in the detection cycle in which a target is first detected, the flow of processes may be performed using a predetermined value as an initial value thereof.

In the first embodiment, since the FBLP unit 360A generating the data-extending AR coefficient (AR coefficient 2) in the first detection cycle is provided, the following flow of processes may be added to the flow of processes shown in FIG. 16 to replace the initial value. Accordingly, it is possible to further enhance the detection accuracy from the time point where a target is detected.

An example where the AR coefficient (AR coefficient 2) generated by the FBLP unit 360A is used for the second target detection cycle and the AR coefficient (AR coefficient 1)

generated by the MFBLP unit 320A is used in the third or later target detection cycle will be described below.

Figure 19:
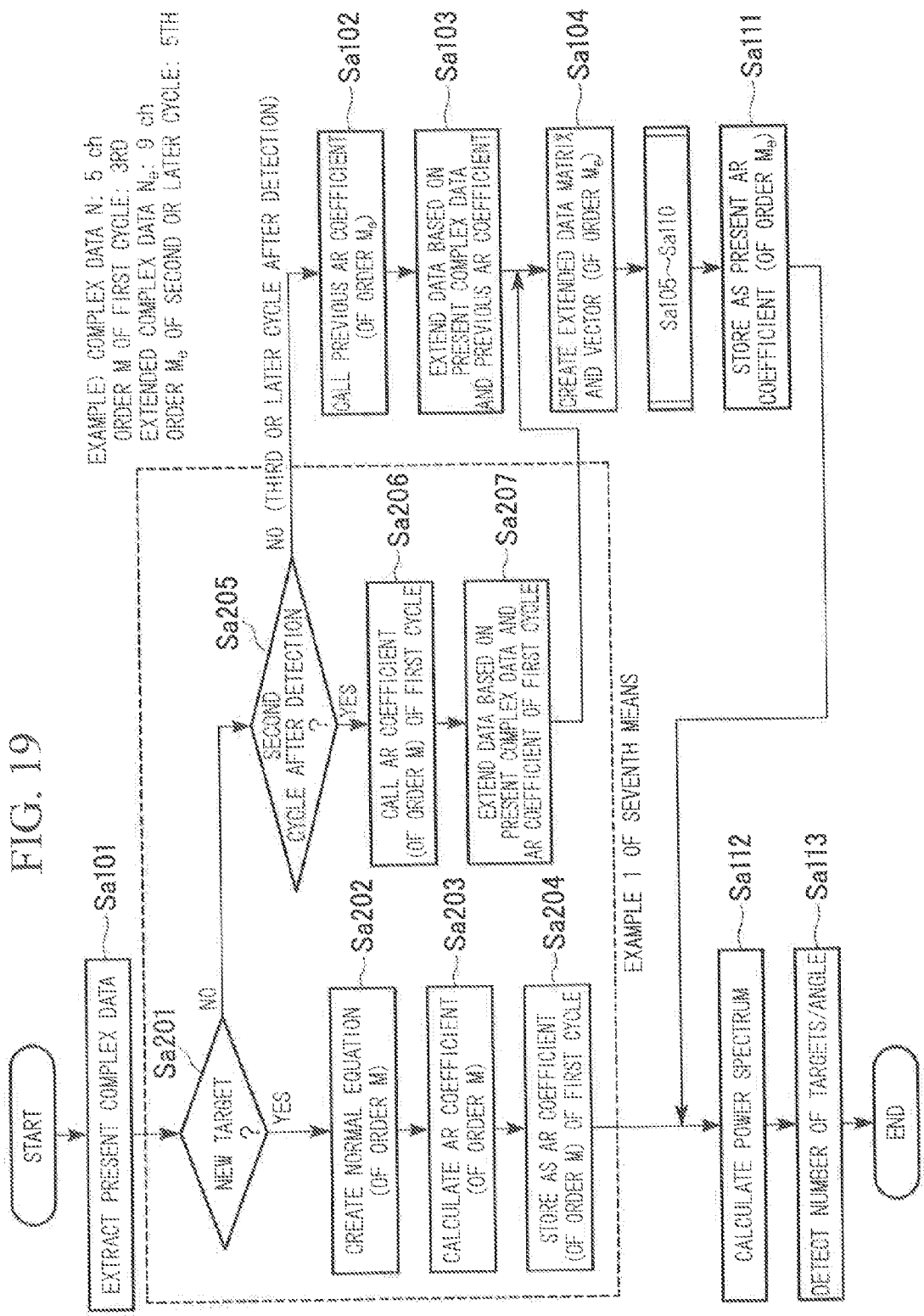
FIG. 19 is a flowchart illustrating the flow of processes of determining the initial value of the AR coefficient.

FIG. 19 is a flowchart illustrating the flow of processes of determining the initial value of an AR coefficient.

First, after the complex data for each channel (CH) is acquired once in the present control cycle in step Sa101, it is determined with reference to the result of the target correlating unit 32a whether the present detection cycle is a detection cycle in which a target is first detected in step Sa201. When it is determined in step Sa201 that the present detection cycle is not a detection cycle in which a target is first detected ("No" in step Sa201), the flow of processes goes to step Sa205. When it is determined in step Sa201 that the present detection cycle is the detection cycle in which a target is first detected ("Yes" in step Sa201), the flow of processes goes to step Sa202.

In step Sa202, the normal equation creating unit 361 creates a normal equation of an order M based on the complex data acquired in the present detection cycle in which a target is first detected.

In step Sa203, the AR coefficient calculating unit 363A calculates a secondary order AR coefficient (AR coefficient 2) derived from the normal equation created by the normal equation creating unit 361. In this manner, the AR coefficient calculating unit 363A acquires the AR coefficient 2(n) of the order M calculated based on the complex data corresponding to the beat frequencies based on the received wave detected in the present detection cycle.

In step Sa204, the AR coefficient calculating unit 363A supplies the AR coefficient 2(n) as an AR coefficient of the detection cycle in which a target is first detected to the target correlating unit 32a. The target correlating unit 32a stores the supplied AR coefficient 2(n) in the memory 21. After storing the AR coefficient in the memory 21, the flow of processes goes to step Sa112.

In step Sa205, it is determined whether the present detection cycle is a second detection cycle after a target is first detected, with reference to the result of the target correlating unit 32a. When it is determined in step Sa205 that the present detection cycle is not the second detection cycle after a target is first detected ("No" in step Sa205), the flow of processes goes to step Sa102. When it is determined in step Sa205 that the present detection cycle is the second detection cycle after a target is first detected ("Yes" in step Sa205), the flow of processes goes to step Sa206.

In step Sa206, the data extending unit 310A controls the target correlating unit 32a to call the AR coefficient (of an order M) of the detection cycle in which a target is first detected and which is stored in the memory 21.

In step Sa207, the data extending unit 310A creates extended complex data (of an order $M_e$) of which the number of data is increased from the complex data acquired in the present detection cycle and the AR coefficient of the detection cycle in which a target is first detected. After creating the extended complex data (of an order $M_e$), the flow of processes goes to step Sa104.

The processes of steps Sa102 to Sa113 are the same as shown in FIG. 16. Here, when it is determined in step Sa205 that the present detection cycle is the second detection cycle after a target is first detected, the data matrix and vector creating unit 321A creates a data matrix and a data vector h based on the extended complex data, which is created in step Sa207, in step Sa104.

According to the flow of processes in the first embodiment, the AR coefficient 1(n) of an order $M_e$ is acquired in the second detection cycle after a target is first detected. Since the AR coefficient 1(n) of an order $M_e$ is referred to in the subsequent detection cycle, the effect of the data extension to the order $M_e$ appears in the third or subsequent detection cycle.

In this manner, the electronic scanning radar apparatus 100 according to the first embodiment can detect an azimuth with enhanced detection accuracy.

Second Embodiment

Another example where the AR spectrum estimating method known as a high-resolution algorithm is used for the spectrum estimating process will be described below in more detail with reference to FIGS. 1 to 20.

The flow of processes different from the flow of processes described in the first embodiment will be described with reference to the azimuth detecting unit 30 shown in FIG. 1. The same elements as shown in FIGS. 1 to 19 are referenced by the same reference numerals.

Figure 20:
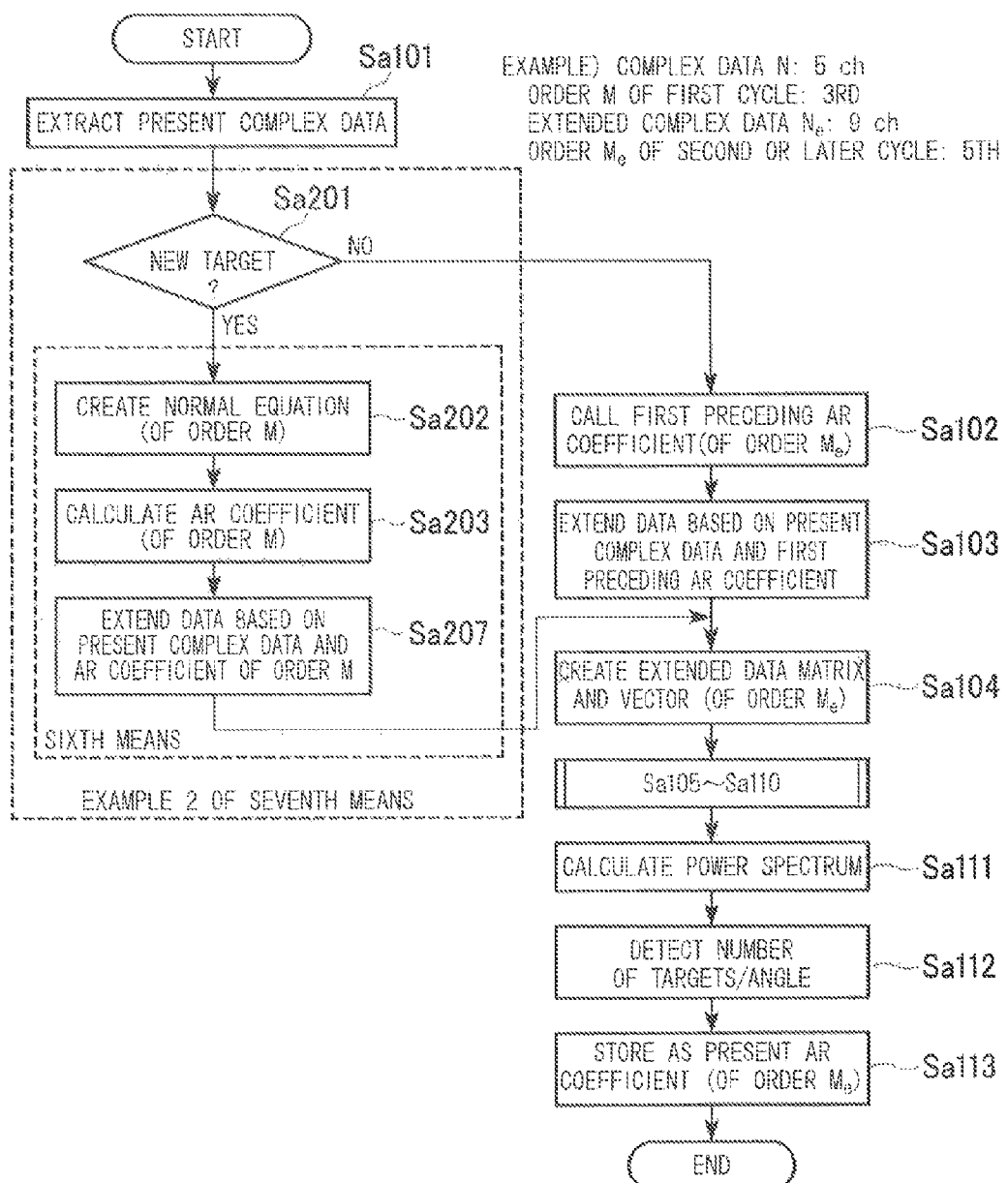
FIG. 20 is a flowchart illustrating the flow of processes of determining the initial value of the AR coefficient according to a second embodiment of the invention.

FIG. 20 is a flowchart illustrating the flow of processes of determining the initial value of an AR coefficient.

First, the complex data for each channel (CH) is acquired once in the present control cycle in step Sa101.

Thereafter, in step Sa201, it is determined with reference to the result of the target correlating unit 32a whether the present detection cycle is the detection cycle in which a target is first detected. When it is determined in step Sa201 that the present detection cycle is not a detection cycle in which a target is first detected ("No" in step Sa201), the flow of processes goes to step Sa102. When it is determined in step Sa201 that the present detection cycle is the detection cycle in which a target is first detected ("Yes" in step Sa201), the flow of processes goes to step Sa202.

In step Sa202, the normal equation creating unit 361 creates a normal equation of an order M based on the complex data acquired in the present detection cycle in which a target is first detected.

In step Sa203, the AR coefficient calculating unit 363A calculates a secondary order AR coefficient (AR coefficient 2) derived from the normal equation created by the normal equation creating unit 361. In this manner, the AR coefficient calculating unit 363A acquires the AR coefficient 2(n) of the order M calculated based on the complex data corresponding to the beat frequencies based on the received wave detected in the present detection cycle.

In step Sa207, the data extending unit 310A creates the extended complex data (of an order $M_e$) of which the number of data is increased from the complex data acquired in the present detection cycle and the AR coefficient in the detection cycle in which a target is first detected. After creating the extended complex data (of the order $M_e$), the flow of processes goes to step Sa104.

The processes of steps Sa102 to Sa113 are the same as shown in FIG. 16.

However, when it is determined in step Sa201 that the present detection cycle is the detection cycle in which a target is first detected, the data matrix and vector creating unit 321A creates a data matrix A and a data vector h based on the extended complex data, which is created in step Sa207, in step Sa104.

In this manner, the electronic scanning radar apparatus 100 according to the second embodiment can detect an azimuth with enhanced detection accuracy.

According to the flow of processes in the second embodiment, the AR coefficient 1(n) of the order $M_e$ is acquired in the first detection cycle in which a target is first detected. Since the AR coefficient 1(n) of the order $M_e$ is referred to in the data extending process of the subsequent detection cycle, the effect of the data extension to the order $M_e$ appears in the second or subsequent detection cycle.

In the flow of processes of the second embodiment, it is necessary to perform the operation of calculating the AR coefficient 2(n) for the data extension in the first detection cycle in which a target is first detected and the operation of calculating the AR coefficient 1(n) in the spectrum estimating process in a single detection cycle.

In this manner, the electronic scanning radar apparatus 100 according to the second embodiment can detect an azimuth with enhanced detection accuracy.

Third Embodiment

Another example where the AR spectrum estimating method known as a high-resolution algorithm is used for the spectrum estimating process will be described below in more detail with reference to FIGS. 1 to 25.

Figure 21:
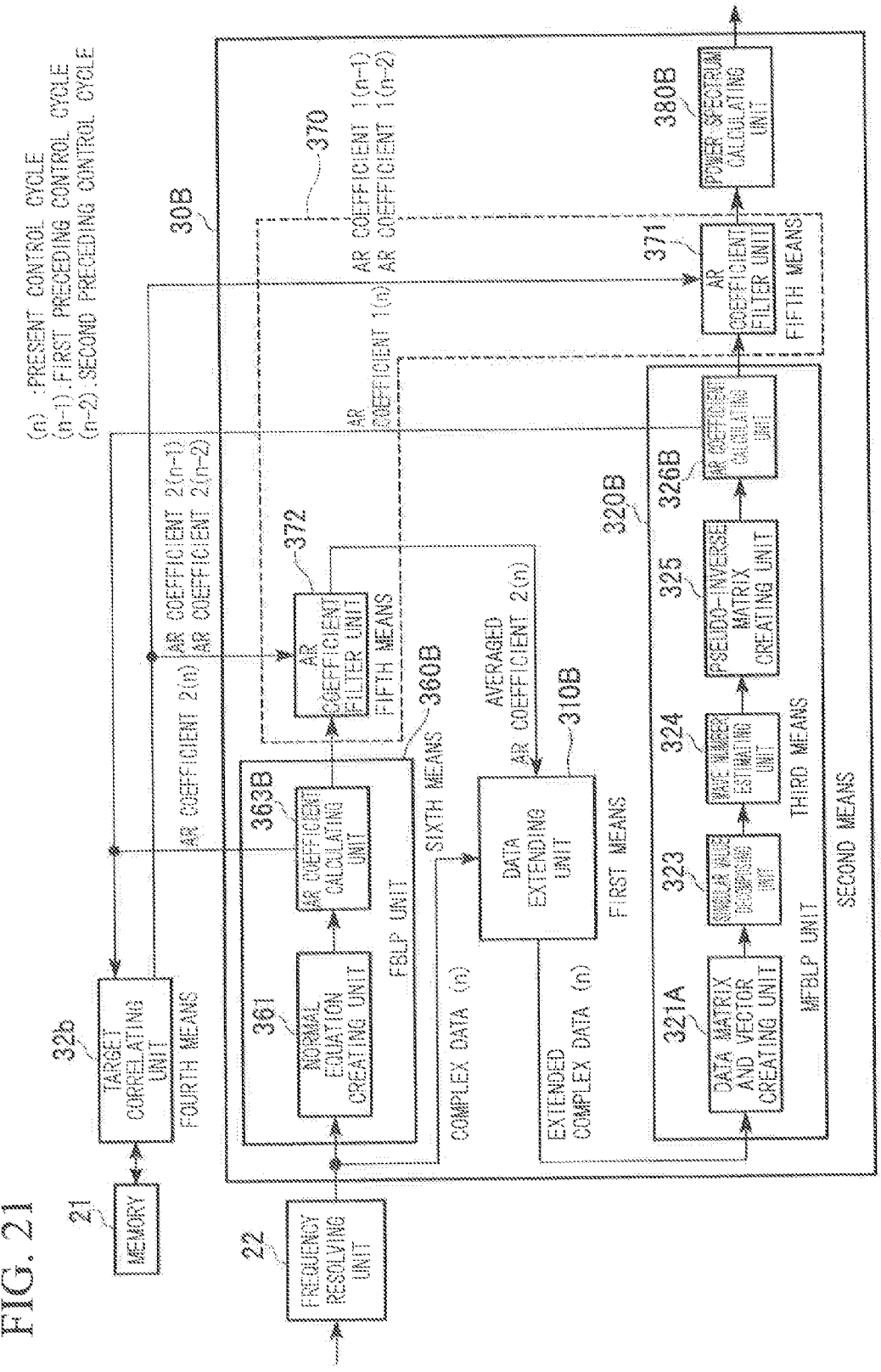
FIG. 21 is a block diagram illustrating the constitution of an electronic scanning radar apparatus according to a third embodiment of the invention.

FIG. 21 is a block diagram illustrating the constitution of an azimuth detecting unit 30B according to a third embodiment of the invention. The same elements as shown in FIGS. 1 and 7 are referenced by the same reference numerals.

The azimuth detecting unit 30B and the target correlating unit 32b shown in FIG. 21 are examples of the azimuth detecting unit 30 and the target correlating unit 32 of the signal processing unit 20A (FIG. 1), respectively.

The target correlating unit 32b records and stores the AR coefficient 1(n) calculated in the present detection cycle in the memory 21. The AR coefficient 1(n) is calculated from the complex data (extended complex data) extended in the present detection cycle by the MFBLP unit 320B.

When the AR coefficient 1 stored in the memory 21 is called in the present detection cycle which is a next detection cycle (n-th) by the target correlating unit 32b, the AR coefficient 1 is called as a previous (first preceding) AR coefficient 1(n−1).

The target correlating unit 32b records and stores the AR coefficient 2(n) calculated from the non-extended complex data detected in the present detection cycle by the FBLP unit 360B in the memory 21 in the present detection cycle.

When the AR coefficient 2 stored in the memory 21 is called in the present detection cycle which is a next detection cycle (n-th) by the target correlating unit 32b, the AR coefficient 2 is called as a previous (preceding) AR coefficient 2(n−1).

That is, the third embodiment is different from the first embodiment, in the number of AR coefficients stored in the memory 21. The information stored in the memory 21 includes the AR coefficient (AR coefficient 1(n)) calculated by the MFBLP unit 320B and the AR coefficient (AR coefficient 2(n)) calculated by the FBLP unit 360B in several previous control cycles.

The target correlating unit 32b correlates the targets in the previous detection cycles stored in the memory 21 with each other and the AR coefficient 1(n−1), the AR coefficient 1(n−2), the AR coefficient 2(n−1), and the AR coefficient 2(n−2) stored in the previous detection cycles (FIG. 8) for each target to the azimuth detecting unit 30B.

The target correlating unit 32b adds identification information of the distance, the relative velocity, and the azimuth output from the target fixing unit 31 to the AR coefficient 1(n) and the AR coefficients 2(n) calculated based on the complex data acquired in the present detection cycle (FIG. 8) and records the result in the memory 21.

The azimuth detecting unit 30B includes a data extending unit 310B, an MFBLP unit 320B, an FBLP unit 360B, a coefficient filter unit 370, and a power spectrum calculating unit 380B.

The data extending unit 310B creates extended complex data (n) of which the number of data is increased based on the complex data (n) acquired in the present detection cycle out of detection cycles in which the process of calculating a direction of arrival of a received wave is repeatedly performed and an averaged AR coefficient 2(n) calculated from the AR coefficient (AR coefficient 2(n)) calculated in the present detection cycle and the AR coefficients (the AR coefficient 2(n−1) and the AR coefficient 2(n−2)) calculated in the previous detection cycles.

The complex data (n) acquired in the present detection cycle is complex data corresponding to the beat frequencies (one or both of the ascending and the descending) resolved in frequency by the frequency resolving unit 22.

The averaged AR coefficient 2(n) used in the data extending unit 310B is obtained by averaging the AR coefficients calculated in the present and previous control cycles by the coefficient filter unit 370 to be described later. For example, the averaged AR coefficient 2(n) is derived from the averaging result of the AR coefficient 2(n) calculated in the present detection cycle and the AR coefficient 2(n−1) and the AR coefficient 2(n−2) calculated in the previous detection cycles by the coefficient filter unit 370.

In the control cycle in which a target is first detected, the averaged AR coefficient 2(n) in the data extending unit 310B is the AR coefficient 2(n) calculated by the FBLP unit 360B in the control cycle in which a target is first detected.

The data extending unit 310B creates the extended complex data (n) of which the number of data is increased based on the complex data acquired in the present detection cycle out of the detection cycles in which the process of calculating a direction of arrival of a received wave is repeatedly performed and the averaged AR coefficient 2 obtained by averaging the AR coefficient 2(n) calculated in the present detection cycle and the AR coefficient 2(n−1) and the AR coefficient 2(n−2) calculated in the previous detection cycles.

The data extending unit 310B extends the order to be higher than a secondary order (M) settable based on the original complex data (n) of which the number of data is extended.

The MFBLP unit 320B (first computation processing unit) calculates a primary order (Me) AR coefficient (AR coefficient 1(n)) and the variance value of white noise based on the data matrix and the data vector created from the extended complex data (n).

The MFBLP unit 320B includes a data matrix and vector creating unit 321A, a singular value decomposing unit 323, a wave number estimating unit 324, a pseudo-inverse matrix creating unit 325, and an AR coefficient calculating unit 326B.

The AR coefficient calculating unit 326B calculates the AR coefficient and the variance $\sigma^2$ of input white noise based on the pseudo-inverse matrix of a signal subspace created by the pseudo-inverse matrix creating unit 325 and the data matrix derived by the data matrix and vector creating unit 321A. In this manner, the AR coefficient calculating unit 326B can derive the AR coefficient based on the complex data corresponding to the detection beat frequency which is a beat frequency at which the presence of a target is detected and the variance $\sigma^2$ of input white noise for each detection cycle. The AR coefficient calculating unit 326B supplies the calculated AR coefficient 1(n) and the variance $\sigma^2$ of input white noise to the coefficient filter unit 370.

The AR coefficient calculating unit 326B supplies the calculated AR coefficient 1(n) to the target correlating unit 32b and stores the calculated AR coefficient 1(n) in the memory 21.

The FBLP unit 360B (second computation processing unit) calculates a secondary order AR coefficient (AR coefficient 2(n)) based on a normal equation created from the complex data (n).

The FBLP unit 360B includes a normal equation creating unit 361 and an AR coefficient calculating unit 363B.

The AR coefficient calculating unit 363B calculates the secondary order AR coefficients (AR coefficient 2(n)) derived from the secondary order normal equation in the "present detection cycle" created by the normal equation creating unit 361. In this manner, the AR coefficient calculating unit 363B acquires the AR coefficient calculated based on the complex data corresponding to the beat frequencies based on the received wave detected in the present detection cycle and sets the acquired AR coefficient as the coefficient used to extend data in the subsequent step.

The AR coefficient calculating unit 363B outputs the derived AR coefficient (AR coefficient 2(n)) to the target correlating unit 32b and an AR coefficient filter unit 372.

The coefficient filter unit 370 includes an AR coefficient filter unit 371 (first coefficient filter unit) and an AR coefficient filter unit 372 (second coefficient filter unit).

The AR coefficient filter unit 371 calculates an averaged AR coefficient 1(n) by averaging the AR coefficient 1(n) calculated in the present control cycle by the AR coefficient calculating unit 326B and the AR coefficient 1(n−1) and the AR coefficient 1(n−2) calculated in the previous control cycles and called from the memory 21 by the target correlating unit 32b.

The AR coefficient filter unit 371 outputs the averaged AR coefficient 1(n) as the result of the averaging process and the variance $\sigma^2$ of input white noise to the power spectrum calculating unit 380B.

The AR coefficient filter unit 372 calculates an averaged AR coefficient 2(n) by averaging the AR coefficient 2(n) calculated in the present control cycle by the AR coefficient calculating unit 363B and the AR coefficient 2(n−1) and the AR coefficient 2(n−2) calculated in the previous control cycles and called from the memory 21 by the target correlating unit 32b.

The AR coefficient filter unit 372 stores the averaged AR coefficient 2(n) as the result of the averaging process in the memory 21 through the use of the target correlating unit 32b.

The power spectrum calculating unit 380B calculates the direction of arrival of a received wave from the power spectrum derived from the averaged AR coefficient 1(n) and the variance $\sigma^2$ of input white noise.

The AR coefficient filter unit 371 outputs the derived AR coefficient 1(n) to the target correlating unit 32b and stores the AR coefficient 1(n) in the memory 21 through the use of the target correlating unit 32b.

FIG. 22 is a diagram illustrating the process of averaging AR coefficients in the MFBLP method.

FIG. 22 shows an example where the order is set to 5.

As expressed by Equations (22) and (23), the AR coefficient is calculated from the pseudo-inverse matrix of a signal subspace.

The calculated AR coefficient vector can be expressed by $[a_5(1)\ a_5(2)\ a_5(3)\ a_5(4)\ a_5(5)]^T$. The superscript T represents a transposed matrix.

The AR coefficient 1 (present AR coefficient 1) calculated in the present control cycle is expressed as a1 $(t)$. The AR coefficients 1 (previous AR coefficients 1) calculated in the previous control cycles are expressed as a1 (t−1) to a1 (t−n).

The computational expression of calculating an averaged AR coefficient 1: Ave_a1$(t)$ through the use of the averaging process of averaging (adding) the elements of the "present AR coefficient 1: a1$(t)$" and the "previous AR coefficients 1: a1$(t-1)$ to a1$(t-n)$" is expressed by Equation (26).

$$\text{Ave\_}a1(t)=k1*a1(t)+k2*a1(t-1)+\ldots+kn+1*a1(t-n) \qquad (26)$$

In Equation (26), k1 to kn+1 represent a weighting coefficient.

In the third embodiment, since the rank in the course of calculating the pseudo-inverse matrix is set to be variable depending on the wave number estimation result, the order of the AR coefficient vector, that is, the number of elements of the AR coefficient vector, is constant. Accordingly, the averaging process of the AR coefficient vector is possible.

Figure 23:
FIG. 23 is a diagram illustrating a process of averaging AR coefficients in an FBLP method.

FIG. 23 is a diagram illustrating the AR coefficient averaging process in the FBLP method.

The normal equation shown in FIG. 23 is obtained by arranging Equation (1) with respect to the AR coefficient. This normal equation when the order is 3 is expressed by Equation (27).

$$\begin{bmatrix} \hat{a}_3(1) \\ \hat{a}_3(2) \\ \hat{a}_3(3) \end{bmatrix} = -\begin{bmatrix} C_{x3}(1,1) & C_{x3}(1,2) & C_{x3}(1,3) \\ C_{x3}(2,1) & C_{x3}(2,2) & C_{x3}(2,3) \\ C_{x3}(3,1) & C_{x3}(3,2) & C_{x3}(3,3) \end{bmatrix}^{-1} \begin{bmatrix} C_{x3}(1,0) \\ C_{x3}(2,0) \\ C_{x3}(3,0) \end{bmatrix} \qquad (27)$$

The AR coefficient vector calculated through Equation (27) can be expressed by $[a_3(1)\ a_3(2)\ a_3(3)]^T$. The superscript T represents a transposed matrix. The AR coefficient 2 (present AR coefficient 2) calculated in the present control cycle is expressed as a2$(t)$. The AR coefficients 2 (previous AR coefficients 2) calculated in the previous control cycles are expressed as a2$(t-1)$ to a2$(t-n)$.

The computational expression of calculating an averaged AR coefficient 2: Ave_a2$(t)$ through the use of the averaging process of averaging (adding) the elements of the "present AR coefficient 2: a2$(t)$" and the "previous AR coefficients 2: a2$(t-1)$ to a2$(t-n)$" is expressed by Equation (28).

$$\text{Ave\_}a2(t)=k1*a2(t)+k2*a2(t-1)+\ldots+kn+1*a2(t-n) \qquad (28)$$

In Equation (28), k1 to kn+1 represent a weighting coefficient.

In the third embodiment, since the order of the normal equation is fixed, the number of elements of the AR coefficient vector is constant. Accordingly, the averaging process of the AR coefficient vector is possible.

FIG. 24 is a diagram illustrating a table installed in the memory 21.

The table shown in FIG. 24 is different from the table shown in FIG. 14, in the items of the AR coefficient.

The additional items of the AR coefficient include an AR coefficient AR2_C_up at an ascending peak frequency and an AR coefficient AR2_C_dwn at a descending peak frequency which store the AR coefficient 2 corresponding to the peak frequency point.

The AR coefficients at the peak frequencies are stored in the memory 21 in the table format shown in FIG. 24 (exactly, the storage areas of the items are larger than those of the other items, but are assumed to be equal thereto for the purpose of convenience to drawing a table). The memory 21 stores the AR coefficients AR1_C_up and AR2_C_up at an ascending peak frequency and the AR coefficients AR1_C_dwn and AR2_C-dwn at a descending peak frequency.

The flow of processes will be described below with reference to FIG. 25.

FIG. 25 is a flowchart illustrating the flow of processes in the third embodiment.

The flow of processes in the third embodiment shows an example where the AR coefficient averaging process shown in FIGS. 22 and 23 is applied to the second or later target detection cycle.

The difference from FIG. 16 according to the first embodiment will be mainly described below. The steps of performing the same processes as shown in FIG. 16 are referenced by the same reference signs.

The preconditions in the flow of processes to be described below are arranged as follows.

The number of channels N (the number of data) included in the complex data detected through a single data acquisition is set to 5 ch. The order M of the normal equation before the data extension is set to 3. The number of channels (the number of extended channels) $N_e$ (the number of data) included in the complex data extended through the data extension is set to 9 ch. The order (increased order) $M_e$ of the normal equation after the data extension is set to 5. It is assumed that these values are preliminarily determined.

The flow of processes shown in FIG. 25 is repeatedly performed for each control cycle (see FIG. 8) and for each of targets selected through the detection of peaks in the entire constitution of a radar.

In step Sa101, complex data for each channel (CH) is acquired once in the present control cycle.

In step Sa301, the normal equation creating unit 361 creates the M-th order normal equation to be applied to an AR model based on the complex data acquired in the present detection cycle.

In step Sa302, the AR coefficient calculating unit 363B calculates the secondary order AR coefficient (AR coefficient 2) of an order M from the normal equation created in step Sa301.

In step Sa303, the AR coefficient filter unit 372 calls the AR coefficients (AR coefficient 2(n−1) and AR coefficient 2(n−2)) derived in the previous (first preceding and second preceding) detection cycles and stored in the memory 21 through the use of the target correlating unit 32b.

In step Sa304, the AR coefficient filter unit 372 calculates an averaged AR coefficient 2(n) by averaging the AR coefficient (present AR coefficient 2(n)) of the order M calculated in the present detection cycle by the AR coefficient calculating unit 363B and the AR coefficients (the AR coefficient 2(n−1) and the AR coefficient 2(n−2)) calculated in the previous (first preceding and second preceding) detection cycles and supplied from the target correlating unit 32b.

The processes of steps Sa103 to Sa110 subsequent to step Sa304 are the same as shown in FIG. 16.

In step Sa305, the AR coefficient filter unit 371 calls the AR coefficients (AR coefficient 1(n−1) and AR coefficient 1(n−2)) derived in the previous (first preceding and second preceding) detection cycles and stored in the memory 21 through the use of the target correlating unit 32b.

In step Sa306, the AR coefficient filter unit 371 calculates an averaged AR coefficient 1(n) by averaging the AR coefficient 1 of the order $M_e$ derived in the present detection cycle by the AR coefficient calculating unit 326B and the AR coefficients 1 (the AR coefficient 1(n−1) and the AR coefficient 1(n−2)) derived in the previous (first preceding and second preceding) detection cycles and supplied from the target correlating unit 32b.

The processes of steps Sa111 to Sa113 subsequent to step Sa306 are the same as shown in FIG. 16.

In step Sa307, the AR coefficient filter unit 372 stores the calculated averaged AR coefficient 2(n) in the memory 21 through the use of the target correlating unit 32b.

According to the flow of processes in the third embodiment, the effect of the data extension to the order $M_e$ appears in the second or subsequent detection cycle. By performing the data extension operation of the order 3 and the order 5 only in the first detection cycle, the electronic scanning radar apparatus according to the third embodiment can detect an azimuth with enhanced detection accuracy.

Fourth Embodiment

Another example where the AR spectrum estimating method known as a high-resolution algorithm is used for the spectrum estimating process will be described below in more detail with reference to FIGS. 1 to 27.

FIG. 26 is a block diagram illustrating the constitution of an azimuth detecting unit 30C according to a fourth embodiment of the invention. The same elements as shown in FIGS. 1, 7, and 19 are referenced by the same reference numerals.

The azimuth detecting unit 30C and the target correlating unit 32c shown in FIG. 26 are examples of the azimuth detecting unit 30 and the target correlating unit 32 of the signal processing unit 20A (FIG. 1), respectively.

The target correlating unit 32c records and stores the AR coefficient 1(n) calculated in the present detection cycle in the memory 21. The AR coefficient 1(n) is calculated from the complex data (extended complex data) extended in the present detection cycle by the MFBLP unit 320C.

When the AR coefficients 1 stored in the memory 21 are called in the present detection cycle which is a next detection cycle (n-th) by the target correlating unit 32c, the AR coefficients 1 are called as previous (first preceding and second preceding) AR coefficient 1(n−1) and AR coefficient 1(n−2).

That is, the fourth embodiment is different from the first embodiment, in that the information stored in the memory 21 includes only the AR coefficient of which the order is increased. The AR coefficient (AR coefficient 1) is calculated by the MFBLP unit 320C.

The target correlating unit 32c correlates the targets in the previous detection cycles stored in the memory 21 with each other and the AR coefficient 1(n−1), the AR coefficient 1(n−2) stored in the previous detection cycles (FIG. 8) for each target to the azimuth detecting unit 30C.

The target correlating unit 32c adds identification information of the distance, the relative velocity, and the azimuth output from the target fixing unit 31 to the AR coefficient 1(n) calculated based on the a plurality of complex data acquired in the present detection cycle (FIG. 8) and records the result in the memory 21.

That is, the fourth embodiment is different from the first to third embodiments, in that the spectrum estimating process is performed without generating the AR coefficient for the data extension and extending data.

The azimuth detecting unit 30C includes an MFBLP unit 320C, an AR filter unit 371, and a power spectrum calculating unit 380B.

The MFBLP unit 320C (first computation processing unit) calculates a first AR coefficient (AR coefficient) and a variance value of white noise based on the data matrix and the data vector created from the complex data (n) detected in the present control cycle.

The MFBLP unit 320B includes a data matrix and vector creating unit 321C, a singular value decomposing unit 323, a wave number estimating unit 324, a pseudo-inverse matrix creating unit 325, and an AR coefficient calculating unit 326B.

The data matrix and vector creating unit 321C creates a data matrix A and a vector h from the complex data (n) detected in the "present detection cycle".

In this manner, the azimuth detecting unit 30C calculates the direction of arrival of a received wave based on the pseudo-inverse matrix of signal subspace components through the use of a spectrum estimating method using an autoregressive model.

In the fourth embodiment, the data matrix and vector creating unit 321, the singular value decomposing unit 323, the pseudo-inverse matrix calculating unit 325, and the AR coefficient calculating unit 326 serve as the second means. The wave number estimating unit 324 serves as the third means. The AR coefficient filter unit 371 serves as the fifth means.

FIG. 27 is a flowchart illustrating the flow of processes in the fourth embodiment.

The steps of performing the same processes as shown in FIGS. 16 and 25 are referenced by the same reference signs.

In step Sa104', the data matrix and vector creating unit 321C creates a data matrix A and a data vector h from the complex data (n) detected in the "present detection cycle".

In step Sa114, the AR coefficient filter unit 371 stores the averaged AR coefficient as the present AR coefficient in the memory 21.

In this manner, the data extension described in the first to third embodiments is not performed in the fourth embodiment. The MFBLP method can be applied without performing the data extension and the MFBLP unit 320C can calculate a desired order AR coefficient 1(n).

The stored AR coefficient may be an averaged AR coefficient and thus the effect of the AR coefficient filter can be enhanced (see the dotted line in FIG. 26).

In this manner, the electronic scanning radar apparatus according to the fourth embodiment can detect an azimuth with enhanced detection accuracy.

Fifth Embodiment

An electronic scanning radar apparatus according to a fifth embodiment of the invention will be described with reference to FIGS. 28 and 29.

Figures 28, 29:
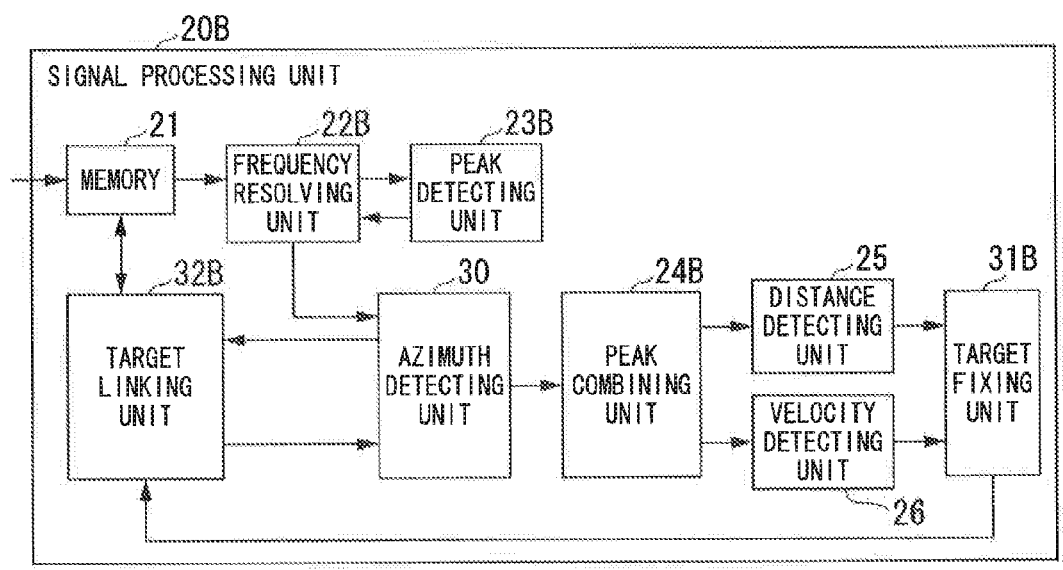
FIG. 28 is a block diagram illustrating the constitution of an electronic scanning radar apparatus according to a fifth embodiment of the invention.
FIG. 29 is a table used to combine peaks in the ascending region and the descending region.

FIG. 28 is a block diagram illustrating the constitution of a signal processing unit 20B of the electronic scanning radar apparatus according to the fifth embodiment.

In the fifth embodiment, an azimuth estimating process is performed through the use of a high-resolution algorithm, similarly to the first to fourth embodiments. The same constituents as in the first to fourth embodiments shown in FIG. 1 will be referenced by the same reference numerals and differences from the first embodiment will be described below.

A frequency resolving unit 22B of a signal processing unit 20B converts beat signals of the ascending region and the descending region for each antenna into complex data and outputs frequency points indicating the beat frequencies and the complex data to a peak detecting unit 23B.

The peak detecting unit 23B detects the peak values of the ascending region and the descending region and the frequency points at which the peak values are present, and outputs the frequency points to the frequency resolving unit 22B.

The frequency resolving unit 22B outputs the corresponding complex data for each of the ascending region and the descending region to the azimuth detecting unit 30.

The complex data is the target group (the beat frequencies having a peak in the ascending region and the descending region) of each of the ascending region and the descending region. Here, the peak detecting unit 23B can perform the same function as the maximum singular value determining process (step S106a) in the wave number estimating process in the azimuth detecting unit and thus may be deleted.

Since the target correlating unit 32B needs to correlate the target fixed in the past with both target groups of the ascending and the descending, the above-mentioned table is stored in the memory 21.

The target correlating unit 32B correlates the present detection cycle with the previous detection cycles through the same process as in the target correlating unit 32 shown in FIG. 1.

The azimuth detecting unit 30 calculates the AR coefficient by performing the singular value decomposing process on the data matrix using the MFBLP method and performing the wave number estimating process for each of the ascending region and the descending region, as described in the first to fourth embodiments.

The azimuth detecting unit 30 detects the angles θ for the AR coefficient of the ascending region and the AR coefficient of the descending region and outputs the detected angles in the table format shown in FIG. 29 to the peak combining unit 24B.

The peak combining unit 24B combines the beat frequencies having the same angle based on the information of the table shown in FIG. 29 and outputs the combination of beat frequencies of the ascending region and the descending region to the distance detecting unit 25 and the velocity detecting unit 26.

The distance detecting unit 25 calculates the distance based on the combination of beat frequencies of the ascending region and the descending region, similarly to the first embodiment.

The velocity detecting unit 26 calculates the relative velocity based on the combination of beat frequencies of the ascending region and the descending region, similarly to the first embodiment.

A target fixing unit 31B fixes the complex data of the ascending region and the descending region, and the frequency point, the distance, the relative velocity, and the azimuth of the ascending region and the descending region as the present status.

The target correlating unit 32B stores the frequency points of the ascending region and the descending region, the AR coefficients of the ascending region and the descending region, the distance, the longitudinal position, the lateral position, and the relative velocity for each target, which are input from the target fixing unit 31B, in the table through the same processes as in the first to fourth embodiments.

Through the above-mentioned sequence of processes, the electronic scanning radar apparatus can detect an azimuth with enhanced detection accuracy.

Sixth Embodiment

An electronic scanning radar apparatus according to a sixth embodiment of the invention will be described with reference to FIGS. 30 and 31.

Figures 30, 31:
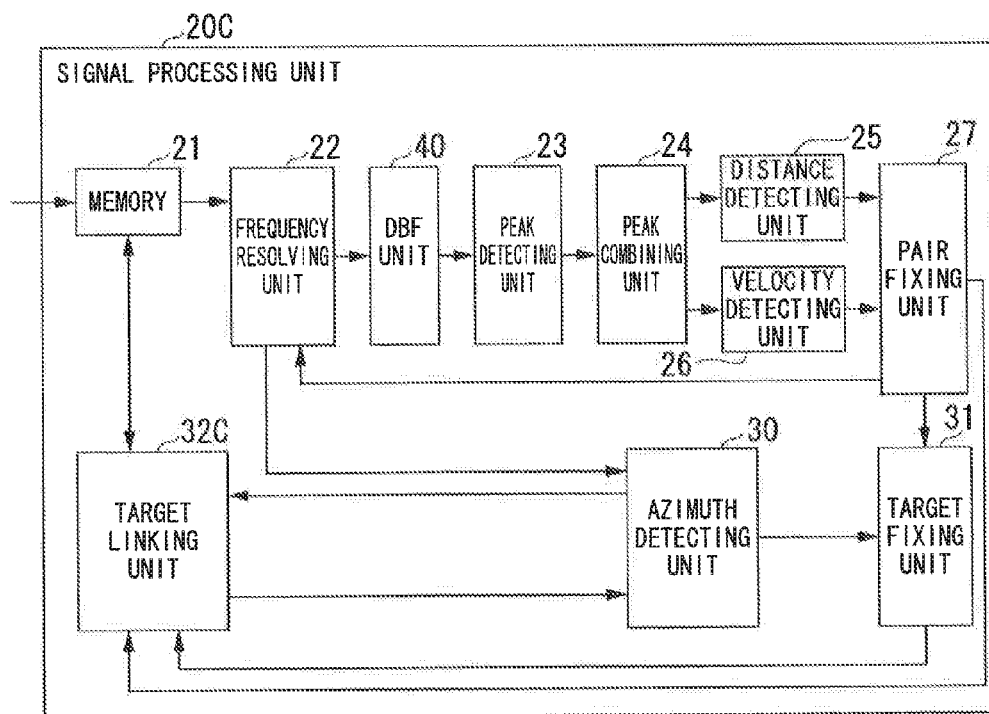
FIG. 30 is a block diagram illustrating the constitution of an electronic scanning radar apparatus according to a sixth embodiment of the invention.
FIG. 31 is a table in which pairs of peaks in the ascending region and the descending region are fixed.

FIG. 30 is a block diagram illustrating the constitution of a signal processing unit 20C of the electronic scanning radar apparatus according to the sixth embodiment.

In the sixth embodiment, unlike the first embodiment, an azimuth estimating process is first performed through the use of a DBF (Digital Beam Forming) with a resolution lower than that of the high-resolution algorithm such as the AR spectrum estimating process and an azimuth estimating process is then performed through the use of the high-resolution algorithm such as the AR spectrum estimating process using the MFBLP method. The same constituents as in the first embodiment shown in FIG. 1 and the fifth embodiment shown in FIG. 28 will be referenced by the same reference numerals and differences from the first embodiment and the fifth embodiment will be described below.

As shown in FIG. 30, this embodiment is different from the first embodiment, in that a DBF unit 40 is disposed between the frequency resolving unit 22 and the peak detecting unit 23 in the signal processing unit 20C according to the first embodiment shown in FIG. 1 and the azimuth in which a received wave arrives is first detected using the DBF.

Similarly to the fifth embodiment, the frequency resolving unit 22 resolves input beat signals in frequency (Fourier-transform in a time axis direction) and outputs frequency points indicating the beat frequencies and the complex data to the DBF unit 40.

The DBF unit 40 Fourier-transforms the input complex data corresponding to the antennas in the arrangement direction of the antennas, that is, performs a spatial-axis Fourier transform.

The DBF unit 40 calculates spatial complex data depending on the angle, that is, for each angular channel corresponding to an angular resolution, and outputs the calculated spatial complex data to the peak detecting unit 23 for each beat frequency.

Accordingly, a spectrum indicated by the spatial complex data (for each beat frequency) for each angular channel output from the DBF unit 40 depends on a received wave arrival direction estimation based on the beam scanning resolution.

Since the complex data is Fourier-transformed in the arrangement direction of the antennas, the same effect as adding the complex data of the angular channels can be obtained and the complex data for each angular channel is improved in the S/N ratio. Accordingly, it is possible to enhance the accuracy in detection of a peak value, similarly to the first embodiment.

Similarly to the first embodiment, the complex data and the spatial complex data are both calculated from both the ascending region and the descending region of a triangular wave.

The peak detecting unit 23 detects a peak for each angular channel based on the DBF result and outputs the detected peak values of the channels to the next-stage peak combining unit 24 for each angular channel, after the process in the DBF unit 40 is performed. That is, in the case of the spatial-axis Fourier transform with a resolution of 16, the number of angular channels is 15.

Similarly to the first embodiment, the peak combining unit 24 combines the beat frequencies at which a peak value is present in the ascending region and the descending region and the peak values thereof and outputs the combinations to the distance detecting unit 25 and the velocity detecting unit 26 for each angular channel.

The pair fixing unit 27 generates the table shown in FIG. 5 for each angular channel based on the distance r and the relative velocity v sequentially input from the distance detecting unit 25 and the velocity detecting unit 26, and determines the appropriate combination of peaks in the ascending region and the descending region corresponding to each target, similarly to the first embodiment. Here, since the presence of a target appears over a plurality of angular channels with the resolution of the DBF, it is possible to appropriately combine the peaks of the ascending region and the descending region for each angular channel in consideration of the coincidence with adjacent angular channels (matrices). The pair fixing unit fixes the pair of peaks of each of the ascending region and the descending region, outputs a target group number indicating the fixed distance r and the fixed relative velocity v to the target fixing unit 31, and prepares the table shown in FIG. 31.

FIG. 31 is a diagram illustrating a table in which the pairs of peaks of the ascending region and the descending region are fixed.

Since the information on the angular channels of each target can be obtained in addition to the distance r and the relative velocity v and the longitudinal position and the lateral position of the target can be acquired, the pair fixing unit 27 generates the table shown in FIG. 31 in which the longitudinal position and the lateral position are added to the table shown in FIG. 6 and the results corresponding to the target groups in the present detection cycle are included.

Since the target correlating unit 32C performs the process of correlating the target in the present detection cycle with the target in the previous detection cycles of FIG. 8 using the information of the table shown in FIG. 31 and uses the longitudinal position and the lateral position in addition to the distance, the relative velocity, and the peak frequency point as the correlation parameters, it is possible to perform the correlation process with higher accuracy.

The azimuth detecting unit 30 performs the wave number estimating process in the first to fourth embodiments.

By estimating the azimuth through the use of an AND logic based on the azimuth information from the azimuth detecting unit 30 and the azimuth information from the DBF unit, it is possible to improve the reliability of the direction detection, or to pool the azimuth information each other, or to utilize the angular information of the DBF, for example, because the angular resolution may be low within a short range.

The azimuth detecting unit 30 performs the spectrum estimating process using the MFBLP method in the first to sixth embodiments.

Direction Estimation Characteristic in First to Sixth Embodiments

The direction estimation characteristics of the electronic scanning radar apparatus according to the first to sixth embodiments will be described below.

Figure 32:
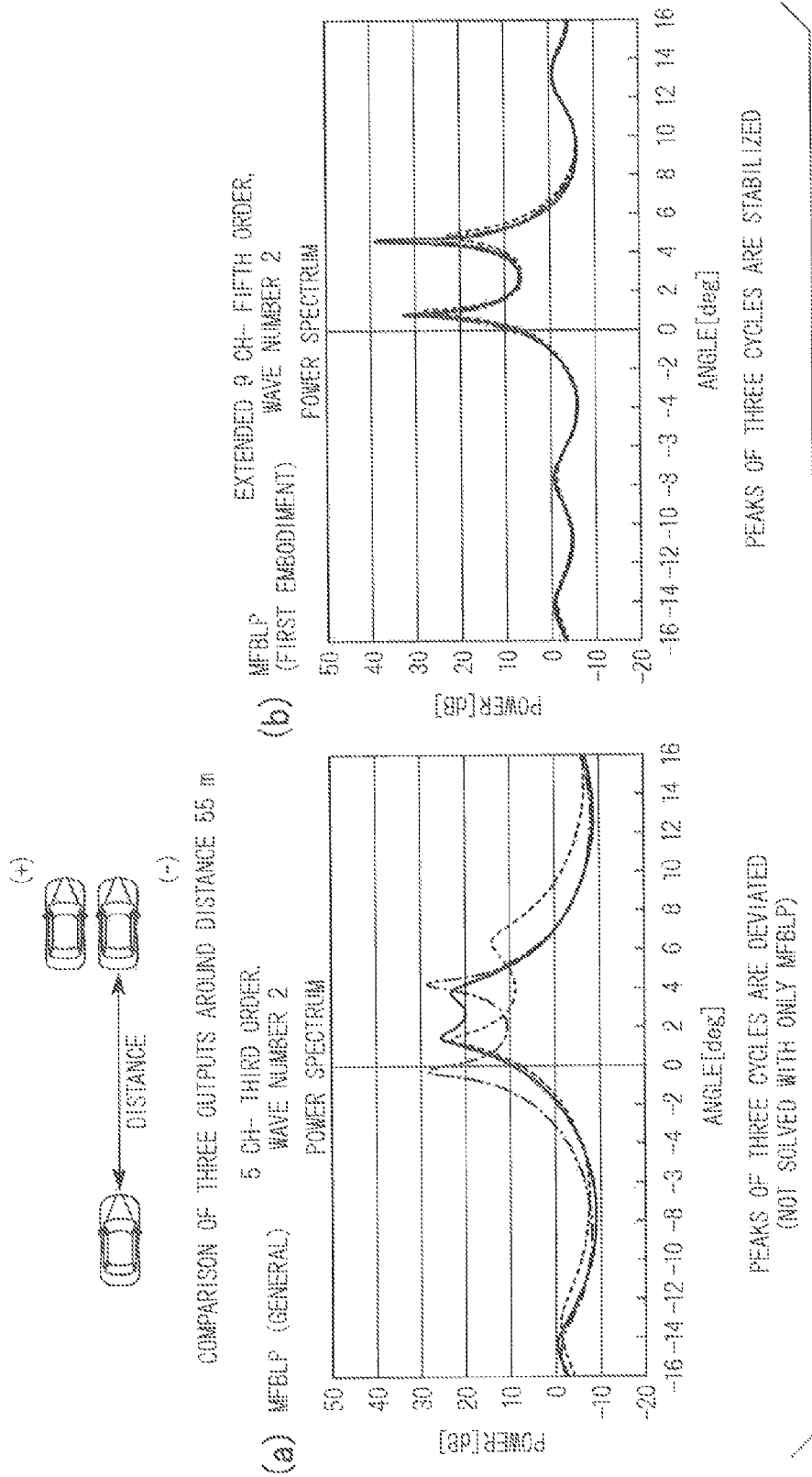
FIG. 32 is a diagram (first half) illustrating the effect of an azimuth estimation characteristic of the electronic scanning radar apparatus according to the sixth embodiment.
Figure 33:
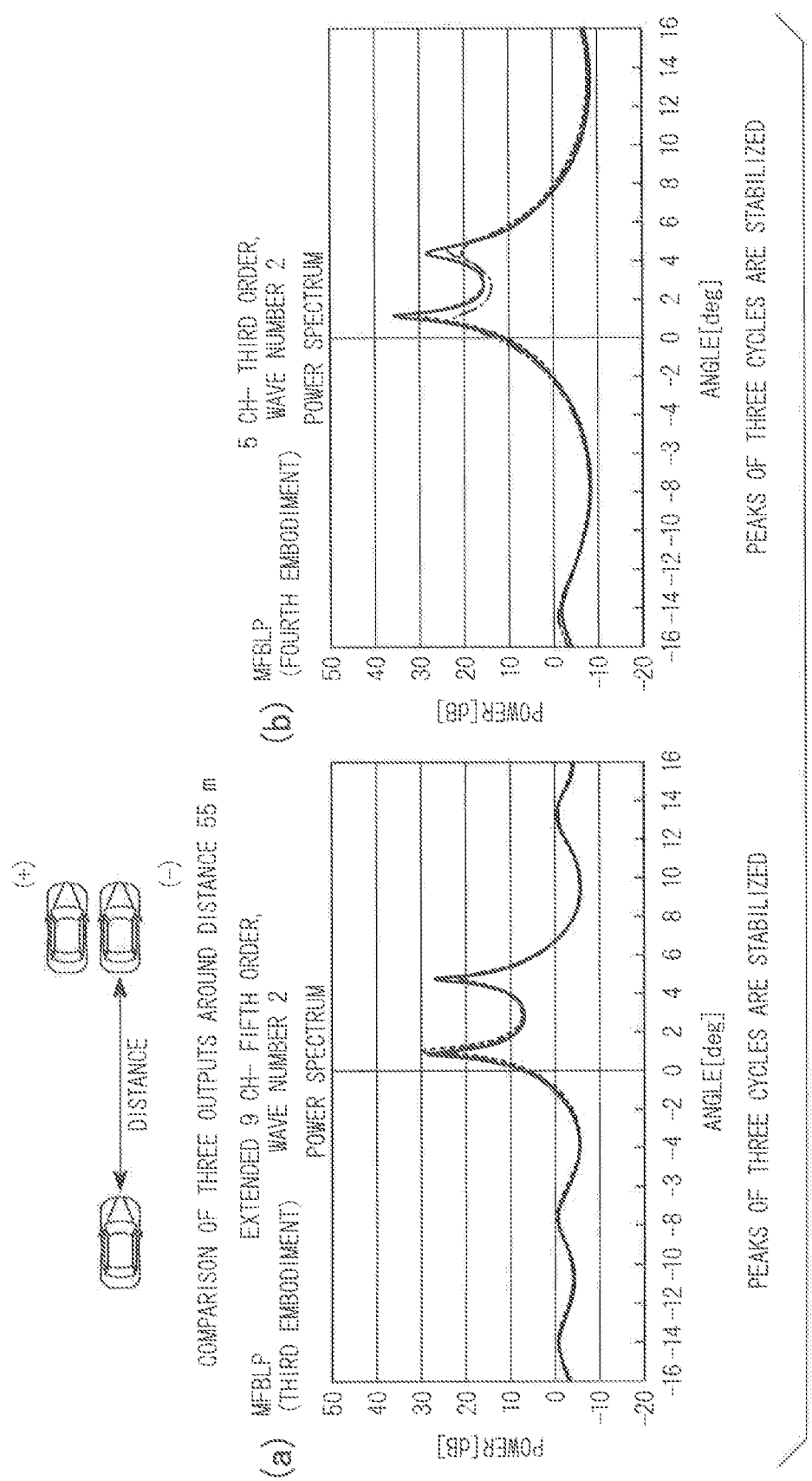
FIG. 33 is a diagram (second half) illustrating the effect of an azimuth estimation characteristic of the electronic scanning radar apparatus according to the sixth embodiment.

FIGS. 32 and 33 are diagrams illustrating the effect of the azimuth estimation characteristics of the electronic scanning radar apparatus according to the first to sixth embodiments.

When there are two preceding vehicles, a case employing the MFBLP method without any change and a case employing the MFBLP method with the data extension process and the AR coefficient averaging process according to the first to sixth embodiments will be compared. In this comparison, the difference in estimation result due to the difference between the embodiments will be reviewed based on the complex data in which the distances from the targets (preceding vehicles) are equal to each other. It is assumed that two targets (preceding vehicles apart by 55 m) are present and the wave number of the arrival wave is estimated to be 2.

The estimation result of the MFBLP method shown in part (a) of FIG. 32 is the result of the spectrum estimation in a state where the number of channels is set to 5 CH, the order is set to 3, and the wave number is set to 2.

Three curves shown in the drawing represent the results corresponding to three cycles. As shown in the drawing, through only the MFBLP method, the positions (angles) of the peaks of the waveforms indicating a power spectrum are uneven and thus the position (angle) of a target cannot be stably detected. That is, it can be seen that the stabilized result cannot be obtained by only applying the MFBLP method without any change.

On the other hand, the case employing the MFBLP method with the data extension process according to the first embodiment is shown in part (b) of FIG. 32 and the case employing the MFBLP method with the data extension process according to the third embodiment is shown in part (a) of FIG. 33. A case (the fourth embodiment) employing the MFBLP method with the process (averaging process) of filtering the calculated AR coefficients without performing the data extension process is shown in part (b) of FIG. 33.

The estimation result using the MFBLP method with the data extension shown in part (b) of FIG. 32 is the result of the spectrum estimation according to the first embodiment in a state where the number of channels is set to 9 CH, the order is set to 5, and the wave number is set to 2.

The estimation result using the MFBLP method with the data extension shown in part (a) of FIG. 33 is the result of the spectrum estimation according to the third embodiment in a state where the number of channels is set to 9 CH, the order is set to 5, and the wave number is set to 2.

The estimation result using the MFBLP method with the AR coefficient averaging process shown in part (b) of FIG. 33 is the result of the spectrum estimation according to the fourth embodiment in a state where the number of channels is set to 5 CH, the order is set to 3, and the wave number is set to 2.

In any of part (a) and part (b) of FIG. 32 and part (a) and part (b) of FIG. 33, the processes are performed based on the same complex data.

In this manner, in the results shown in part (b) of FIG. 32 and part (a) and part (b) of FIG. 33, the peaks of the curves are precipitous and the directions in which the peaks are detected are stabilized. As a result, two peak values are separately detected and the presence of two vehicles as the target is thus preferably detected.

As described in the above-mentioned embodiments, excellent estimation results can be obtained from the estimation results shown in part (b) of FIG. 32 and part (a) and part (b) of FIG. 33 even when the complex data of which the number of data acquisitions is one for each control cycle is used.

In the electronic scanning radar apparatus according to the above-mentioned embodiments, the azimuth detecting unit 30 sets the order of the equation used to estimate a spectrum and the actual wave number to be estimated based on the complex data of the detection beat frequencies and then estimates an azimuth, thereby enhancing the detection accuracy.

According to the embodiments of the invention, the processes of the MFBLP method including the data extending process and the process of raising the order can improve the azimuth detection accuracy by effectively using the characteristics of the AR spectrum estimation without increasing the storage capacity and the computational load based on the input data such as a correlation matrix and the number of data acquisitions.

Since the original complex data can be extended to a larger number of data (CH) by the first means, it is possible to raise the number of elements or the order of the data matrix and the data vector of the second means.

Since the second means creates the pseudo-inverse matrix through the singular value decomposition from the data matrix and the data vector, it is possible to acquire an AR coefficient with high accuracy without calculating a correlation matrix (or a covariance matrix). Since the AR coefficient of the signal subspace can be calculated, it is possible to detect an azimuth with high accuracy and with suppressed spurious peaks. By raising the order to be higher than the highest order which can be set from the original complex data, it is possible to reflect the characteristic of the AR spectrum estimation that higher order causes higher accuracy.

With the third means, it is possible to relatively easily estimate the wave number of a signal through the use of a method of effectively utilizing the singular value decomposing process of the previous step. Since erroneous azimuth estimation can be prevented by determining the magnitude of the maximum singular value, it is possible to determine whether the wave number estimation should be performed using another threshold value even when no peak is detected in the entire constitution of a radar (for example, a case where an angle in the range of all distance points or any distance point is estimated using a spectrum) or after detecting a peak.

By estimating the wave number using the normalized singular values, it is possible to estimate and determine the wave number without being affected by the distance from a target. In addition, by employing a plurality of threshold values for the singular values, it is possible to provide the reference of specific wave number estimation.

With the fourth means, it is possible to reduce the number of data acquisitions and the storage capacity and the computational load based thereon. The AR coefficients having a smaller memory capacity than that of the correlation matrix can be used as the information to be stored.

Since the AR coefficients in the previous control cycles can be averaged by the fifth means, it is possible to enhance the accuracy of the AR coefficients for the data extension or to enhance the azimuth detection accuracy.

With the sixth means (the third embodiment), it is possible to necessarily perform the azimuth detecting process using the AR coefficient acquired in the present control cycle as the AR coefficients for the data extension.

Since the data extension can be performed using the AR coefficient with a increased order by the use of the combination (the first embodiment) of the first to fourth means, it is possible to further enhance the detection accuracy.

Even when the data extension is not performed, it is possible to reduce the unevenness of a spectrum by averaging the AR coefficients by the use of the combination (the fourth embodiment) of the second to fifth means.

Although the constitutional example using the FMCW type radar shown in FIG. 1 is described in the first to fourth embodiments, the invention can be applied to another antenna structure of the FMCW type. In addition to the operation of the microcomputer in the above-mentioned embodiments, a plurality of devices or processors (FPGA, DSP, microcomputers) may be made to perform the operation from the data acquiring process.

The invention can be applied to other types such as a multi-frequency CW radar and a pulse radar other than the FMCW type.

Although it has been stated in the above-mentioned embodiments that the peaks of a power spectrum are calculated to acquire the number of targets and the azimuth, they can be estimated using a spectrum prepared without multiplication of the variance value of input white noise and thus the calculation of the variance value of input white noise may be skipped. In addition, the azimuth may be estimated with the polarity through the use of the computation of calculating a root of a high-order equation instead of the power spectrum.

Since the MFBLP method described in the above-mentioned embodiments is a method of performing the singular value decomposition, calculating the pseudo-inverse matrix of a signal subspace, and calculating the AR coefficient, the computational load is greater than that of the standard AR spectrum estimating method. However, even when the order of an AR model is set to be slightly higher than the detected signal number, it is possible to calculate a power spectrum with suppressed spurious peaks, thereby obtaining an estimation result with high detection accuracy. Actually, the order of the AR model can be fixed to a settable high order, and a signal subspace and a noise subspace can be selected to calculate a spectrum like the MUSIC method.

The singular value decomposition is a modified eigenvalue decomposition method and can calculate singular values even from a singular matrix (=non-regular matrix) or a rectangular matrix. The singular value is a positive square root of an eigenvalue and thus the singular value is equivalent to the eigenvalue.

However, the received wave number estimating method suitable for the MFBLP method is not described in the above-mentioned reference document and there is no report that it has been applied to a small number of channels (CH) like an on-board radar. FPE (Final Prediction Error), AIC (Akaike Information Criterion), MDL (Minimum Description Length), and the like are known as a general received wave number estimating technique, but all of them increase the computational load and are not guaranteed for estimation with enhanced detection accuracy.

As described in the above-mentioned embodiments, the AR spectrum estimating method is applied to the azimuth detection in an on-board radar and the received wave number estimating method using the singular value decomposition is employed without using the wave number (or model order) estimating method such as the FPE, the AIC, and the MDL which increase the computational load. By employing the received wave number estimating method using the singular value decomposition, it is possible to relatively easily perform the received wave number estimation and to directly connect the received wave number estimation to the MFBLP method.

It is possible to detect an azimuth with high detection accuracy by applying the result of the received wave number estimation to the pseudo-inverse matrix using the calculated singular values, deleting a noise subspace, and extracting only a signal subspace.

Programs for realizing the functions of the signal processing units 20A to 20C in FIGS. 1, 7, 21, 28, and 30 may be recorded on a computer-readable recording medium and the programs recorded on the recording medium may be read and executed by a computer system to perform the signal process of detecting an azimuth from a received wave. The "computer system" includes an OS and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM) of a computer system serving as a server or a client when the program is transmitted through a network such as the Internet or a communication line such as a telephone line.

The programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In the above-mentioned embodiments, for example, when it is determined in step Sa106 that the value of the maximum singular value is smaller than the predetermined threshold value, it is determined that the reliability of the acquired information (complex data) is low, and the wave number estimating process of the subsequent step is not performed on the corresponding target, thereby preventing incorrect information from being provided.

For example, even when the processes of estimating the wave number and estimating the azimuth in the subsequent steps are not performed and the information of a target in the corresponding cycle is not detected but lost, it is possible to similarly maintain the lost information of a target by using an extrapolation method based on tracking which is typically performed in the subsequent steps as a recognition process of a radar. According to this method, since it is possible to prevent a target from being lost, it is possible to suitably utilize the idea that it is more desirable to cancel the incorrect azimuth estimation result than to output the incorrect azimuth detection result. The idea that the azimuth detection should not be cancelled as much as possible may be right in some cases. Accordingly, the wave number may be forcibly set to a predetermined wave number (for example, any one of the maximum order and the minimum order) without performing the wave number estimation in the subsequent step. By performing the signal wave number estimating process including the maximum singular value determination, it is effective, for example, in the case where it is determined whether the targets of which the peak is detected should be additionally subjected to the azimuth detection for each target or in the case where the peak should not be detected. An example of the case where the peak should not be detected is a processing constitution in which the azimuth detection is unconditionally performed on the overall points or any distance point.

Another method may be used instead of the data extension method described in the above-mentioned embodiments.

For example, the extension of a waveform in the domain of the original complex data using phase correction may be used by performing an IFFT process after adding data with a value of "0" to the extracted complex data, performing an FFT process, and correcting the phase in the transformed domain, or various data extrapolation algorithms or data prediction algorithms may be used.

The wave number estimation described in the above-mentioned embodiments may employ techniques of Frobenius norm ratio and the like of estimating the number of effective ranks in the eigenvalue decomposition as well as the threshold determination technique using the normalized eigenvalues.

The wave number used to create the pseudo-inverse matrix may be fixed, for example, to the maximum wave number for the purpose of calculating the AR coefficients for the data extension or may be set independently of the wave number for calculating the power spectrum.

What is claimed is:
1. An electronic scanning radar apparatus mounted on a moving object, comprising:
a receiver unit including a plurality of antennas receiving a received wave arriving from a target having reflected a transmitted wave;
a beat signal generating unit configured to generate a beat signal from the transmitted wave and the received wave;

a frequency resolving unit that configured to resolve the beat signal into beat frequencies having a predetermined frequency bandwidth and to calculate complex data based on the beat signal resolved for each beat frequency; and an azimuth detecting unit configured to estimate a wave number of the received wave based on singular values calculated from a matrix created based on the complex data calculated based on the beat signal and to calculate a direction of arrival of the received wave based on coefficients calculated based on a pseudo-inverse matrix of the matrix included in a signal subspace determined by the estimated wave number.

2. The electronic scanning radar apparatus according to claim 1, wherein the azimuth detecting unit includes a first computation processing unit configured to calculate the coefficients based on the complex data calculated based on the beat signal, and wherein the first computation processing unit includes
a data matrix and data vector creating unit configured to create the matrix and a vector based on the complex data calculated based on the beat signal,
a singular value decomposing unit configured to calculate the singular values by decomposing the created matrix in singular values,
a wave number estimating unit configured to calculate an estimated wave number by estimating the wave number of the received wave based on the calculated singular values,
a pseudo-inverse matrix calculating unit configured to calculate the pseudo-inverse matrix included in the signal subspace determined by the calculated estimated wave number, and
a coefficient calculating unit configured to calculate the coefficients from the pseudo-inverse matrix of the signal subspace and the vector.

3. The electronic scanning radar apparatus according to claim 2, wherein the azimuth detecting unit includes a data extending unit configured to use the calculated complex data as original complex data and to generate extended complex data, the number of which is greater than that of the original complex data, and wherein the data matrix and data vector creating unit is configured to create the matrix and the vector having the extended complex data as elements.

4. The electronic scanning radar apparatus according to claim 3, wherein the data matrix and data vector creating unit is configured to create an order-increased matrix and an order-increased vector of which the order is increased to a predetermined order as the matrix and the vector.

5. The electronic scanning radar apparatus according to claim 3, wherein the data matrix and data vector creating unit is configured to create, as the matrix and the vector, a matrix and a vector in which an order based on the extended complex data is not increased, and the number of the extended complex data is increased.

6. The electronic scanning radar apparatus according to claim 3, wherein the azimuth detecting unit is configured to generate the coefficients, based on which the extended complex data is generated, by the use of a normal equation created based on the original complex data.

7. The electronic scanning radar apparatus according to claim 3, wherein the azimuth detecting unit further includes a second computation processing unit configured to generate the coefficients, based on which the extended complex data is generated, by the use of the normal equation created based on the original complex data, and wherein the data extending unit is configured to generate the extended complex data by the use of a linear equation based on the original complex data and the coefficients.

8. The electronic scanning radar apparatus according to claim 1, wherein the coefficients are calculated based on a linear equation expressing an autoregressive model in a spectrum estimating method using the autoregressive model.

9. The electronic scanning radar apparatus according to claim 3, wherein the data extending unit is configured to generate the extended complex data based on the coefficients calculated in a present detection cycle out of detection cycles in which the process of calculating the direction of arrival of the received wave is repeatedly performed.

10. The electronic scanning radar apparatus according to claim 9, further comprising a storage unit configured to store information corresponding to the target in correlation with the number of the detection cycles, wherein the data extending unit is configured to generate the extended complex data based on the coefficients which are stored in the storage unit as the information corresponding to the target and which are calculated in a previous detection cycle performed prior to the present detection cycle.

11. The electronic scanning radar apparatus according to claim 10, wherein the data extending unit is configured to generate the extended complex data based on the original complex data calculated in the present detection cycle and the previous complex data stored in the storage unit as the information corresponding to the target and calculated in the previous detection cycle performed prior to the present detection cycle.

12. The electronic scanning radar apparatus according to claim 10, further comprising a target correlating unit configured to correlate targets detected in the present detection cycle and the previous detection cycle and to store the information corresponding to the correlated targets in the storage unit.

13. The electronic scanning radar apparatus according to claim 12, wherein the target correlating unit is configured to correlate the targets detected in the present detection cycle and the previous detection cycle based on a distance and a relative velocity, or leased on a distance, a relative velocity, and an azimuth.

14. The electronic scanning radar apparatus according to claim 12, wherein the azimuth detecting unit further includes a coefficient filter unit configured to average the coefficients which are information corresponding to the target.

15. The electronic scanning radar apparatus according to claim 14, wherein the coefficient filter unit includes a first coefficient filter unit configured to average the coefficients calculated by the first computation processing unit and corresponding to the target.

16. The electronic scanning radar apparatus according to claim 15, wherein the azimuth detecting unit includes a second computation processing unit configured to generate the coefficients, based on which the extended complex data is generated, by the use of the normal equation created based on the original complex data, and wherein the coefficient filter unit includes a second coefficient filter unit configured to average the coefficients calculated by the second computation processing unit and corresponding to the target.

17. The electronic scanning radar apparatus according to claim 1, further comprising a peak detecting unit configured to detect a peak value from intensity values of the beat frequencies to detect the presence of the target, wherein the azimuth detecting unit is configured to calculate the direction of arrival of the received wave based on the complex data corresponding to the target of which the presence is detected by the peak detecting unit.

18. The electronic scanning radar apparatus according to claim 1, further comprising a DBF unit configured to detect the presence and the azimuth of the target through the use of a digital beam forming process of enhancing receiving sensitivity in a desired direction in which the received wave is received based on the complex data.

19. The electronic scanning radar apparatus according to claim 17, further comprising a DBF unit configured to detect the presence and the azimuth of the target through the use of a digital beam forming process of enhancing receiving sensitivity in a desired direction in which the received wave is received based on the complex data, wherein the peak detecting unit is configured to detect the azimuth of the target based on the digital beam forming in the beat frequencies in the present detection cycle.

20. A received wave direction estimating method in an electronic scanning radar apparatus mounted on a moving object, comprising:

a receiving step of causing a receiver unit to receive a received wave arriving from a target having reflected a transmitted wave through the use of a plurality of antennas;

a beat signal generating step of causing a beat signal generating unit to generate a beat signal from the transmitted wave and the received wave;

a frequency resolving step of causing a frequency resolving unit to resolve the beat signal into beat frequencies having a predetermined frequency bandwidth and to calculate complex data based on the beat signal resolved for each beat frequency; and an azimuth detecting step of causing an azimuth detecting unit to estimate a wave number of the received wave based on singular values calculated from a matrix created based on the complex data calculated based on the beat signal and calculating a direction of arrival of the received wave based on coefficients calculated based on a pseudo-inverse matrix of the matrix included in a signal subspace determined by the estimated wave number.

21. A non-transitory computer readable medium comprising instructions for causing a computer to perform a received wave direction estimating process in an electronic scanning radar apparatus mounted on a moving object, the received wave direction estimating process comprising:

a receiving step of receiving a received wave arriving from a target having reflected a transmitted wave through the use of a plurality of antennas;

a beat signal generating step of generating a beat signal from the transmitted wave and the received wave;

a frequency resolving step of resolving the beat signal into beat frequencies having a predetermined frequency bandwidth and calculating complex data based on the beat signal resolved for each beat frequency; and an azimuth detecting step of estimating a wave number of the received wave based on singular values calculated from a matrix created based on the complex data calculated based on the beat signal and calculating a direction of arrival of the received wave based on coefficients calculated based on a pseudo-inverse matrix of the matrix included in a signal subspace determined by the estimated wave number.

* * * * *